(12) United States Patent
Funaya et al.

(10) Patent No.: US 7,879,960 B2
(45) Date of Patent: Feb. 1, 2011

(54) PROCESS FOR PRODUCING PROPYLENE POLYMER

(75) Inventors: Munehito Funaya, Ichihara (JP); Naritoshi Hirota, Takaishi (JP); Mayumi Hiwara, Chiba (JP); Yasushi Tohi, Ichihara (JP); Koji Kawai, Ichihara (JP); Ryoji Mori, Ichihara (JP); Masahiko Okamoto, Chiba (JP); Shigenobu Ikenaga, Ichihara (JP); Hiromasa Marubayashi, Chigasaki (JP)

(73) Assignee: Mitsui Chemicals, Inc., Tokyo (JP)

( * ) Notice: Subject to any disclaimer, the term of this patent is extended or adjusted under 35 U.S.C. 154(b) by 621 days.

(21) Appl. No.: 11/661,504

(22) PCT Filed: Aug. 29, 2005

(86) PCT No.: PCT/JP2005/016156

§ 371 (c)(1),
(2), (4) Date: Feb. 27, 2007

(87) PCT Pub. No.: WO2006/025540

PCT Pub. Date: Mar. 9, 2006

(65) Prior Publication Data

US 2008/0097055 A1 Apr. 24, 2008

(30) Foreign Application Priority Data

| Aug. 30, 2004 | (JP) | 2004-249743 |
| Aug. 30, 2004 | (JP) | 2004-249744 |
| Aug. 26, 2005 | (JP) | 2005-245566 |

(51) Int. Cl.
- C08F 4/6592 (2006.01)
- C08F 10/06 (2006.01)
- B01J 31/22 (2006.01)

(52) U.S. Cl. ............ 526/160; 526/133; 526/134; 526/165; 526/348; 526/351; 526/943

(58) Field of Classification Search ........... 526/133, 526/134, 160, 165, 943, 348, 351
See application file for complete search history.

(56) References Cited

U.S. PATENT DOCUMENTS

| 5,036,034 A | 7/1991 | Ewen |
| 5,416,228 A | 5/1995 | Ewen et al. |
| 5,731,254 A | 3/1998 | Winter et al. |
| 6,316,558 B1 | 11/2001 | Kaneko et al. |
| 6,369,175 B1 | 4/2002 | Ewen |
| 6,515,086 B1 | 2/2003 | Razavi |
| 6,559,089 B1 | 5/2003 | Razavi et al. |
| 6,713,426 B1 | 3/2004 | Winter et al. |
| 6,939,928 B1 | 9/2005 | Kawai et al. |
| 2004/0054100 A1 | 3/2004 | Debras et al. |
| 2005/0228155 A1 | 10/2005 | Kawai et al. |

FOREIGN PATENT DOCUMENTS

| EP | 1138687 | * | 4/2001 |
| JP | 2-274703 A | | 11/1990 |
| JP | 3-193796 A | | 8/1991 |
| JP | 6-122718 A | | 5/1994 |
| JP | 10-226694 A | | 8/1998 |
| JP | 2001-526730 A | | 12/2001 |
| JP | 2002-510358 A | | 4/2002 |
| JP | 2004-510849 A | | 4/2004 |
| WO | WO-98/54230 A1 | | 12/1998 |
| WO | WO-00/49029 A1 | | 8/2000 |
| WO | WO-01/27124 A1 | | 4/2001 |
| WO | WO-02/04468 A1 | | 1/2002 |
| WO | WO-02/28923 A1 | | 4/2002 |

OTHER PUBLICATIONS

Kaminsky et al., "Polymerization of Propene and Butene with a Chiral Zirconocene and Methylalumoxane as Cocatalyst," Angew. Chem. Int. Ed. Engl., vol. 24, No. 6, 1985, pp. 507-508.

Ewan et al., "Syndiospecific Propylene Polymerizations with Group 4 Metallocenes," J. Am. Chem. Soc., vol. 110, 1988, pp. 6255-6256.

* cited by examiner

*Primary Examiner*—Caixia Lu
(74) *Attorney, Agent, or Firm*—Birch, Stewart, Kolasch & Birch, LLP

(57) ABSTRACT

A high molecular weight propylene polymer exhibiting high stereoregularity (isotactic) and high position selectivity can be effectively produced by polymerizing at least one monomer selected from propylene, α-olefins and polyenes in the presence of a catalyst for olefin polymerization comprising:

(A) a bridged metallocene compound represented by the General Formula [I] given in claims (diphenylmethylene (3-tert-butyl-5-ethyl-cyclopentadienyl)(fluorenyl)zirconium dichloride, etc.); and (B) one or more compound(s) selected from
- (b-1) an organoaluminumoxy compound
- (b-2) a compound which reacts with the bridged metallocene compound (A) to form an ion pair, and
- (b-3) an organoaluminum compound.

2 Claims, No Drawings

PROCESS FOR PRODUCING PROPYLENE POLYMER

BACKGROUND ART

The present invention relates to a process for producing a propylene polymer.

TECHNICAL FIELD

A propylene polymer is used as a thermoplastic resin or a modifier for thermoplastic resin in various applications. As a polymerization catalyst to produce a propylene polymer, titanium catalyst, metallocene catalyst or the like is known. However, when titanium catalyst is used, there are problems that the composition of propylene that can be produced is limited, and that the compatibility with other resin is insufficient due to its generally broad molecular weight distribution. On the other hand, when metallocene catalyst is used, there are advantages that an excellent copolymerizability with α-olefin is obtained and the polymerization is available in the wide range of composition, and alternatively there are also problems that when the polymerization temperature is increased, the molecular weight is difficult to be raised, or that the accomplishment of the low cost is difficult since the polymerization activity is low.

For a process for polymerizing α-olefin stereoregularly with the use of a metallocene compound as a catalyst, extensive studies have been actively carried out since W. Kaminsky et al report reported an isotactic polymerization. [Angew. Chem. Int. Ed. Engl., 24, 507 (1985)] From the results of these studies, it has become clear that in the polymerization of α-olefin using a metallocene compound, the stereoregularity and the molecular weight of obtained α-olefin polymer vary markedly depending on the difference in molecular structure such as with or without a substituent on a cyclopentadienyl ring of the ligand, or with or without a bridging bond between two cyclopentadienyl rings.

As the known techniques which markedly vary the stereoregularity, it has been reported that, for example, when propylene is polymerized with the use of a metallocene compound having a ligand in which a cyclopentadienyl ring and a fluorenyl ring are bridged, as a polymerization catalyst, for the stereoregularity of the polymer, syndioctactic polypropylene is produced in the case of using dimethylmethylene(cyclopentadienyl)(fluorenyl)zirconium dichloride [J. Am. Chem. Soc., 110, 6255 (1988)]; hemiisotactic polypropylene is produced in the case of dimethylmethylene(3-methylcyclopentadienyl)(fluorenyl)zirconium dichloride in which a methyl group is introduced in 3-position of a cyclopentadienyl ring [Japanese Unexamined Patent Application Publication No. H3-193796]; and isotactic polypropylene is produced in the case of dimethylmethylene(3-tert butylcyclopentadienyl)(fluorenyl)zirconium dichloride in which a tert-butyl group is introduced in 3-position of a cyclopentadienyl ring [Japanese Unexamined Patent Application Publication No. H6-122718].

On the other hand, as the known techniques which markedly vary the molecular weight, it has been realized that syndiotactic polypropylene having a high molecular weight is obtained when a bridging part bonding a cyclopentadienyl ring and a fluorenyl ring in dimethylmethylene(cyclopentadienyl)(fluorenyl)zirconium dichloride is replaced with a diphenylmethylene bridge [Japanese Unexamined Patent Application Publication No. H2-274703]; isotactic-hemiisotactic polypropylene having a high molecular weight is obtained when a bridging part in dimethylmethylene(3-(2-adamantyl)cyclopentadienyl)(fluorenyl)zirconium dichloride is replaced with a diphenylmethylene bridge [Organometallics, 21, 934 (2002)]; further, isotactic polypropylene having a high molecular weight is obtained when a methyl group is also introduced in 5-position of a cyclopentadienyl ring in dimethylmethylene(3-tert-butylcyclopentadienyl)(fluorenyl)zirconium dichloride [PCT Japanese Translation Patent Publication No. 2001-526730]; and so on. In addition, it has been also realized that with the dimethylmethylene(3-tert-butyl-2-methylcyclopentadienyl)(fluorenyl)zirconium dichloride and diphenylmethylene(3,4-dimethyldyclopentadienyl)(fluorenyl)zirconium dichloride, in which substituents are introduced into two adjacent positions of a cyclopentadienyl ring, propylene having a low molecular weight is obtained as compared with propylene prepared with dimethylmethylene(3-tert-butyl-5-methylcyclopentadienyl)(fluorenyl)zirconium dichloride and diphenylmethylene(3-methylcyclopentadienyl)(fluorenyl)zirconium dichloride, respectively, [PCT Japanese Translation Patent Publication No. 2001-526730, Japanese Unexamined Patent Application Publication No. H10-226694].

As described above, although the effect of bridge and substituent of the metallocene compound having a ligand in which a cyclopentadienyl ring and a fluorenyl ring are bonded by bridge has been elucidated little by little, it is the fact that reports on the effect of a substituent of α-position carbon (=carbon adjacent to a bridging position) on a cyclopentadienyl ring are few.

DISCLOSURE OF THE INVENTION

The present inventors have conducted extensive studies on a polymerization process for efficiently producing an isotactic polypropylene which is a material essential in many industrial fields such as for car parts, appliance parts, microwave container, lunch container, and the like, and an isotactic propylene elastomer which is the constituent of a thermoplastic polyolefin elastomer, which is called as TPO, with the use of the above-mentioned metallocene compound having a ligand in which a cyclopentadienyl ring and a fluorenyl ring are bonded by bridging, and as a result, they have found that the object can be achieved by carrying out a polymerization under a specific condition using a specific bridged metallocene compound, that is the polymerization catalyst comprising a bridged metallocene compound which is constituted by a cyclopentadienyl ring having specific substituents in α-position and γ-position. Thus, they have completed the invention.

That is, the invention is a process for producing an olefin polymer, which includes polymerizing at least one monomer selected from propylene, α-olefins and polyenes in the presence of a catalyst for olefin polymerization comprising:

(A) a bridged metallocene compound represented by the following General Formula [I]; and (B) one or more compound(s) selected from (b-1) an organoaluminumoxy compound (b-2) a compound which reacts with the bridged metallocene compound (A) to form an ion pair, and (b-3) an organoaluminum compound.

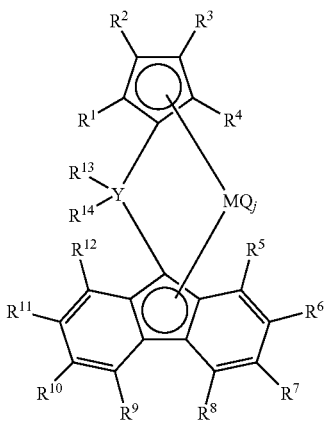

In the above-mentioned General Formula [I], $R^1$ and $R^3$ each is hydrogen, and $R^2$ and $R^4$ each is a group selected from a hydrocarbon group having 1 to 20 carbon atom(s) and a silicon-containing group having 1 to 20 carbon atom(s). $R^4$ is preferably an alkyl group having 1 to 4 carbon atom(s). Each of $R^5$, $R^6$, $R^7$, $R^8$, $R^9$, $R^{10}$, $R^{11}$ and $R^{12}$, which is selected from hydrogen, a hydrocarbon group and a silicon-containing group, may be same or different from each other, and adjacent groups may be bonded to each other to form a ring. Each of $R^{13}$ and $R^{14}$, which is selected from a hydrocarbon group and a silicon-containing group, may be same or different from each other, and adjacent groups may be bonded to each other to form a ring. M is Ti, Zr or Hf. Y is a carbon atom or a silicon atom, and Q is selected from a halogen atom, a hydrocarbon group, an anionic ligand and a neutral ligand capable of coordinating with a lone electron pair, which may be selected in the same combination or different combination, and j is an integer of 1 to 4.

In the production process of the invention, a preferred embodiment of the polymerization is that at least one monomer selected from propylene, α-olefins and polyenes is any of (1) a system of propylene alone, (2) a two-component system of propylene, and ethylene or 1-butene, and (3) a three-component system of propylene, ethylene and α-olefin having 4 or more carbon atoms.

BEST MODE FOR CARRYING OUT THE INVENTION

Hereinafter, a best mode for carrying out the invention will be described in detail. The invention is a process for producing a propylene polymer, which includes polymerizing at least one monomer selected from propylene, α-olefins and polyenes in the presence of a catalyst for olefin polymerization comprising:

(A) a bridged metallocene compound represented by the aforementioned General Formula [I]; and (B) one or more compound(s) selected from (b-1) an organoaluminumoxy compound (b-2) a compound which reacts with the bridged metallocene compound (A) to form an ion pair, and (b-3) an organoaluminum compound.

(Hereinafter 'process for producing propylene polymer' may be abbreviated as 'polymerization process'.)

Hereinafter, a bridged metallocene compound related to the invention, an olefin polymerization catalyst containing the bridged metallocene compound, a polymerization process in the presence of the olefin polymerization catalyst, a characteristic of properties of the obtainable propylene polymer, and the effect of the invention will be described in the order.

(A) Bridged Metallocene Compound (A) A bridged metallocene compound represented by the above-mentioned General Formula [I] has the following characteristics of the chemical structural formula, [m1] and [m2].

[m1] Of the two ligands, one is a cyclopentadienyl group having a substituent, (hereinafter, referred to as a 'substituted cyclopentadienyl group'), and the other is a fluorenyl group.

[m2] A transition metal (M in the above-mentioned General Formula [I]) constituting a metallocene compound is titanium, zirconium or hafnium.

Hereinafter, chemical structural features of the bridged metallocene compound related to the invention, such as a substituted cyclopentadienyl group, a fluorenyl group, a bridged part and the other features will be described in the order of precedence. Then, preferred bridged metallocene compounds having these chemical structural features will be exemplified.

[1] Substituted Cyclopentadienyl Group

For the parts of the substituted cyclopentadienyl group in the chemical structural formula represented by General Formula [I] above, which is used in the polymerization process of the invention, $R^1$ and $R^3$ each is a hydrogen atom, and $R^2$ and $R^4$ each is a hydrocarbon group (f1) having 1 to 20 carbon atom(s) or a silicon-containing group (f2) having 1 to 20 carbon atom(s).

The hydrocarbon group (f1) having 1 to 20 carbon atom(s) includes, besides an alkyl group, an alkenyl group, an alkynyl group or an aryl group which constitutes carbon and hydrogen only, a hydrocarbon group containing hetero atoms in which a part of the hydrogen atom directly bonded to the carbon atom of the above groups is replaced by a halogen atom, an oxygen-containing group, a nitrogen-containing group, or a silicon-containing group, and groups in which the two arbitrary hydrogen atoms adjacent to each other are substituted to form an alicyclic group. Examples of the hydrocarbon group (f1) include a straight-chained hydrocarbon group such as a methyl group, an ethyl group, an n-propyl group, an allyl group, an n-butyl group, an n-pentyl group, an n-hexyl group, an n-heptyl group, an n-octyl group, an n-nonyl group, an n-decanyl group; a branched hydrocarbon group such as an isopropyl group, a tert-butyl group, an amyl group, a 3-methylpentyl group, a 1,1-diethylpropyl group, a 1,1-dimethylbutyl group, a 1-methyl-1-propylbutyl group, a 1,1-propylbutyl group, a 1,1-dimethyl-2-methypropyl group, a 1-methyl-1-isopropyl-2-methylpropyl group; a cyclic saturated hydrocarbon group such as a cyclopentyl group, a cyclohexyl group, a cycloheptyl group, a cyclooctyl group, a norbornyl group, an adamantyl group; a cyclic unsaturated hydrocarbon group and the nuclear substitution thereof such as a phenyl group, a naphthyl group, a biphenyl group, a phenanthryl group, an anthracenyl group; a saturated hydrocarbon-containing group substituted by an aryl group, such as a benzyl group, a cumyl group; a heteroatom-containing hydrocarbon group such as a methoxy group, an ethoxy group, a phenoxy group, an N-methylamino group, a trifluoromethyl group, a tribromomethyl group, a pentafluoroethyl group, a pentafluorophenyl group.

The silicon-containing group having 1 to 20 carbon atom(s) (f2) is for example, a group of which the cyclic carbon on a cyclopentadienyl group directly bonds covalently via a silicon atom, and specifically is an alkylsilyl group and an arylsilyl group. The silicon-containing group (f2) may be exemplified by a trimethylsilyl group, a triethylsilyl group, a triphenylsilyl group, or the like.

$R^2$ is preferably a hydrocarbon group having 4 to 20 carbon atoms. The hydrocarbon group having 4 to 20 carbon atoms may be exemplified by the above-mentioned hydrocarbon group (f1) having 1 to 20 carbon atoms except a methyl group, an ethyl group and a propyl group.

In addition, $R^4$ in the General Formula [I] is preferably a hydrocarbon group having 1 to 10 carbon atom(s), and from the viewpoint that the molecular weight of the polymer produced can be increased, $R^4$ is more preferably an alkyl group having 1 to 4 carbon atom(s), for example, a methyl group, an ethyl group, an n-propyl group, an isopropyl group, an n-butyl group, an isobutyl group or a sec-butyl group, and particularly preferably a methyl group, an ethyl group or an n-propyl group.

The most preferred embodiment of (A) a cyclopentadienyl group of a bridged metallocene compound related to the invention is that $R^4$ is a hydrocarbon group having 2 to 4 carbon atoms and at the same time, $R^2$ is a bulky substituent in comparison with $R^4$ such as a tert-butyl group, a methylcyclohexyl group or a methyladamantyl group. Herein, the term 'bulky' means that the volume that the substituent occupies is large.

[2] Fluorenyl Group

In the polymerization process of the invention, $R^5$, $R^6$, $R^7$, $R^8$, $R^9$, $R^{10}$, $R^{11}$ and $R^{12}$ in a fluorenyl group moiety of the bridged metallocene compound represented by the above-mentioned General Formula [I], each may be an identical atom or an identical group selected from hydrogen, a hydrocarbon group, and a silicon-containing group, and they may be bonded to each other to form a ring. As the hydrocarbon group, the above-mentioned hydrocarbon group (f1) can be mentioned as the preferred embodiment, and as the silicon-containing group, the above-mentioned silicon-containing group (f2) can be mentioned as the preferred example. More preferred embodiment of the fluorenyl group is a fluorenyl group of which the $R^6$ and $R^{11}$ are not hydrogen atoms at the same time. Particularly preferred embodiment is a fluorenyl group of which the $R^6$ and $R^{11}$ are same atoms other than hydrogen or same groups.

[3] Covalently Bridging Part

The main-chain part of the bond linking a cyclopentadienyl group and a fluorenyl group is a covalently bridging divalency bond which contains one carbon atom or silicon atom. The important point in the polymerization of the invention is that a bridging atom Y of the covalently bridging part in the above-mentioned General Formula [I] has $R^{13}$ and $R^{14}$, which may be same or different from each other. $R^{13}$ and $R^{14}$ each is an atom or a group selected from a hydrocarbon group having 1 to 40 carbon atom(s) and a silicon-containing group having 1 to 40 carbon atom(s), and may be bonded to each other to form a ring. The hydrocarbon group and the silicon-containing group can be exemplified by the above-mentioned hydrocarbon group (f1), the silicon-containing group (f2), and groups in which the hydrogen atom in these molecules is replaced by an alkyl group, a cycloalkyl group, or an aryl group or the like.

In the production process of the invention, $R^{13}$ and $R^{14}$, which may be same or different from each other, may be an aryl group or a substituted aryl group. [Here, in the invention, the word "an aryl group" means a group constituted by an aromatic ring carbon and an aromatic hydrogen (sp2 type hydrogen) only, and the word "a substituted aryl group" is defined for a group obtained when at least one aromatic hydrogen (sp2 type hydrogen) in an aryl group is replaced by a group other than hydrogen]. By introducing an aryl group or a substituted aryl group to the bridging atom (Y), an olefin polymer having a high molecular weight can be effectively produced. Examples of the aryl group or the substituted aryl group include groups only constituted by an aromatic ring carbon and an aromatic hydrogen (sp2 type hydrogen) having 6 to 18 carbon atoms such as a phenyl group, a naphthyl group, an anthryl group or a phenanthryl group; and a substituted aryl group in which at least one aromatic hydrogen (sp2 type hydrogen) is replaced by a substituent, that is, an alkyl or aryl substituted aryl group having 7 to 30 carbon atoms such as a tolyl group, a xylyl group, a methylnaphthyl group, a biphenyl group or a terphenyl group, a fluoroaryl group having 6 to 20 carbon atoms such as a fluorophenyl group or a difluorophenyl group, a chloroaryl group having 6 to 20 carbon atoms such as a chlorophenyl group and a dichlorophenyl group, a bromoaryl group having 6 to 20 carbon atoms such as a bromophenyl group and a dibromophenyl group, an iodoaryl group having 6 to 20 carbon atoms such as an iodophenyl group and a diiodophenyl group, a chloroalkylaryl group having 7 to 40 carbon atoms such as a (trichloromethyl)phenyl group and bis(trichloromethyl)phenyl group, a bromoalkylaryl group having 7 to 40 carbon atoms such as a (tribromomethyl)phenyl group and a bis(tribromomethyl)phenyl group, an iodoalkylaryl group having 7 to 40 carbon atoms such as a (triiodomethyl)phenyl group and a bis(triiodomethyl)phenyl group, a fluoroalkylaryl group having 7 to 40 carbon atoms such as a (trifluoromethyl)phenyl group and a bis(trifluoromethyl)phenyl group. As for the substituted aryl group, a substituted phenyl group of which the substituent locates in meta-position or para-position is preferable.

$R^{13}$ and $R^{14}$ is preferably the group selected from an alkyl group having 1 to 5 carbon atom(s), a phenyl group, the substituted phenyl having 6 to 10 carbon atoms, and more preferably a group selected from a methyl group, a phenyl group, a tolyl group (=a methylphenyl group) and a (trifluoromethyl)phenyl group.

In addition, in the production process of the invention, when $R^4$ of the substituted cyclopentadienyl group is a methyl group, from the viewpoint of producing a polymer having a high melting point, a bridged metallocene compound of which the $R^6$ and $R^7$ are bonded to each other to form an aliphatic ring and $R^{10}$ and $R^{11}$ are bonded to each other to form an aliphatic ring is preferably used, and in order to achieve a high molecular weight as well as the high melting point, a bridged metallocene compound of which the $R^{13}$ and $R^{14}$ are both a substituted aryl group is preferably used. When $R^4$ is an ethyl group, from the viewpoint of achieving a high molecular weight according to the polymerization of the invention, a bridged metallocene compound of which the $R^{13}$ and $R^{14}$ are an aryl group or a substituted aryl group at the same time is preferably used. Furthermore, for the easiness of preparation of the bridged metallocene compound, generally, ones with same $R^{13}$ and $R^{14}$ is preferably used.

[4] Other Structural Features for Bridged Metallocene Compound

In the above-mentioned General Formula (I), M is Ti, Zr or Hf, preferably Zr or Hf. Q is selected from a halogen atom, a hydrocarbon group having 1 to 10 carbon atom(s), a neutral, conjugated or non-conjugated diene having 10 or less carbon atoms, an anionic ligand and a neutral ligand capable of coordinating with a lone electron pair, in the same combination or different combination. Specific examples of the halogen atom include a fluorine atom, a chlorine atoms, a bromine atom and an iodine atom, and specific examples of the hydrocarbon group include methyl, ethyl, n-propyl, isopropyl, 2-methylpropyl, 1,1-dimethylpropyl, 2,2-dimethylpropyl, 1,1-diethylpropy, 1-ethyl-1-methylpropyl, 1,1,2,2-tetramethylpropyl, sec-butyl, tert-butyl, 1,1-dimethylbutyl, 1,1,3-trimethylbutyl, neopentyl, cyclohexylmethyl, cyclohexyl, 1-methyl-1-cyclohexyl and the like. Specific examples of the neutral, conjugated or non-conjugated diene having 10 or less carbon atoms include s-cis- or s-trans-$\eta^4$-1,3-butadiene, s-cis- or s-trans-$\eta^4$-1,4-diphenyl-1,3-butadiene, s-cis- or s-trans-$\eta$4-3-methyl-1,3-pentadiene, s-cis- or s-trans-$\eta$4-1,4-dibenzyl-1,3-butadiene, s-cis- or s-trans-$\eta^4$-2,4-hexadiene, s-cis- or s-trans-$\eta^4$-1,3-pentadiene, s-cis- or s-trans-$\eta^4$-1,4-ditolyl-1,3-butadiene, s-cis- or s-trans-$\eta^4$-1,4-bis(trimethylsilyl)-1,3-butadiene and the like. Specific examples of the anionic ligand include an alkoxy group such as methoxy, tert-butoxy and phenoxy; a carboxylate group such as acetate and benzoate; a sulfonate group such as mesylate and tosilate; and the like. Specific examples of the neutral ligand capable of coordinating with a lone electron pair include an organic phosphorous compound such as trimethylphosphine, triethylphosphine, triphenyl phosphine and diphenyl methyl phosphine; ethers such as tetrahydrofuran, diethylether, dioxane and 1,2-dimethoxyethan; and the like. "j" is integer of 1 to 4, and when j is 2 or more, Q may be same or different from each other.

[5] Examples of Preferred Bridged Metallocene Compound

Hereinafter, specific examples of the metallocene compound represented by the above-mentioned General Formula [I] will be mentioned, but the invention is not to be limited in scope by those:

Isopropylidene(3-tert-butyl-5-ethylcyclopentadienyl)(fluorenyl)zirconium dichloride,
isopropylidene(3-tert-butyl-5-ethylcyclopentadienyl)(2,7-di-tert-butylfluorenyl)zirconium dichloride,
isopropylidene(3-tert-butyl-5-ethylcyclopentadienyl)(3,6-di-tert-butylfluorenyl)zirconium dichloride,
isopropylidene(3-tert-butyl-5-ethylcyclopentadienyl)(3,6-di-tert-butyl-2,7-dimethylfluorenyl)zirconium dichloride,
isopropylidene(3-tert-butyl-5-ethylcyclopentadienyl)(2,7-dimethylfluorenyl)zirconium dichloride,
isopropylidene(3-tert-butyl-5-ethylcyclopentadienyl)(2,7-diphenylfluorenyl)zirconium dichloride,
isopropylidene(3-tert-butyl-5-ethylcyclopentadienyl)(2,7-di(mesityl)fluorenyl)zirconium dichloride,
isopropylidene(3-tert-butyl-5-ethylcyclopentadienyl)(octamethyloctahydrodibenzofluorenyl)zirconium dichloride,
isopropylidene(3-tert-butyl-5-ethylcyclopentadienyl)(1,1,3,6,8,8-hexamethyl-1H,8H-dicyclopenta[b,H]fluorenyl)zirconium dichloride,
isopropylidene(3-tert-butyl-5-ethylcyclopentadienyl)(3,6-di-tert-butyl-2,7-mesitylfluorenyl)zirconium dichloride,
isopropylidene(3-tert-butyl-5-ethylcyclopentadienyl)(2,3,6,7-tetramethylfluorenyl)zirconium dichloride,
isopropylidene(3-tert-butyl-5-ethylcyclopentadienyl)(2,3,6,7-tetra-tert-butylfluorenyl)zirconium dichloride,
(methyl)(phenyl)methylene(3-tert-butyl-5-ethylcyclopentadienyl)(fluorenyl)zirconium dichloride,
(methyl)(phenyl)methylene(3-tert-butyl-5-ethylcyclopentadienyl)(2,7-di-tert-butylfluorenyl)zirconium dichloride,
(methyl)(phenyl)methylene(3-tert-butyl-5-ethylcyclopentadienyl)(3,6-di-tert-butylfluorenyl)zirconium dichloride,
(methyl)(phenyl)methylene(3-tert-butyl-5-ethylcyclopentadienyl)(3,6-di-tert-butyl-2,7-dimethylfluorenyl)zirconium dichloride,
(methyl)(phenyl)methylene(3-tert-butyl-5-ethylcyclopentadienyl)(2,7-dimethylfluorenyl)zirconium dichloride,
(methyl)(phenyl)methylene(3-tert-butyl-5-ethylcyclopentadienyl)(2,7-diphenylfluorenyl)zirconium dichloride,
(methyl)(phenyl)methylene(3-tert-butyl-5-ethylcyclopentadienyl)(2,7-di(mesityl)fluorenyl)zirconium dichloride,
(methyl)(phenyl)methylene(3-tert-butyl-5-ethylcyclopentadienyl)(octamethyloctahydrodibenzofluorenyl)zirconium dichloride,
(methyl)(phenyl)methylene(3-tert-butyl-5-ethylcyclopentadienyl)(1,1,3,6,8,8-hexamethyl-1H,8H-dicyclopenta[b,h]fluorenyl)zirconium dichloride,
(methyl)(phenyl)methylene(3-tert-butyl-5-ethylcyclopentadienyl)(3,6-di-tert-butyl-2,7-mesitylfluorenyl)zirconium dichloride,
(methyl)(phenyl)methylene(3-tert-butyl-5-ethylcyclopentadienyl)(2,3,6,7-tetramethylfluorenyl)zirconium dichloride,
(methyl)(phenyl)methylene(3-tert-butyl-5-ethylcyclopentadienyl)(2,3,6,7-tetra-tert-butylfluorenyl)zirconium dichloride,
diphenylmethylene(3-tert-butyl-5-ethylcyclopentadienyl)(fluorenyl)zirconium dichloride,
diphenylmethylene(3-tert-butyl-5-ethylcyclopentadienyl)(2,7-di-tert-butylfluorenyl)zirconium dichloride,
diphenylmethylene(3-tert-butyl-5-ethylcyclopentadienyl)(3,6-di-tert-butylfluorenyl)zirconium dichloride,
diphenylmethylene(3-tert-butyl-5-ethylcyclopentadienyl)(3,6-di-tert-butyl-2,7-dimethylfluorenyl)zirconium dichloride,
diphenylmethylene(3-tert-butyl-5-ethylcyclopentadienyl)(2,7-dimethylfluorenyl)zirconium dichloride,
diphenylmethylene(3-tert-butyl-5-ethylcyclopentadienyl)(2,7-diphenylfluorenyl)zirconium dichloride,
diphenylmethylene(3-tert-butyl-5-ethylcyclopentadienyl)(2,7-di(mesityl)fluorenyl)zirconium dichloride,
diphenylmethylene(3-tert-butyl-5-ethylcyclopentadienyl)(octamethyloctahydrodibenzofluorenyl)zirconium dichloride,
diphenylmethylene(3-tert-butyl-5-ethylcyclopentadienyl)(1,1,3,6,8,8-hexamethyl-1H,8H-dicyclopenta[b,h]fluorenyl)zirconium dichloride,
diphenylmethylene(3-tert-butyl-5-ethylcyclopentadienyl)(3,6-di-tert-butyl-2,7-mesitylfluorenyl)zirconium dichloride,
diphenylmethylene(3-tert-butyl-5-ethylcyclopentadienyl)(2,3,6,7-tetramethylfluorenyl)zirconium dichloride,
diphenylmethylene(3-tert-butyl-5-ethylcyclopentadienyl)(2,3,6,7-tetra-tert-butylfluorenyl)zirconium dichloride,
di(p-chlorophenyl)methylene(3-tert-butyl-5-ethylcyclopentadienyl)(fluorenyl)zirconium dichloride,
di(p-chlorophenyl)methylene(3-tert-butyl-5-ethylcyclopentadienyl)(2,7-di-tert-butylfluorenyl)zirconium dichloride,
di(p-chlorophenyl)methylene(3-tert-butyl-5-ethylcyclopentadienyl)(3,6-di-tert-butylfluorenyl)zirconium dichloride,
di(p-chlorophenyl)methylene(3-tert-butyl-5-ethylcyclopentadienyl)(3,6-di-tert-butyl-2,7-dimethylfluorenyl)zirconium dichloride,
di(p-chlorophenyl)methylene(3-tert-butyl-5-ethylcyclopentadienyl)(2,7-dimethylfluorenyl)zirconium dichloride,
di(p-chlorophenyl)methylene(3-tert-butyl-5-ethylcyclopentadienyl)(2,7-diphenylfluorenyl)zirconium dichloride,
di(p-chlorophenyl)methylene(3-tert-butyl-5-ethylcyclopentadienyl)(2,7-di(mesityl)fluorenyl)zirconium dichloride,
di(p-chlorophenyl)methylene(3-tert-butyl-5-ethylcyclopentadienyl)(octamethyloctahydrodibenzofluorenyl)zirconium dichloride,
di(p-chlorophenyl)methylene(3-tert-butyl-5-ethylcyclopentadienyl)(1,1,3,6,8,8-hexamethyl-1H,8H-dicyclopenta[b,h]fluorenyl)zirconium dichloride, di(p-chlorophenyl)methylene(3-tert-butyl-5-ethylcyclopentadienyl)(3,6-di-tert-butyl-2,7-mesitylfluorenyl)zirconium dichloride,
di(p-chlorophenyl)methylene(3-tert-butyl-5-ethylcyclopentadienyl)(2,3,6,7-tetramethylfluorenyl)zirconium dichloride,
di(p-chlorophenyl)methylene(3-tert-butyl-5-ethylcyclopentadienyl)(2,3,6,7-tetra-tert-butylfluorenyl)zirconium dichloride,
di(m-chlorophenyl)methylene(3-tert-butyl-5-ethylcyclopentadienyl)(fluorenyl)zirconium dichloride,
di(m-chlorophenyl)methylene(3-tert-butyl-5-ethylcyclopentadienyl)(2,7-di-tert-butylfluorenyl)zirconium dichloride,
di(m-chlorophenyl)methylene(3-tert-butyl-5-ethylcyclopentadienyl)(3,6-di-tert-butylfluorenyl)zirconium dichloride,
di(m-chlorophenyl)methylene(3-tert-butyl-5-ethylcyclopentadienyl)(3,6-di-tert-butyl-2,7-dimethylfluorenyl)zirconium dichloride,
di(m-chlorophenyl)methylene(3-tert-butyl-5-ethylcyclopentadienyl)(2,7-dimethylfluorenyl)zirconium dichloride,
di(m-chlorophenyl)methylene(3-tert-butyl-5-ethylcyclopentadienyl)(2,7-diphenylfluorenyl)zirconium dichloride,
di(m-chlorophenyl)methylene(3-tert-butyl-5-ethylcyclopentadienyl)(2,7-di(mesityl)fluorenyl)zirconium dichloride,
di(m-chlorophenyl)methylene(3-tert-butyl-5-ethylcyclopentadienyl)(octamethyloctahydrodibenzofluorenyl)zirconium dichloride,
di(m-chlorophenyl)methylene(3-tert-butyl-5-ethylcyclopentadienyl)(1,1,3,6,8,8-hexamethyl-1H,8H-dicyclopenta[b,h]fluorenyl)zirconium dichloride,
di(m-chlorophenyl)methylene(3-tert-butyl-5-ethylcyclopentadienyl)(3,6-di-tert-butyl-2,7-mesitylfluorenyl)zirconium dichloride,
di(m-chlorophenyl)methylene(3-tert-butyl-5-ethylcyclopentadienyl)(2,3,6,7-tetramethylfluorenyl)zirconium dichloride,
di(m-chlorophenyl)methylene(3-tert-butyl-5-ethylcyclopentadienyl)(2,3,6,7-tetra-tert-butylfluorenyl)zirconium dichloride,
di(m-trifluoromethylphenyl)methylene(3-tert-butyl-5-ethylcyclopentadienyl)(fluorenyl)zirconium dichloride,
di(m-trifluoromethylphenyl)methylene(3-tert-butyl-5-ethylcyclopentadienyl)(2,7-di-tert-butylfluorenyl)zirconium dichloride,
di(m-trifluoromethylphenyl)methylene(3-tert-butyl-5-ethylcyclopentadienyl)(3,6-di-tert-butylfluorenyl)zirconium dichloride,
di(m-trifluoromethylphenyl)methylene(3-tert-butyl-5-ethylcyclopentadienyl)(3,6-di-tert-butyl-2,7-dimethylfluorenyl)zirconium dichloride,
di(m-trifluoromethylphenyl)methylene(3-tert-butyl-5-ethylcyclopentadienyl)(2,7-dimethylfluorenyl)zirconium dichloride,
di(m-trifluoromethylphenyl)methylene(3-tert-butyl-5-ethylcyclopentadienyl)(2,7-diphenylfluorenyl)zirconium dichloride,
di(m-trifluoromethylphenyl)methylene(3-tert-butyl-5-ethylcyclopentadienyl)(2,7-di(mesityl)fluorenyl)zirconium dichloride,
di(m-trifluoromethylphenyl)methylene(3-tert-butyl-5-ethylcyclopentadienyl)(octamethyloctahydrodibenzofluorenyl)zirconium dichloride,
di(m-trifluoromethylphenyl)methylene(3-tert-butyl-5-ethylcyclopentadienyl)(1,1,3,6,8,8-hexamethyl-1H,8H-dicyclopenta[b,h]fluorenyl)zirconium dichloride,
di(m-trifluoromethylphenyl)methylene(3-tert-butyl-5-ethylcyclopentadienyl)(3,6-di-tert-butyl-2,7-mesitylfluorenyl)zirconium dichloride,
di(m-trifluoromethylphenyl)methylene(3-tert-butyl-5-ethylcyclopentadienyl)(2,3,6,7-tetramethylfluorenyl)zirconium dichloride,
di(m-trifluoromethylphenyl)methylene(3-tert-butyl-5-ethylcyclopentadienyl)(2,3,6,7-tetra-tert-butylfluorenyl)zirconium dichloride,
di(p-trifluoromethylphenyl)methylene(3-tert-butyl-5-ethylcyclopentadienyl)(fluorenyl)zirconium dichloride,
di(p-trifluoromethylphenyl)methylene(3-tert-butyl-5-ethylcyclopentadienyl)(2,7-di-tert-butylfluorenyl)zirconium dichloride,
di(p-trifluoromethylphenyl)methylene(3-tert-butyl-5-ethylcyclopentadienyl)(3,6-di-tert-butylfluorenyl)zirconium dichloride,
di(p-trifluoromethylphenyl)methylene(3-tert-butyl-5-ethylcyclopentadienyl)(3,6-di-tert-butyl-2,7-dimethylfluorenyl)zirconium dichloride,
di(p-trifluoromethylphenyl)methylene(3-tert-butyl-5-ethylcyclopentadienyl)(2,7-dimethylfluorenyl)zirconium dichloride,
di(p-trifluoromethylphenyl)methylene(3-tert-butyl-5-ethylcyclopentadienyl)(2,7-diphenylfluorenyl)zirconium dichloride,
di(p-trifluoromethylphenyl)methylene(3-tert-butyl-5-ethylcyclopentadienyl)(2,7-di(mesityl)fluorenyl)zirconium dichloride,
di(p-trifluoromethylphenyl)methylene(3-tert-butyl-5-ethylcyclopentadienyl)(octamethyloctahydrodibenzofluorenyl)zirconium dichloride,
di(p-trifluoromethylphenyl)methylene(3-tert-butyl-5-ethylcyclopentadienyl)(1,1,3,6,8,8-hexamethyl-1H,8H-dicyclopenta[b,h]fluorenyl)zirconium dichloride,
di(p-trifluoromethylphenyl)methylene(3-tert-butyl-5-ethylcyclopentadienyl)(3,6-di-tert-butyl-2,7-mesitylfluorenyl)zirconium dichloride,
di(p-trifluoromethylphenyl)methylene(3-tert-butyl-5-ethylcyclopentadienyl)(2,3,6,7-tetramethylfluorenyl)zirconium dichloride,
di(p-trifluoromethylphenyl)methylene(3-tert-butyl-5-ethylcyclopentadienyl)(2,3,6,7-tetra-tert-butylfluorenyl)zirconium dichloride,
di(p-tolyl)methylene(3-tert-butyl-5-ethylcyclopentadienyl)(fluorenyl)zirconium dichloride,
di(p-tolyl)methylene(3-tert-butyl-5-ethylcyclopentadienyl)(2,7-di-tert-butylfluorenyl)zirconium dichloride,
di(p-tolyl)methylene(3-tert-butyl-5-ethylcyclopentadienyl)(3,6-di-tert-butylfluorenyl)zirconium dichloride,
di(p-tolyl)methylene(3-tert-butyl-5-ethylcyclopentadienyl)(3,6-di-tert-butyl-2,7-dimethylfluorenyl)zirconium dichloride,
di(p-tolyl)methylene(3-tert-butyl-5-ethylcyclopentadienyl)(2,7-dimethylfluorenyl)zirconium dichloride,
di(p-tolyl)methylene(3-tert-butyl-5-ethylcyclopentadienyl)(2,7-diphenylfluorenyl)zirconium dichloride,
di(p-tolyl)methylene(3-tert-butyl-5-ethylcyclopentadienyl)(2,7-di(mesityl)fluorenyl)zirconium dichloride,
di(p-tolyl)methylene(3-tert-butyl-5-ethylcyclopentadienyl)(octamethyloctahydrodibenzofluorenyl)zirconium dichloride,
di(p-tolyl)methylene(3-tert-butyl-5-ethylcyclopentadienyl)(1,1,3,6,8,8-hexamethyl-1H,8H-dicyclopenta[b,h]fluorenyl)zirconium dichloride, di(p-tolyl)methylene(3-tert-butyl-5-ethylcyclopentadienyl)(3,6-di-tert-butyl-2,7-mesitylfluorenyl)zirconium dichloride,
di(p-tolyl)methylene(3-tert-butyl-5-ethylcyclopentadienyl)(2,3,6,7-tetramethylfluorenyl)zirconium dichloride,
di(p-tolyl)methylene(3-tert-butyl-5-ethylcyclopentadienyl)(2,3,6,7-tetra-tert-butylfluorenyl)zirconium dichloride,
isopropylidene(3-tert-butyl-5-n-propylcyclopentadienyl)(fluorenyl)zirconium dichloride,
isopropylidene(3-tert-butyl-5-n-propylcyclopentadienyl)(2,7-di-tert-butylfluorenyl)zirconium dichloride,
isopropylidene(3-tert-butyl-5-n-propylcyclopentadienyl)(3,6-di-tert-butylfluorenyl)zirconium dichloride,
isopropylidene(3-tert-butyl-5-n-propylcyclopentadienyl)(3,6-di-tert-butyl-2,7-dimethylfluorenyl)zirconium dichloride,
isopropylidene(3-tert-butyl-5-n-propylcyclopentadienyl)(2,7-dimethylfluorenyl)zirconium dichloride,
isopropylidene(3-tert-butyl-5-n-propylcyclopentadienyl)(2,7-diphenylfluorenyl)zirconium dichloride,
isopropylidene(3-tert-butyl-5-n-propylcyclopentadienyl)(2,7-di(mesityl)fluorenyl)zirconium dichloride,
isopropylidene(3-tert-butyl-5-n-propylcyclopentadienyl)(octamethyloctahydrodibenzofluorenyl)zirconium dichloride,
isopropylidene(3-tert-butyl-5-n-propylcyclopentadienyl)(1,1,3,6,8,8-hexamethyl-1H,8H-dicyclopenta[b,h]fluorenyl)zirconium dichloride,
isopropylidene(3-tert-butyl-5-n-propylcyclopentadienyl)(3,6-di-tert-butyl-2,7-mesitylfluorenyl)zirconium dichloride,
isopropylidene(3-tert-butyl-5-n-propylcyclopentadienyl)(2,3,6,7-tetramethylfluorenyl)zirconium dichloride,
isopropylidene(3-tert-butyl-5-n-propylcyclopentadienyl)(2,3,6,7-tetra-tert-butylfluorenyl)zirconium dichloride,
(methyl)(phenyl)methylene(3-tert-butyl-5-n-propylcyclopentadienyl)(fluorenyl)zirconium dichloride,
(methyl)(phenyl)methylene(3-tert-butyl-5-n-propylcyclopentadienyl)(2,7-di-tert-butylfluorenyl)zirconium dichloride,
(methyl)(phenyl)methylene(3-tert-butyl-5-n-propylcyclopentadienyl)(3,6-di-tert-butylfluorenyl)zirconium dichloride,
(methyl)(phenyl)methylene(3-tert-butyl-5-n-propylcyclopentadienyl)(3,6-di-tert-butyl-2,7-dimethylfluorenyl)zirconium dichloride,
(methyl)(phenyl)methylene(3-tert-butyl-5-n-propylcyclopentadienyl)(2,7-dimethylfluorenyl)zirconium dichloride,
(methyl)(phenyl)methylene(3-tert-butyl-5-n-propylcyclopentadienyl)(2,7-diphenylfluorenyl)zirconium dichloride,
(methyl)(phenyl)methylene(3-tert-butyl-5-n-propylcyclopentadienyl)(2,7-di(mesityl)fluorenyl)zirconium dichloride,
(methyl)(phenyl)methylene(3-tert-butyl-5-n-propylcyclopentadienyl)(octamethyloctahydrodibenzofluorenyl)zirconium dichloride,
(methyl)(phenyl)methylene(3-tert-butyl-5-n-propylcyclopentadienyl)(1,1,3,6,8,8-hexamethyl-1H,8H-dicyclopenta[b,h]fluorenyl)zirconium dichloride,
(methyl)(phenyl)methylene(3-tert-butyl-5-n-propylcyclopentadienyl)(3,6-di-tert-butyl-2,7-mesitylfluorenyl)zirconium dichloride,
(methyl)(phenyl)methylene(3-tert-butyl-5-n-propylcyclopentadienyl)(2,3,6,7-tetramethylfluorenyl)zirconium dichloride,
(methyl)(phenyl)methylene(3-tert-butyl-5-n-propylcyclopentadienyl)(2,3,6,7-tetra-tert-butylfluorenyl)zirconium dichloride,
diphenylmethylene(3-tert-butyl-5-n-propylcyclopentadienyl)(fluorenyl)zirconium dichloride,
diphenylmethylene(3-tert-butyl-5-n-propylcyclopentadienyl)(2,7-di-tert-butylfluorenyl)zirconium dichloride,
diphenylmethylene(3-tert-butyl-5-n-propylcyclopentadienyl)(3,6-di-tert-butylfluorenyl)zirconium dichloride,
diphenylmethylene(3-tert-butyl-5-n-propylcyclopentadienyl)(3,6-di-tert-butyl-2,7-dimethylfluorenyl)zirconium dichloride,
diphenylmethylene(3-tert-butyl-5-n-propylcyclopentadienyl)(2,7-dimethylfluorenyl)zirconium dichloride,
diphenylmethylene(3-tert-butyl-5-n-propylcyclopentadienyl)(2,7-diphenylfluorenyl)zirconium dichloride,
diphenylmethylene(3-tert-butyl-5-n-propylcyclopentadienyl)(2,7-di(mesityl)fluorenyl)zirconium dichloride,
diphenylmethylene(3-tert-butyl-5-n-propylcyclopentadienyl)(octamethyloctahydrodibenzofluorenyl)zirconium dichloride,
diphenylmethylene(3-tert-butyl-5-n-propylcyclopentadienyl)(1,1,3,6,8,8-hexamethyl-1H,8H-dicyclopenta[b,h]fluorenyl)zirconium dichloride,
diphenylmethylene(3-tert-butyl-5-n-propylcyclopentadienyl)(3,6-di-tert-butyl-2,7-mesitylfluorenyl)zirconium dichloride,
diphenylmethylene(3-tert-butyl-5-n-propylcyclopentadienyl)(2,3,6,7-tetramethylfluorenyl)zirconium dichloride,
diphenylmethylene(3-tert-butyl-5-n-propylcyclopentadienyl)(2,3,6,7-tetra-tert-butylfluorenyl)zirconium dichloride,
di(p-chlorophenyl)methylene(3-tert-butyl-5-n-propylcyclopentadienyl)(fluorenyl)zirconium dichloride,
di(p-chlorophenyl)methylene(3-tert-butyl-5-n-propylcyclopentadienyl)(2,7-di-tert-butylfluorenyl)zirconium dichloride,
di(p-chlorophenyl)methylene(3-tert-butyl-5-n-propylcyclopentadienyl)(3,6-di-tert-butylfluorenyl)zirconium dichloride,
di(p-chlorophenyl)methylene(3-tert-butyl-5-n-propylcyclopentadienyl)(3,6-di-tert-butyl-2,7-dimethylfluorenyl)zirconium dichloride,
di(p-chlorophenyl)methylene(3-tert-butyl-5-n-propylcyclopentadienyl)(2,7-dimethylfluorenyl)zirconium dichloride,
di(p-chlorophenyl)methylene(3-tert-butyl-5-n-propylcyclopentadienyl)(2,7-diphenylfluorenyl)zirconium dichloride,
di(p-chlorophenyl)methylene(3-tert-butyl-5-n-propylcyclopentadienyl)(2,7-di(mesityl)fluorenyl)zirconium dichloride,
di(p-chlorophenyl)methylene(3-tert-butyl-5-n-propylcyclopentadienyl)(octamethyloctahydrodibenzofluorenyl)zirconium dichloride,
di(p-chlorophenyl)methylene(3-tert-butyl-5-n-propylcyclopentadienyl)(1,1,3,6,8,8-hexamethyl-1H,8H-dicyclopenta[b,h]fluorenyl)zirconium dichloride,
di(p-chlorophenyl)methylene(3-tert-butyl-5-n-propylcyclopentadienyl)(3,6-di-tert-butyl-2,7-mesitylfluorenyl)zirconium dichloride,
di(p-chlorophenyl)methylene(3-tert-butyl-5-n-propylcyclopentadienyl)(2,3,6,7-tetramethylfluorenyl)zirconium dichloride,
di(p-chlorophenyl)methylene(3-tert-butyl-5-n-propylcyclopentadienyl)(2,3,6,7-tetra-tert-butylfluorenyl)zirconium dichloride,
di(m-chlorophenyl)methylene(3-tert-butyl-5-n-propylcyclopentadienyl)(fluorenyl)zirconium dichloride,
di(m-chlorophenyl)methylene(3-tert-butyl-5-n-propylcyclopentadienyl)(2,7-di-tert-butylfluorenyl)zirconium dichloride, di(m-chlorophenyl)methylene(3-tert-butyl-5-n-propylcyclopentadienyl)(3,6-di-tert-butylfluorenyl)zirconium dichloride, di(m-chlorophenyl)methylene(3-tert-butyl-5-n-propylcyclopentadienyl)(3,6-di-tert-butyl-2,7-dimethylfluorenyl)zirconium dichloride, di(m-chlorophenyl)methylene(3-tert-butyl-5-n-propylcyclopentadienyl)(2,7-dimethylfluorenyl)zirconium dichloride, di(m-chlorophenyl)methylene(3-tert-butyl-5-n-propylcyclopentadienyl)(2,7-diphenylfluorenyl)zirconium dichloride, di(m-chlorophenyl)methylene(3-tert-butyl-5-n-propylcyclopentadienyl)(2,7-di(mesityl)fluorenyl)zirconium dichloride, di(m-chlorophenyl)methylene(3-tert-butyl-5-n-propylcyclopentadienyl)(octamethyloctahydrodibenzofluorenyl)zirconium dichloride, di(m-chlorophenyl)methylene(3-tert-butyl-5-n-propylcyclopentadienyl)(1,1,3,6,8,8-hexamethyl-1H,8H-dicyclopenta[b,h]fluorenyl)zirconium dichloride, di(m-chlorophenyl)methylene(3-tert-butyl-5-n-propylcyclopentadienyl)(3,6-di-tert-butyl-2,7-mesitylfluorenyl)zirconium dichloride, di(m-chlorophenyl)methylene(3-tert-butyl-5-n-propylcyclopentadienyl)(2,3,6,7-tetramethylfluorenyl)zirconium dichloride, di(m-chlorophenyl)methylene(3-tert-butyl-5-n-propylcyclopentadienyl)(2,3,6,7-tetra-tert-butylfluorenyl)zirconium dichloride, di(m-trifluoromethylphenyl)methylene(3-tert-butyl-5-n-propylcyclopentadienyl)(fluorenyl)zirconium dichloride, di(m-trifluoromethylphenyl)methylene(3-tert-butyl-5-n-propylcyclopentadienyl)(2,7-di-tert-butylfluorenyl)zirconium dichloride, di(m-trifluoromethylphenyl)methylene(3-tert-butyl-5-n-propylcyclopentadienyl)(3,6-di-tert-butylfluorenyl)zirconium dichloride, di(m-trifluoromethylphenyl)methylene(3-tert-butyl-5-n-propylcyclopentadienyl)(3,6-di-tert-butyl-2,7-dimethylfluorenyl) zirconium dichloride, di(m-trifluoromethylphenyl)methylene(3-tert-butyl-5-n-propylcyclopentadienyl)(2,7-dimethylfluorenyl)zirconium dichloride, di(m-trifluoromethylphenyl)methylene(3-tert-butyl-5-n-propylcyclopentadienyl)(2,7-diphenylfluorenyl)zirconium dichloride, di(m-trifluoromethylphenyl)methylene(3-tert-butyl-5-n-propylcyclopentadienyl)(2,7-di(mesityl)fluorenyl)zirconium dichloride, di(m-trifluoromethylphenyl)methylene(3-tert-butyl-5-n-propylcyclopentadienyl)(octamethyloctahydrodibenzofluorenyl)zirconium dichloride, di(m-trifluoromethylphenyl)methylene(3-tert-butyl-5-n-propylcyclopentadienyl)(1,1,3,6,8,8-hexamethyl-1H,8H-dicyclopenta[b,h]fluorenyl)zirconium dichloride, di(m-trifluoromethylphenyl)methylene(3-tert-butyl-5-n-propylcyclopentadienyl)(3,6-di-tert-butyl-2,7-mesitylfluorenyl)zirconium dichloride, di(m-trifluoromethylphenyl)methylene(3-tert-butyl-5-n-propylcyclopentadienyl)(2,3,6,7-tetramethylfluorenyl)zirconium dichloride, di(m-trifluoromethylphenyl)methylene(3-tert-butyl-5-n-propylcyclopentadienyl)(2,3,6,7-tetra-tert-butylfluorenyl)zirconium dichloride, di(p-trifluoromethylphenyl)methylene(3-tert-butyl-5-n-propylcyclopentadienyl)(fluorenyl)zirconium dichloride, di(p-trifluoromethylphenyl)methylene(3-tert-butyl-5-n-propylcyclopentadienyl)(2,7-di-tert-butylfluorenyl)zirconium dichloride, di(p-trifluoromethylphenyl)methylene(3-tert-butyl-5-n-propylcyclopentadienyl)(3,6-di-tert-butylfluorenyl)zirconium dichloride, di(p-trifluoromethylphenyl)methylene(3-tert-butyl-5-n-propylcyclopentadienyl)(3,6-di-tert-butyl-2,7-dimethylfluorenyl)zirconium dichloride, di(p-trifluoromethylphenyl)methylene(3-tert-butyl-5-n-propylcyclopentadienyl)(2,7-dimethylfluorenyl)zirconium dichloride, di(p-trifluoromethylphenyl)methylene(3-tert-butyl-5-n-propylcyclopentadienyl)(2,7-diphenylfluorenyl)zirconium dichloride, di(p-trifluoromethylphenyl)methylene(3-tert-butyl-5-n-propylcyclopentadienyl)(2,7-di(mesityl)fluorenyl)zirconium dichloride, di(p-trifluoromethylphenyl)methylene(3-tert-butyl-5-n-propylcyclopentadienyl)(octamethyloctahydrodibenzofluorenyl)zirconium dichloride, di(p-trifluoromethylphenyl)methylene(3-tert-butyl-5-n-propylcyclopentadienyl)(1,1,3,6,8,8-hexamethyl-1H,8H-dicyclopenta[b,h]fluorenyl)zirconium dichloride, di(p-trifluoromethylphenyl)methylene(3-tert-butyl-5-n-propylcyclopentadienyl)(3,6-di-tert-butyl-2,7-mesitylfluorenyl)zirconium dichloride, di(p-trifluoromethylphenyl)methylene(3-tert-butyl-5-n-propylcyclopentadienyl)(2,3,6,7-tetramethylfluorenyl)zirconium dichloride, di(p-trifluoromethylphenyl)methylene(3-tert-butyl-5-n-propylcyclopentadienyl)(2,3,6,7-tetra-tert-butylfluorenyl)zirconium dichloride, di(p-tolyl)methylene(3-tert-butyl-5-n-propylcyclopentadienyl)(fluorenyl)zirconium dichloride, di(p-tolyl)methylene(3-tert-butyl-5-n-propylcyclopentadienyl)(2,7-di-tert-butylfluorenyl)zirconium dichloride, di(p-tolyl)methylene(3-tert-butyl-5-n-propylcyclopentadienyl)(3,6-di-tert-butylfluorenyl)zirconium dichloride, di(p-tolyl)methylene(3-tert-butyl-5-n-propylcyclopentadienyl)(3,6-di-tert-butyl-2,7-dimethylfluorenyl)zirconium dichloride, di(p-tolyl)methylene(3-tert-butyl-5-n-propylcyclopentadienyl)(2,7-dimethylfluorenyl)zirconium dichloride, di(p-tolyl)methylene(3-tert-butyl-5-n-propylcyclopentadienyl)(2,7-diphenylfluorenyl)zirconium dichloride, di(p-tolyl)methylene(3-tert-butyl-5-n-propylcyclopentadienyl)(2,7-di(mesityl)fluorenyl)zirconium dichloride, di(p-tolyl)methylene(3-tert-butyl-5-n-propylcyclopentadienyl)(octamethyloctahydrodibenzofluorenyl)zirconium dichloride, di(p-tolyl)methylene(3-tert-butyl-5-n-propylcyclopentadienyl)(1,1,3,6,8,8-hexamethyl-1H,8H-dicyclopenta[b,h]fluorenyl)zirconium dichloride, di(p-tolyl)methylene(3-tert-butyl-5-n-propylcyclopentadienyl)(3,6-di-tert-butyl-2,7-mesitylfluorenyl)zirconium dichloride, di(p-tolyl)methylene(3-tert-butyl-5-n-propylcyclopentadienyl)(2,3,6,7-tetramethylfluorenyl)zirconium dichloride, di(p-tolyl)methylene(3-tert-butyl-5-n-propylcyclopentadienyl)(2,3,6,7-tetra-tert-butylfluorenyl)zirconium dichloride, isopropylidene(3-tert-butyl-5-n-isopropylcyclopentadienyl)(fluorenyl)zirconium dichloride, isopropylidene(3-tert-butyl-5-n-isopropylcyclopentadienyl)(2,7-di-tert-butylfluorenyl)zirconium dichloride, isopropylidene(3-tert-butyl-5-n-isopropylcyclopentadienyl)(3,6-di-tert-butylfluorenyl)zirconium dichloride,
isopropylidene(3-tert-butyl-5-n-isopropylcyclopentadienyl)(3,6-di-tert-butyl-2,7-dimethylfluorenyl)zirconium dichloride,
isopropylidene(3-tert-butyl-5-n-isopropylcyclopentadienyl)(2,7-dimethylfluorenyl)zirconium dichloride,
isopropylidene(3-tert-butyl-5-n-isopropylcyclopentadienyl)(2,7-diphenylfluorenyl)zirconium dichloride,
isopropylidene(3-tert-butyl-5-n-isopropylcyclopentadienyl)(2,7-di(mesityl)fluorenyl)zirconium dichloride,
isopropylidene(3-tert-butyl-5-n-isopropylcyclopentadienyl)(octamethyloctahydrodibenzofluorenyl)zirconium dichloride,
isopropylidene(3-tert-butyl-5-n-isopropylcyclopentadienyl)(1,1,3,6,8,8-hexamethyl-1H,8H-dicyclopenta[b,h]fluorenyl)zirconium dichloride,
isopropylidene(3-tert-butyl-5-n-isopropylcyclopentadienyl)(3,6-di-tert-butyl-2,7-mesitylfluorenyl)zirconium dichloride,
isopropylidene(3-tert-butyl-5-n-isopropylcyclopentadienyl)(2,3,6,7-tetramethylfluorenyl)zirconium dichloride,
isopropylidene(3-tert-butyl-5-n-isopropylcyclopentadienyl)(2,3,6,7-tetra-tert-butylfluorenyl)zirconium dichloride,
(methyl)(phenyl)methylene(3-tert-butyl-5-n-isopropylcyclopentadienyl)(fluorenyl)zirconium dichloride,
(methyl)(phenyl)methylene(3-tert-butyl-5-n-isopropylcyclopentadienyl)(2,7-di-tert-butylfluorenyl)zirconium dichloride,
(methyl)(phenyl)methylene(3-tert-butyl-5-n-isopropylcyclopentadienyl)(3,6-di-tert-butylfluorenyl)zirconium dichloride,
(methyl)(phenyl)methylene(3-tert-butyl-5-n-isopropylcyclopentadienyl)(3,6-di-tert-butyl-2,7-dimethylfluorenyl)zirconium dichloride,
(methyl)(phenyl)methylene(3-tert-butyl-5-n-isopropylcyclopentadienyl)(2,7-dimethylfluorenyl)zirconium dichloride,
(methyl)(phenyl)methylene(3-tert-butyl-5-n-isopropylcyclopentadienyl)(2,7-diphenylfluorenyl)zirconium dichloride,
(methyl)(phenyl)methylene(3-tert-butyl-5-n-isopropylcyclopentadienyl)(2,7-di(mesityl)fluorenyl)zirconium dichloride,
(methyl)(phenyl)methylene(3-tert-butyl-5-n-isopropylcyclopentadienyl)(octamethyloctahydrodibenzofluorenyl)zirconium dichloride,
(methyl)(phenyl)methylene(3-tert-butyl-5-n-isopropylcyclopentadienyl)(1,1,3,6,8,8-hexamethyl-1H,8H-dicyclopenta[b,h]fluorenyl)zirconium dichloride,
(methyl)(phenyl)methylene(3-tert-butyl-5-n-isopropylcyclopentadienyl)(3,6-di-tert-butyl-2,7-mesitylfluorenyl)zirconium dichloride,
(methyl)(phenyl)methylene(3-tert-butyl-5-n-isopropylcyclopentadienyl)(2,3,6,7-tetramethylfluorenyl)zirconium dichloride,
(methyl)(phenyl)methylene(3-tert-butyl-5-n-isopropylcyclopentadienyl)(2,3,6,7-tetra-tert-butylfluorenyl)zirconium dichloride,
diphenylmethylene(3-tert-butyl-5-n-isopropylcyclopentadienyl)(fluorenyl)zirconium dichloride,
diphenylmethylene(3-tert-butyl-5-n-isopropylcyclopentadienyl)(2,7-di-tert-butylfluorenyl)zirconium dichloride,
diphenylmethylene(3-tert-butyl-5-n-isopropylcyclopentadienyl)(3,6-di-tert-butylfluorenyl)zirconium dichloride,
diphenylmethylene(3-tert-butyl-5-n-isopropylcyclopentadienyl)(3,6-di-tert-butyl-2,7-dimethylfluorenyl)zirconium dichloride,
diphenylmethylene(3-tert-butyl-5-n-isopropylcyclopentadienyl)(2,7-dimethylfluorenyl)zirconium dichloride,
diphenylmethylene(3-tert-butyl-5-n-isopropylcyclopentadienyl)(2,7-diphenylfluorenyl)zirconium dichloride,
diphenylmethylene(3-tert-butyl-5-n-isopropylcyclopentadienyl)(2,7-di(mesityl)fluorenyl)zirconium dichloride,
diphenylmethylene(3-tert-butyl-5-n-isopropylcyclopentadienyl)(octamethyloctahydrodibenzofluorenyl)zirconium dichloride,
diphenylmethylene(3-tert-butyl-5-n-isopropylcyclopentadienyl)(1,1,3,6,8,8-hexamethyl-1H,8H-dicyclopenta[b,h]fluorenyl)zirconium dichloride,
diphenylmethylene(3-tert-butyl-5-n-isopropylcyclopentadienyl)(3,6-di-tert-butyl-2,7-mesitylfluorenyl)zirconium dichloride,
diphenylmethylene(3-tert-butyl-5-n-isopropylcyclopentadienyl)(2,3,6,7-tetramethylfluorenyl)zirconium dichloride,
diphenylmethylene(3-tert-butyl-5-n-isopropylcyclopentadienyl)(2,3,6,7-tetra-tert-butylfluorenyl)zirconium dichloride,
di(p-chlorophenyl)methylene(3-tert-butyl-5-n-isopropylcyclopentadienyl)(fluorenyl)zirconium dichloride,
di(p-chlorophenyl)methylene(3-tert-butyl-5-n-isopropylcyclopentadienyl)(2,7-di-tert-butylfluorenyl)zirconium dichloride,
di(p-chlorophenyl)methylene(3-tert-butyl-5-n-isopropylcyclopentadienyl)(3,6-di-tert-butylfluorenyl)zirconium dichloride,
di(p-chlorophenyl)methylene(3-tert-butyl-5-n-isopropylcyclopentadienyl)(3,6-di-tert-butyl-2,7-dimethylfluorenyl)zirconium dichloride,
di(p-chlorophenyl)methylene(3-tert-butyl-5-n-isopropylcyclopentadienyl)(2,7-dimethylfluorenyl)zirconium dichloride,
di(p-chlorophenyl)methylene(3-tert-butyl-5-n-isopropylcyclopentadienyl)(2,7-diphenylfluorenyl)zirconium dichloride,
di(p-chlorophenyl)methylene(3-tert-butyl-5-n-isopropylcyclopentadienyl)(2,7-di(mesityl)fluorenyl)zirconium dichloride,
di(p-chlorophenyl)methylene(3-tert-butyl-5-n-isopropylcyclopentadienyl)(octamethyloctahydrodibenzofluorenyl)zirconium dichloride,
di(p-chlorophenyl)methylene(3-tert-butyl-5-n-isopropylcyclopentadienyl)(1,1,3,6,8,8-hexamethyl-1H,8H-dicyclopenta[b,h]fluorenyl)zirconium dichloride,
di(p-chlorophenyl)methylene(3-tert-butyl-5-n-isopropylcyclopentadienyl)(3,6-di-tert-butyl-2,7-mesitylfluorenyl)zirconium dichloride,
di(p-chlorophenyl)methylene(3-tert-butyl-5-n-isopropylcyclopentadienyl)(2,3,6,7-tetramethylfluorenyl)zirconium dichloride,
di(p-chlorophenyl)methylene(3-tert-butyl-5-n-isopropylcyclopentadienyl)(2,3,6,7-tetra-tert-butylfluorenyl)zirconium dichloride,
di(m-chlorophenyl)methylene(3-tert-butyl-5-n-isopropylcyclopentadienyl)(fluorenyl)zirconium dichloride,
di(m-chlorophenyl)methylene(3-tert-butyl-5-n-isopropylcyclopentadienyl)(2,7-di-tert-butylfluorenyl)zirconium dichloride,
di(m-chlorophenyl)methylene(3-tert-butyl-5-n-isopropylcyclopentadienyl)(3,6-di-tert-butylfluorenyl)zirconium dichloride, di(m-chlorophenyl)methylene(3-tert-butyl-5-n-isopropylcyclopentadienyl)(3,6-di-tert-butyl-2,7-dimethylfluorenyl)zirconium dichloride,
di(m-chlorophenyl)methylene(3-tert-butyl-5-n-isopropylcyclopentadienyl)(2,7-dimethylfluorenyl)zirconium dichloride,
di(m-chlorophenyl)methylene(3-tert-butyl-5-n-isopropylcyclopentadienyl)(2,7-diphenylfluorenyl)zirconium dichloride,
di(m-chlorophenyl)methylene(3-tert-butyl-5-n-isopropylcyclopentadienyl)(2,7-di(mesityl)fluorenyl)zirconium dichloride,
di(m-chlorophenyl)methylene(3-tert-butyl-5-n-isopropylcyclopentadienyl)(octamethyloctahydrodibenzofluorenyl)zirconium dichloride,
di(m-chlorophenyl)methylene(3-tert-butyl-5-n-isopropylcyclopentadienyl)(1,1,3,6,8,8-hexamethyl-1H,8H-dicyclopenta[b,h]fluorenyl)zirconium dichloride,
di(m-chlorophenyl)methylene(3-tert-butyl-5-n-isopropylcyclopentadienyl)(3,6-di-tert-butyl-2,7-mesitylfluorenyl)zirconium dichloride,
di(m-chlorophenyl)methylene(3-tert-butyl-5-n-isopropylcyclopentadienyl)(2,3,6,7-tetramethylfluorenyl)zirconium dichloride,
di(m-chlorophenyl)methylene(3-tert-butyl-5-n-isopropylcyclopentadienyl)(2,3,6,7-tetra-tert-butylfluorenyl)zirconium dichloride,
di(m-trifluoromethylphenyl)methylene(3-tert-butyl-5-n-isopropylcyclopentadienyl)(fluorenyl)zirconium dichloride,
di(m-trifluoromethylphenyl)methylene(3-tert-butyl-5-n-isopropylcyclopentadienyl)(2,7-di-tert-butylfluorenyl)zirconium dichloride,
di(m-trifluoromethylphenyl)methylene(3-tert-butyl-5-n-isopropylcyclopentadienyl)(3,6-di-tert-butylfluorenyl)zirconium dichloride,
di(m-trifluoromethylphenyl)methylene(3-tert-butyl-5-n-isopropylcyclopentadienyl)(3,6-di-tert-butyl-2,7-dimethylfluorenyl)zirconium dichloride,
di(m-trifluoromethylphenyl)methylene(3-tert-butyl-5-n-isopropylcyclopentadienyl)(2,7-dimethylfluorenyl)zirconium dichloride,
di(m-trifluoromethylphenyl)methylene(3-tert-butyl-5-n-isopropylcyclopentadienyl)(2,7-diphenylfluorenyl)zirconium dichloride,
di(m-trifluoromethylphenyl)methylene(3-tert-butyl-5-n-isopropylcyclopentadienyl)(2,7-di(mesityl)fluorenyl)zirconium dichloride,
di(m-trifluoromethylphenyl)methylene(3-tert-butyl-5-n-isopropylcyclopentadienyl)(octamethyloctahydrodibenzofluorenyl)zirconium dichloride,
di(m-trifluoromethylphenyl)methylene(3-tert-butyl-5-n-isopropylcyclopentadienyl)(1,1,3,6,8,8-hexamethyl-1H,8H-dicyclopenta[b,h]fluorenyl)zirconium dichloride,
di(m-trifluoromethylphenyl)methylene(3-tert-butyl-5-n-isopropylcyclopentadienyl)(3,6-di-tert-butyl-2,7-mesitylfluorenyl)zirconium dichloride,
di(m-trifluoromethylphenyl)methylene(3-tert-butyl-5-n-isopropylcyclopentadienyl)(2,3,6,7-tetramethylfluorenyl)zirconium dichloride,
di(m-trifluoromethylphenyl)methylene(3-tert-butyl-5-n-isopropylcyclopentadienyl)(2,3,6,7-tetra-tert-butylfluorenyl)zirconium dichloride,
di(p-trifluoromethylphenyl)methylene(3-tert-butyl-5-n-isopropylcyclopentadienyl)(fluorenyl)zirconium dichloride,
di(p-trifluoromethylphenyl)methylene(3-tert-butyl-5-n-isopropylcyclopentadienyl)(2,7-di-tert-butylfluorenyl)zirconium dichloride,
di(p-trifluoromethylphenyl)methylene(3-tert-butyl-5-n-isopropylcyclopentadienyl)(3,6-di-tert-butylfluorenyl)zirconium dichloride,
di(p-trifluoromethylphenyl)methylene(3-tert-butyl-5-n-isopropylcyclopentadienyl)(3,6-di-tert-butyl-2,7-dimethylfluorenyl)zirconium dichloride,
di(p-trifluoromethylphenyl)methylene(3-tert-butyl-5-n-isopropylcyclopentadienyl)(2,7-dimethylfluorenyl)zirconium dichloride,
di(p-trifluoromethylphenyl)methylene(3-tert-butyl-5-n-isopropylcyclopentadienyl)(2,7-diphenylfluorenyl)zirconium dichloride,
di(p-trifluoromethylphenyl)methylene(3-tert-butyl-5-n-isopropylcyclopentadienyl)(2,7-di(mesityl)fluorenyl)zirconium dichloride,
di(p-trifluoromethylphenyl)methylene(3-tert-butyl-5-n-isopropylcyclopentadienyl)(octamethyloctahydrodibenzofluorenyl)zirconium dichloride,
di(p-trifluoromethylphenyl)methylene(3-tert-butyl-5-n-isopropylcyclopentadienyl)(1,1,3,6,8,8-hexamethyl-1H,8H-dicyclopenta[b,h]fluorenyl)zirconium dichloride,
di(p-trifluoromethylphenyl)methylene(3-tert-butyl-5-n-isopropylcyclopentadienyl)(3,6-di-tert-butyl-2,7-mesitylfluorenyl)zirconium dichloride,
di(p-trifluoromethylphenyl)methylene(3-tert-butyl-5-n-isopropylcyclopentadienyl)(2,3,6,7-tetramethylfluorenyl)zirconium dichloride,
di(p-trifluoromethylphenyl)methylene(3-tert-butyl-5-n-isopropylcyclopentadienyl)(2,3,6,7-tetra-tert-butylfluorenyl)zirconium dichloride,
di(p-tolyl)methylene(3-tert-butyl-5-n-isopropylcyclopentadienyl)(fluorenyl)zirconium dichloride,
di(p-tolyl)methylene(3-tert-butyl-5-n-isopropylcyclopentadienyl)(2,7-di-tert-butylfluorenyl)zirconium dichloride,
di(p-tolyl)methylene(3-tert-butyl-5-n-isopropylcyclopentadienyl)(3,6-di-tert-butylfluorenyl)zirconium dichloride,
di(p-tolyl)methylene(3-tert-butyl-5-n-isopropylcyclopentadienyl)(3,6-di-tert-butyl-2,7-dimethylfluorenyl)zirconium dichloride,
di(p-tolyl)methylene(3-tert-butyl-5-n-isopropylcyclopentadienyl)(2,7-dimethylfluorenyl)zirconium dichloride,
di(p-tolyl)methylene(3-tert-butyl-5-n-isopropylcyclopentadienyl)(2,7-diphenylfluorenyl)zirconium dichloride,
di(p-tolyl)methylene(3-tert-butyl-5-n-isopropylcyclopentadienyl)(2,7-di(mesityl)fluorenyl)zirconium dichloride,
di(p-tolyl)methylene(3-tert-butyl-5-n-isopropylcyclopentadienyl)(octamethyloctahydrodibenzofluorenyl)zirconium dichloride,
di(p-tolyl)methylene(3-tert-butyl-5-n-isopropylcyclopentadienyl)(1,1,3,6,8,8-hexamethyl-1H,8H-dicyclopenta[b,h]fluorenyl)zirconium dichloride,
di(p-tolyl)methylene(3-tert-butyl-5-n-isopropylcyclopentadienyl)(3,6-di-tert-butyl-2,7-mesitylfluorenyl)zirconium dichloride,
di(p-tolyl)methylene(3-tert-butyl-5-n-isopropylcyclopentadienyl)(2,3,6,7-tetramethylfluorenyl)zirconium dichloride,
di(p-tolyl)methylene(3-tert-butyl-5-n-isopropylcyclopentadienyl)(2,3,6,7-tetra-tert-butylfluorenyl)zirconium dichloride,
isopropylidene(3-tert-butyl-5-n-butylcyclopentadienyl)(fluorenyl)zirconium dichloride,
isopropylidene(3-tert-butyl-5-n-butylcyclopentadienyl)(2,7-di-tert-butylfluorenyl)zirconium dichloride,
isopropylidene(3-tert-butyl-5-n-butylcyclopentadienyl)(3,6-di-tert-butylfluorenyl)zirconium dichloride, isopropylidene(3-tert-butyl-5-n-butylcyclopentadienyl)(3,6-di-tert-butyl-2,7-dimethylfluorenyl)zirconium dichloride,
isopropylidene(3-tert-butyl-5-n-butylcyclopentadienyl)(2,7-dimethylfluorenyl)zirconium dichloride,
isopropylidene(3-tert-butyl-5-n-butylcyclopentadienyl)(2,7-diphenylfluorenyl)zirconium dichloride,
isopropylidene(3-tert-butyl-5-n-butylcyclopentadienyl)(2,7-di(mesityl)fluorenyl)zirconium dichloride,
isopropylidene(3-tert-butyl-5-n-butylcyclopentadienyl)(octamethyloctahydrodibenzofluorenyl)zirconium dichloride,
isopropylidene(3-tert-butyl-5-n-butylcyclopentadienyl)(1,1,3,6,8,8-hexamethyl-1H,8H-dicyclopenta[b,h]fluorenyl)zirconium dichloride,
isopropylidene(3-tert-butyl-5-n-butylcyclopentadienyl)(3,6-di-tert-butyl-2,7-mesitylfluorenyl)zirconium dichloride,
isopropylidene(3-tert-butyl-5-n-butylcyclopentadienyl)(2,3,6,7-tetramethylfluorenyl)zirconium dichloride,
isopropylidene(3-tert-butyl-5-n-butylcyclopentadienyl)(2,3,6,7-tetra-tert-butylfluorenyl)zirconium dichloride,
(methyl)(phenyl)methylene(3-tert-butyl-5-n-butylcyclopentadienyl)(fluorenyl)zirconium dichloride,
(methyl)(phenyl)methylene(3-tert-butyl-5-n-butylcyclopentadienyl)(2,7-di-tert-butylfluorenyl)zirconium dichloride,
(methyl)(phenyl)methylene(3-tert-butyl-5-n-butylcyclopentadienyl)(3,6-di-tert-butylfluorenyl)zirconium dichloride,
(methyl)(phenyl)methylene(3-tert-butyl-5-n-butylcyclopentadienyl)(3,6-di-tert-butyl-2,7-dimethylfluorenyl)zirconium dichloride,
(methyl)(phenyl)methylene(3-tert-butyl-5-n-butylcyclopentadienyl)(2,7-dimethylfluorenyl)zirconium dichloride,
(methyl)(phenyl)methylene(3-tert-butyl-5-n-butylcyclopentadienyl)(2,7-diphenylfluorenyl)zirconium dichloride,
(methyl)(phenyl)methylene(3-tert-butyl-5-n-butylcyclopentadienyl)(2,7-di(mesityl)fluorenyl)zirconium dichloride,
(methyl)(phenyl)methylene(3-tert-butyl-5-n-butylcyclopentadienyl)(octamethyloctahydrodibenzofluorenyl)zirconium dichloride,
(methyl)(phenyl)methylene(3-tert-butyl-5-n-butylcyclopentadienyl)(1,1,3,6,8,8-hexamethyl-1H,8H-dicyclopenta[b,h]fluorenyl)zirconium dichloride,
(methyl)(phenyl)methylene(3-tert-butyl-5-n-butylcyclopentadienyl)(3,6-di-tert-butyl-2,7-mesitylfluorenyl)zirconium dichloride,
(methyl)(phenyl)methylene(3-tert-butyl-5-n-butylcyclopentadienyl)(2,3,6,7-tetramethylfluorenyl)zirconium dichloride,
(methyl)(phenyl)methylene(3-tert-butyl-5-n-butylcyclopentadienyl)(2,3,6,7-tetra-tert-butylfluorenyl)zirconium dichloride,
diphenylmethylene(3-tert-butyl-5-n-butylcyclopentadienyl)(fluorenyl)zirconium dichloride,
diphenylmethylene(3-tert-butyl-5-n-butylcyclopentadienyl)(2,7-di-tert-butylfluorenyl)zirconium dichloride,
diphenylmethylene(3-tert-butyl-5-n-butylcyclopentadienyl)(3,6-di-tert-butylfluorenyl)zirconium dichloride,
diphenylmethylene(3-tert-butyl-5-n-butylcyclopentadienyl)(3,6-di-tert-butyl-2,7-dimethylfluorenyl)zirconium dichloride,
diphenylmethylene(3-tert-butyl-5-n-butylcyclopentadienyl)(2,7-dimethylfluorenyl)zirconium dichloride,
diphenylmethylene(3-tert-butyl-5-n-butylcyclopentadienyl)(2,7-diphenylfluorenyl)zirconium dichloride,
diphenylmethylene(3-tert-butyl-5-n-butylcyclopentadienyl)(2,7-di(mesityl)fluorenyl)zirconium dichloride,
diphenylmethylene(3-tert-butyl-5-n-butylcyclopentadienyl)(octamethyloctahydrodibenzofluorenyl)zirconium dichloride,
diphenylmethylene(3-tert-butyl-5-n-butylcyclopentadienyl)(1,1,3,6,8,8-hexamethyl-1H,8H-dicyclopenta[b,h]fluorenyl)zirconium dichloride,
diphenylmethylene(3-tert-butyl-5-n-butylcyclopentadienyl)(3,6-di-tert-butyl-2,7-mesitylfluorenyl)zirconium dichloride,
diphenylmethylene(3-tert-butyl-5-n-butylcyclopentadienyl)(2,3,6,7-tetramethylfluorenyl)zirconium dichloride,
diphenylmethylene(3-tert-butyl-5-n-butylcyclopentadienyl)(2,3,6,7-tetra-tert-butylfluorenyl)zirconium dichloride,
di(p-chlorophenyl)methylene(3-tert-butyl-5-n-butylcyclopentadienyl)(fluorenyl)zirconium dichloride,
di(p-chlorophenyl)methylene(3-tert-butyl-5-n-butylcyclopentadienyl)(2,7-di-tert-butylfluorenyl)zirconium dichloride,
di(p-chlorophenyl)methylene(3-tert-butyl-5-n-butylcyclopentadienyl)(3,6-di-tert-butylfluorenyl)zirconium dichloride,
di(p-chlorophenyl)methylene(3-tert-butyl-5-n-butylcyclopentadienyl)(3,6-di-tert-butyl-2,7-dimethylfluorenyl)zirconium dichloride,
di(p-chlorophenyl)methylene(3-tert-butyl-5-n-butylcyclopentadienyl)(2,7-dimethylfluorenyl)zirconium dichloride,
di(p-chlorophenyl)methylene(3-tert-butyl-5-n-butylcyclopentadienyl)(2,7-diphenylfluorenyl)zirconium dichloride,
di(p-chlorophenyl)methylene(3-tert-butyl-5-n-butylcyclopentadienyl)(2,7-di(mesityl)fluorenyl)zirconium dichloride,
di(p-chlorophenyl)methylene(3-tert-butyl-5-n-butylcyclopentadienyl)(octamethyloctahydrodibenzofluorenyl)zirconium dichloride,
di(p-chlorophenyl)methylene(3-tert-butyl-5-n-butylcyclopentadienyl)(1,1,3,6,8,8-hexamethyl-1H,8H-dicyclopenta[b,h]fluorenyl)zirconium dichloride,
di(p-chlorophenyl)methylene(3-tert-butyl-5-n-butylcyclopentadienyl)(3,6-di-tert-butyl-2,7-mesitylfluorenyl)zirconium dichloride,
di(p-chlorophenyl)methylene(3-tert-butyl-5-n-butylcyclopentadienyl)(2,3,6,7-tetramethylfluorenyl)zirconium dichloride,
di(p-chlorophenyl)methylene(3-tert-butyl-5-n-butylcyclopentadienyl)(2,3,6,7-tetra-tert-butylfluorenyl)zirconium dichloride,
di(m-chlorophenyl)methylene(3-tert-butyl-5-n-butylcyclopentadienyl)(fluorenyl)zirconium dichloride,
di(m-chlorophenyl)methylene(3-tert-butyl-5-n-butylcyclopentadienyl)(2,7-di-tert-butylfluorenyl)zirconium dichloride,
di(m-chlorophenyl)methylene(3-tert-butyl-5-n-butylcyclopentadienyl)(3,6-di-tert-butylfluorenyl)zirconium dichloride,
di(m-chlorophenyl)methylene(3-tert-butyl-5-n-butylcyclopentadienyl)(3,6-di-tert-butyl-2,7-dimethylfluorenyl)zirconium dichloride,
di(m-chlorophenyl)methylene(3-tert-butyl-5-n-butylcyclopentadienyl)(2,7-dimethylfluorenyl)zirconium dichloride,
di(m-chlorophenyl)methylene(3-tert-butyl-5-n-butylcyclopentadienyl)(2,7-diphenylfluorenyl)zirconium dichloride,
di(m-chlorophenyl)methylene(3-tert-butyl-5-n-butylcyclopentadienyl)(2,7-di(mesityl)fluorenyl)zirconium dichloride,
di(m-chlorophenyl)methylene(3-tert-butyl-5-n-butylcyclopentadienyl)(octamethyloctahydrodibenzofluorenyl)zirconium dichloride, di(m-chlorophenyl)methylene(3-tert-butyl-5-n-butylcyclopentadienyl)(1,1,3,6,8,8-hexamethyl-1H,8H-dicyclopenta[b,h]fluorenyl)zirconium dichloride, di(m-chlorophenyl)methylene(3-tert-butyl-5-n-butylcyclopentadienyl)(3,6-di-tert-butyl-2,7-mesitylfluorenyl)zirconium dichloride, di(m-chlorophenyl)methylene(3-tert-butyl-5-n-butylcyclopentadienyl)(2,3,6,7-tetramethylfluorenyl)zirconium dichloride, di(m-chlorophenyl)methylene(3-tert-butyl-5-n-butylcyclopentadienyl)(2,3,6,7-tetra-tert-butylfluorenyl)zirconium dichloride, di(m-trifluoromethylphenyl)methylene(3-tert-butyl-5-n-butylcyclopentadienyl)(fluorenyl)zirconium dichloride, di(m-trifluoromethylphenyl)methylene(3-tert-butyl-5-n-butylcyclopentadienyl)(2,7-di-tert-butylfluorenyl)zirconium dichloride, di(m-trifluoromethylphenyl)methylene(3-tert-butyl-5-n-butylcyclopentadienyl)(3,6-di-tert-butylfluorenyl)zirconium dichloride, di(m-trifluoromethylphenyl)methylene(3-tert-butyl-5-n-butylcyclopentadienyl)(3,6-di-tert-butyl-2,7-dimethylfluorenyl)zirconium dichloride, di(m-trifluoromethylphenyl)methylene(3-tert-butyl-5-n-butylcyclopentadienyl)(2,7-dimethylfluorenyl)zirconium dichloride, di(m-trifluoromethylphenyl)methylene(3-tert-butyl-5-n-butylcyclopentadienyl)(2,7-diphenylfluorenyl)zirconium dichloride, di(m-trifluoromethylphenyl)methylene(3-tert-butyl-5-n-butylcyclopentadienyl)(2,7-di(mesityl)fluorenyl)zirconium dichloride, di(m-trifluoromethylphenyl)methylene(3-tert-butyl-5-n-butylcyclopentadienyl)(octamethyloctahydrodibenzofluorenyl)zirconium dichloride, di(m-trifluoromethylphenyl)methylene(3-tert-butyl-5-n-butylcyclopentadienyl)(1,1,3,6,8,8-hexamethyl-1H,8H-dicyclopenta[b,h]fluorenyl)zirconium dichloride, di(m-trifluoromethylphenyl)methylene(3-tert-butyl-5-n-butylcyclopentadienyl)(3,6-di-tert-butyl-2,7-mesitylfluorenyl)zirconium dichloride, di(m-trifluoromethylphenyl)methylene(3-tert-butyl-5-n-butylcyclopentadienyl)(2,3,6,7-tetramethylfluorenyl)zirconium dichloride, di(m-trifluoromethylphenyl)methylene(3-tert-butyl-5-n-butylcyclopentadienyl)(2,3,6,7-tetra-tert-butylfluorenyl)zirconium dichloride, di(p-trifluoromethylphenyl)methylene(3-tert-butyl-5-n-butylcyclopentadienyl)(fluorenyl)zirconium dichloride, di(p-trifluoromethylphenyl)methylene(3-tert-butyl-5-n-butylcyclopentadienyl)(2,7-di-tert-butylfluorenyl)zirconium dichloride, di(p-trifluoromethylphenyl)methylene(3-tert-butyl-5-n-butylcyclopentadienyl)(3,6-di-tert-butylfluorenyl)zirconium dichloride, di(p-trifluoromethylphenyl)methylene(3-tert-butyl-5-n-butylcyclopentadienyl)(3,6-di-tert-butyl-2,7-dimethylfluorenyl)zirconium dichloride, di(p-trifluoromethylphenyl)methylene(3-tert-butyl-5-n-butylcyclopentadienyl)(2,7-dimethylfluorenyl)zirconium dichloride, di(p-trifluoromethylphenyl)methylene(3-tert-butyl-5-n-butylcyclopentadienyl)(2,7-diphenylfluorenyl)zirconium dichloride, di(p-trifluoromethylphenyl)methylene(3-tert-butyl-5-n-butylcyclopentadienyl)(2,7-di(mesityl)fluorenyl)zirconium dichloride, di(p-trifluoromethylphenyl)methylene(3-tert-butyl-5-n-butylcyclopentadienyl)(octamethyloctahydrodibenzofluorenyl)zirconium dichloride, di(p-trifluoromethylphenyl)methylene(3-tert-butyl-5-n-butylcyclopentadienyl)(1,1,3,6,8,8-hexamethyl-1H,8H-dicyclopenta[b,h]fluorenyl)zirconium dichloride, di(p-trifluoromethylphenyl)methylene(3-tert-butyl-5-n-butylcyclopentadienyl)(3,6-di-tert-butyl-2,7-mesitylfluorenyl)zirconium dichloride, di(p-trifluoromethylphenyl)methylene(3-tert-butyl-5-n-butylcyclopentadienyl)(2,3,6,7-tetramethylfluorenyl)zirconium dichloride, di(p-trifluoromethylphenyl)methylene(3-tert-butyl-5-n-butylcyclopentadienyl)(2,3,6,7-tetra-tert-butylfluorenyl)zirconium dichloride, di(p-tolyl)methylene(3-tert-butyl-5-n-butylcyclopentadienyl)(fluorenyl)zirconium dichloride, di(p-tolyl)methylene(3-tert-butyl-5-n-butylcyclopentadienyl)(2,7-di-tert-butylfluorenyl)zirconium dichloride, di(p-tolyl)methylene(3-tert-butyl-5-n-butylcyclopentadienyl)(3,6-di-tert-butylfluorenyl)zirconium dichloride, di(p-tolyl)methylene(3-tert-butyl-5-n-butylcyclopentadienyl)(3,6-di-tert-butyl-2,7-dimethylfluorenyl)zirconium dichloride, di(p-tolyl)methylene(3-tert-butyl-5-n-butylcyclopentadienyl)(2,7-dimethylfluorenyl)zirconium dichloride, di(p-tolyl)methylene(3-tert-butyl-5-n-butylcyclopentadienyl)(2,7-diphenylfluorenyl)zirconium dichloride, di(p-tolyl)methylene(3-tert-butyl-5-n-butylcyclopentadienyl)(2,7-di(mesityl)fluorenyl)zirconium dichloride, di(p-tolyl)methylene(3-tert-butyl-5-n-butylcyclopentadienyl)(octamethyloctahydrodibenzofluorenyl)zirconium dichloride, di(p-tolyl)methylene(3-tert-butyl-5-n-butylcyclopentadienyl)(1,1,3,6,8,8-hexamethyl-1H,8H-dicyclopenta[b,h]fluorenyl)zirconium dichloride, di(p-tolyl)methylene(3-tert-butyl-5-n-butylcyclopentadienyl)(3,6-di-tert-butyl-2,7-mesitylfluorenyl)zirconium dichloride, di(p-tolyl)methylene(3-tert-butyl-5-n-butylcyclopentadienyl)(2,3,6,7-tetramethylfluorenyl)zirconium dichloride, di(p-tolyl)methylene(3-tert-butyl-5-n-butylcyclopentadienyl)(2,3,6,7-tetra-tert-butylfluorenyl)zirconium dichloride, dimethylmethylene(3-tert-butyl-5-methylcyclopentadienyl)(3,6-di-tert-butyl-2,7-dimethylfluorenyl)zirconium dichloride, dimethylmethylene(3-tert-butyl-5-methylcyclopentadienyl)(octamethyloctahydrodibenzofluorenyl)zirconium dichloride, dimethylmethylene(3-tert-butyl-5-methylcyclopentadienyl)(1,1,3,6,8,8-hexamethyl-1H,8H-dicyclopenta[b,h]fluorenyl)zirconium dichloride, dimethylmethylene(3-tert-butyl-5-methylcyclopentadienyl)(2,3,6,7-tetramethylfluorenyl)zirconium dichloride, dimethylmethylene(3-tert-butyl-5-methylcyclopentadienyl)(3,6-di-tert-butyl-2,7-diphenylfluorenyl)zirconium dichloride, dimethylmethylene(3-tert-butyl-5-methylcyclopentadienyl)(3,6-di-tert-butyl-2,7-mesitylfluorenyl)zirconium dichloride, diphenylmethylene(3-tert-butyl-5-methylcyclopentadienyl)(3,6-di-tert-butyl-2,7-dimethylfluorenyl)zirconium dichloride, diphenylmethylene(3-tert-butyl-5-methylcyclopentadienyl)(octamethyloctahydrodibenzofluorenyl)zirconium dichloride, diphenylmethylene(3-tert-butyl-5-methylcyclopentadienyl)(1,1,3,6,8,8-hexamethyl-1H,8H-dicyclopenta[b,h]fluorenyl)zirconium dichloride,
diphenylmethylene(3-tert-butyl-5-methylcyclopentadienyl)(2,3,6,7-tetramethylfluorenyl)zirconium dichloride,
diphenylmethylene(3-tert-butyl-5-methylcyclopentadienyl)(3,6-di-tert-butyl-2,7-diphenylfluorenyl)zirconium dichloride,
diphenylmethylene(3-tert-butyl-5-methylcyclopentadienyl)(3,6-di-tert-butyl-2,7-mesitylfluorenyl)zirconium dichloride,
(methyl)(phenyl)methylene(3-tert-butyl-5-methylcyclopentadienyl)(3,6-di-tert-butyl-2,7-dimethylfluorenyl)zirconium dichloride,
(methyl)(phenyl)methylene(3-tert-butyl-5-methylcyclopentadienyl)(octamethyloctahydrodibenzofluorenyl)zirconium dichloride,
(methyl)(phenyl)methylene(3-tert-butyl-5-methylcyclopentadienyl)(1,1,3,6,8,8-hexamethyl-1H,8H-dicyclopenta[b,h]fluorenyl)zirconium dichloride,
(methyl)(phenyl)methylene(3-tert-butyl-5-methylcyclopentadienyl)(2,3,6,7-tetramethylfluorenyl)zirconium dichloride,
(methyl)(phenyl)methylene(3-tert-butyl-5-methylcyclopentadienyl)(3,6-di-tert-butyl-2,7-diphenylfluorenyl)zirconium dichloride,
(methyl)(phenyl)methylene(3-tert-butyl-5-methylcyclopentadienyl)(3,6-di-tert-butyl-2,7-mesitylfluorenyl)zirconium dichloride,
(methyl)(p-tolyl)methylene(3-tert-butyl-5-methylcyclopentadienyl)(3,6-di-tert-butyl-2,7-dimethylfluorenyl)zirconium dichloride,
(methyl)(p-tolyl)methylene(3-tert-butyl-5-methylcyclopentadienyl)(octamethyloctahydrodibenzofluorenyl)zirconium dichloride,
(methyl)(p-tolyl)methylene(3-tert-butyl-5-methylcyclopentadienyl)(1,1,3,6,8,8-hexamethyl-1H,8H-dicyclopenta[b,h]fluorenyl)zirconium dichloride,
(methyl)(p-tolyl)methylene(3-tert-butyl-5-methylcyclopentadienyl)(2,3,6,7-tetramethylfluorenyl)zirconium dichloride,
(methyl)(p-tolyl)methylene(3-tert-butyl-5-methylcyclopentadienyl)(3,6-di-tert-butyl-2,7-diphenylfluorenyl)zirconium dichloride,
(methyl)(p-tolyl)methylene(3-tert-butyl-5-methylcyclopentadienyl)(3,6-di-tert-butyl-2,7-mesitylfluorenyl)zirconium dichloride,
(methyl)(2-naphthyl)methylene(3-tert-butyl-5-methylcyclopentadienyl)(3,6-di-tert-butyl-2,7-dimethylfluorenyl)zirconium dichloride,
(methyl)(2-naphthyl)methylene(3-tert-butyl-5-methylcyclopentadienyl)(octamethyloctahydrodibenzofluorenyl)zirconium dichloride,
(methyl)(2-naphthyl)methylene(3-tert-butyl-5-methylcyclopentadienyl)(1,1,3,6,8,8-hexamethyl-1H,8H-dicyclopenta[b,h]fluorenyl)zirconium dichloride,
(methyl)(2-naphthyl)methylene(3-tert-butyl-5-methylcyclopentadienyl)(2,3,6,7-tetramethylfluorenyl)zirconium dichloride,
(methyl)(2-naphthyl)methylene(3-tert-butyl-5-methylcyclopentadienyl)(3,6-di-tert-butyl-2,7-diphenylfluorenyl)zirconium dichloride,
(methyl)(2-naphthyl)methylene(3-tert-butyl-5-methylcyclopentadienyl)(3,6-di-tert-butyl-2,7-mesitylfluorenyl)zirconium dichloride,
(ethyl)(phenyl)methylene(3-tert-butyl-5-methylcyclopentadienyl)(3,6-di-tert-butyl-2,7-dimethylfluorenyl)zirconium dichloride,
(ethyl)(phenyl)methylene(3-tert-butyl-5-methylcyclopentadienyl)(octamethyloctahydrodibenzofluorenyl)zirconium dichloride,
(ethyl)(phenyl)methylene(3-tert-butyl-5-methylcyclopentadienyl)(1,1,3,6,8,8-hexamethyl-1H,8H-dicyclopenta[b,h]fluorenyl)zirconium dichloride,
(ethyl)(phenyl)methylene(3-tert-butyl-5-methylcyclopentadienyl)(2,3,6,7-tetramethylfluorenyl)zirconium dichloride,
(ethyl)(phenyl)methylene(3-tert-butyl-5-methylcyclopentadienyl)(3,6-di-tert-butyl-2,7-diphenylfluorenyl)zirconium dichloride,
(ethyl)(phenyl)methylene(3-tert-butyl-5-methylcyclopentadienyl)(3,6-di-tert-butyl-2,7-mesitylfluorenyl)zirconium dichloride,
(methyl)(p-trifluoromethyl)methylene(3-tert-butyl-5-methylcyclopentadienyl)(3,6-di-tert-butyl-2,7-dimethylfluorenyl)zirconium dichloride,
(methyl)(p-trifluoromethyl)methylene(3-tert-butyl-5-methylcyclopentadienyl)(octamethyloctahydrodibenzofluorenyl)zirconium dichloride,
(methyl)(p-trifluoromethyl)methylene(3-tert-butyl-5-methylcyclopentadienyl)(1,1,3,6,8,8-hexamethyl-1H,8H-dicyclopenta[b,h]fluorenyl)zirconium dichloride,
(methyl)(p-trifluoromethyl)methylene(3-tert-butyl-5-methylcyclopentadienyl)(2,3,6,7-tetramethylfluorenyl)zirconium dichloride,
(methyl)(p-trifluoromethyl)methylene(3-tert-butyl-5-methylcyclopentadienyl)(3,6-di-tert-butyl-2,7-diphenylfluorenyl)zirconium dichloride,
(methyl)(p-trifluoromethyl)methylene(3-tert-butyl-5-methylcyclopentadienyl)(3,6-di-tert-butyl-2,7-mesitylfluorenyl)zirconium dichloride,
dimethylmethylene(3-(1-methylcyclohexyl)-5-methylcyclopentadienyl)(3,6-di-tert-butyl-2,7-dimethylfluorenyl)zirconium dichloride,
dimethylmethylene(3-(1-methylcyclohexyl)-5-methylcyclopentadienyl)(octamethyloctahydrodibenzofluorenyl)zirconium dichloride,
dimethylmethylene(3-(1-methylcyclohexyl)-5-methylcyclopentadienyl)(1,1,3,6,8,8-hexamethyl-1H,8H-dicyclopenta[b,h]fluorenyl)zirconium dichloride,
dimethylmethylene(3-(1-methylcyclohexyl)-5-methylcyclopentadienyl)(2,3,6,7-tetramethylfluorenyl)zirconium dichloride,
dimethylmethylene(3-(1-methylcyclohexyl)-5-methylcyclopentadienyl)(3,6-di-tert-butyl-2,7-diphenylfluorenyl)zirconium dichloride,
dimethylmethylene(3-(1-methylcyclohexyl)-5-methylcyclopentadienyl)(3,6-di-tert-butyl-2,7-mesitylfluorenyl)zirconium dichloride,
diphenylmethylene(3-(1-methylcyclohexyl)-5-methylcyclopentadienyl)(3,6-di-tert-butyl-2,7-dimethylfluorenyl)zirconium dichloride,
diphenylmethylene(3-(1-methylcyclohexyl)-5-methylcyclopentadienyl)(octamethyloctahydrodibenzofluorenyl)zirconium dichloride,
diphenylmethylene(3-(1-methylcyclohexyl)-5-methylcyclopentadienyl)(1,1,3,6,8,8-hexamethyl-1H,8H-dicyclopenta[b,h]fluorenyl)zirconium dichloride,
diphenylmethylene(3-(1-methylcyclohexyl)-5-methylcyclopentadienyl)(2,3,6,7-tetramethylfluorenyl)zirconium dichloride, diphenylmethylene(3-(1-methylcyclohexyl)-5-methylcyclopentadienyl)(3,6-di-tert-butyl-2,7-diphenylfluorenyl)zirconium dichloride,
diphenylmethylene(3-(1-methylcyclohexyl)-5-methylcyclopentadienyl)(3,6-di-tert-butyl-2,7-mesitylfluorenyl)zirconium dichloride,
(methyl)(phenyl)methylene(3-(1-methylcyclohexyl)-5-methylcyclopentadienyl)(3,6-di-tert-butyl-2,7-dimethylfluorenyl)zirconium dichloride,
(methyl)(phenyl)methylene(3-(1-methylcyclohexyl)-5-methylcyclopentadienyl)(octamethyloctahydrodibenzofluorenyl)zirconium dichloride,
(methyl)(phenyl)methylene(3-(1-methylcyclohexyl)-5-methylcyclopentadienyl)(1,1,3,6,8,8-hexamethyl-1H,8H-dicyclopenta[b,h]fluorenyl)zirconium dichloride,
(methyl)(phenyl)methylene(3-(1-methylcyclohexyl)-5-methylcyclopentadienyl)(2,3,6,7-tetramethylfluorenyl)zirconium dichloride,
(methyl)(phenyl)methylene(3-(1-methylcyclohexyl)-5-methylcyclopentadienyl)(3,6-di-tert-butyl-2,7-diphenylfluorenyl)zirconium dichloride,
(methyl)(phenyl)methylene(3-(1-methylcyclohexyl)-5-methylcyclopentadienyl)(3,6-di-tert-butyl-2,7-mesitylfluorenyl)zirconium dichloride,
(methyl)(p-tolyl)methylene(3-(1-methylcyclohexyl)-5-methylcyclopentadienyl)(3,6-di-tert-butyl-2,7-dimethylfluorenyl)zirconium dichloride,
(methyl)(p-tolyl)methylene(3-(1-methylcyclohexyl)-5-methylcyclopentadienyl)(octamethyloctahydrodibenzofluorenyl)zirconium dichloride,
(methyl)(p-tolyl)methylene(3-(1-methylcyclohexyl)-5-methylcyclopentadienyl)(1,1,3,6,8,8-hexamethyl-1H,8H-dicyclopenta[b,h]fluorenyl)zirconium dichloride,
(methyl)(p-tolyl)methylene(3-(1-methylcyclohexyl)-5-methylcyclopentadienyl)(2,3,6,7-tetramethylfluorenyl)zirconium dichloride,
(methyl)(p-tolyl)methylene(3-(1-methylcyclohexyl)-5-methylcyclopentadienyl)(3,6-di-tert-butyl-2,7-diphenylfluorenyl)zirconium dichloride,
(methyl)(p-tolyl)methylene(3-(1-methylcyclohexyl)-5-methylcyclopentadienyl)(3,6-di-tert-butyl-2,7-mesitylfluorenyl)zirconium dichloride,
(methyl)(2-naphthyl)methylene(3-(1-methylcyclohexyl)-5-methylcyclopentadienyl)(3,6-di-tert-butyl-2,7-dimethylfluorenyl)zirconium dichloride,
(methyl)(2-naphthyl)methylene(3-(1-methylcyclohexyl)-5-methylcyclopentadienyl)(octamethyloctahydrodibenzofluorenyl)zirconium dichloride,
(methyl)(2-naphthyl)methylene(3-(1-methylcyclohexyl)-5-methylcyclopentadienyl)(1,1,3,6,8,8-hexamethyl-1H,8H-dicyclopenta[b,h]fluorenyl)zirconium dichloride,
(methyl)(2-naphthyl)methylene(3-(1-methylcyclohexyl)-5-methylcyclopentadienyl)(2,3,6,7-tetramethylfluorenyl)zirconium dichloride,
(methyl)(2-naphthyl)methylene(3-(1-methylcyclohexyl)-5-methylcyclopentadienyl)(3,6-di-tert-butyl-2,7-diphenylfluorenyl)zirconium dichloride,
(methyl)(2-naphthyl)methylene(3-(1-methylcyclohexyl)-5-methylcyclopentadienyl)(3,6-di-tert-butyl-2,7-mesitylfluorenyl)zirconium dichloride,
(ethyl)(phenyl)methylene(3-(1-methylcyclohexyl)-5-methylcyclopentadienyl) (3,6-di-tert-butyl-2,7-dimethylfluorenyl)zirconium dichloride,
(ethyl)(phenyl)methylene(3-(1-methylcyclohexyl)-5-methylcyclopentadienyl)(octamethyloctahydrodibenzofluorenyl)zirconium dichloride,
(ethyl)(phenyl)methylene(3-(1-methylcyclohexyl)-5-methylcyclopentadienyl)(1,1,3,6,8,8-hexamethyl-1H,8H-dicyclopenta[b,h]fluorenyl)zirconium dichloride,
(ethyl)(phenyl)methylene(3-(1-methylcyclohexyl)-5-methylcyclopentadienyl)(2,3,6,7-tetramethylfluorenyl)zirconium dichloride,
(ethyl)(phenyl)methylene(3-(1-methylcyclohexyl)-5-methylcyclopentadienyl)(3,6-di-tert-butyl-2,7-diphenylfluorenyl)zirconium dichloride,
(ethyl)(phenyl)methylene(3-(1-methylcyclohexyl)-5-methylcyclopentadienyl)(3,6-di-tert-butyl-2,7-mesitylfluorenyl)zirconium dichloride,
(methyl)(p-trifluoromethyl)methylene(3-(1-methylcyclohexyl)-5-methylcyclopentadienyl)(3,6-di-tert-butyl-2,7-dimethylfluorenyl)zirconium dichloride,
(methyl)(p-trifluoromethyl)methylene(3-(1-methylcyclohexyl)-5-methylcyclopentadienyl)(octamethyloctahydrodibenzofluorenyl)zirconium dichloride,
(methyl)(p-trifluoromethyl)methylene(3-(1-methylcyclohexyl)-5-methylcyclopentadienyl)(1,1,3,6,8,8-hexamethyl-1H,8H-dicyclopenta[b,h]fluorenyl)zirconium dichloride,
(methyl)(p-trifluoromethyl)methylene(3-(1-methylcyclohexyl)-5-methylcyclopentadienyl)(2,3,6,7-tetramethylfluorenyl)zirconium dichloride,
(methyl)(p-trifluoromethyl)methylene(3-(1-methylcyclohexyl)-5-methylcyclopentadienyl)(3,6-di-tert-butyl-2,7-diphenylfluorenyl)zirconium dichloride,
(methyl)(p-trifluoromethyl)methylene(3-(1-methylcyclohexyl)-5-methylcyclopentadienyl)(3,6-di-tert-butyl-2,7-mesitylfluorenyl)zirconium dichloride,
dimethylmethylene(3-(2-methyl-2-adamantyl)-5-methylcyclopentadienyl)(3,6-di-tert-butyl-2,7-dimethylfluorenyl)zirconium dichloride,
dimethylmethylene(3-(2-methyl-2-adamantyl)-5-methylcyclopentadienyl)(octamethyloctahydrodibenzofluorenyl)zirconium dichloride,
dimethylmethylene(3-(2-methyl-2-adamantyl)-5-methylcyclopentadienyl)(1,1,3,6,8,8-hexamethyl-1H,8H-dicyclopenta[b,h]fluorenyl)zirconium dichloride,
dimethylmethylene(3-(2-methyl-2-adamantyl)-5-methylcyclopentadienyl)(2,3,6,7-tetramethylfluorenyl)zirconium dichloride,
dimethylmethylene(3-(2-methyl-2-adamantyl)-5-methylcyclopentadienyl)(3,6-di-tert-butyl-2,7-diphenylfluorenyl)zirconium dichloride,
dimethylmethylene(3-(2-methyl-2-adamantyl)-5-methylcyclopentadienyl)(3,6-di-tert-butyl-2,7-mesitylfluorenyl)zirconium dichloride,
diphenylmethylene(3-(2-methyl-2-adamantyl)-5-methylcyclopentadienyl)(3,6-di-tert-butyl-2,7-dimethylfluorenyl)zirconium dichloride,
diphenylmethylene(3-(2-methyl-2-adamantyl)-5-methylcyclopentadienyl)(octamethyloctahydrodibenzofluorenyl)zirconium dichloride,
diphenylmethylene(3-(2-methyl-2-adamantyl)-5-methylcyclopentadienyl)(1,1,3,6,8,8-hexamethyl-1H,8H-dicyclopenta[b,h]fluorenyl)zirconium dichloride,
diphenylmethylene(3-(2-methyl-2-adamantyl)-5-methylcyclopentadienyl)(2,3,6,7-tetramethylfluorenyl)zirconium dichloride,
diphenylmethylene(3-(2-methyl-2-adamantyl)-5-methylcyclopentadienyl)(3,6-di-tert-butyl-2,7-diphenylfluorenyl)zirconium dichloride,
diphenylmethylene(3-(2-methyl-2-adamantyl)-5-methylcyclopentadienyl)(3,6-di-tert-butyl-2,7-mesitylfluorenyl)zirconium dichloride, (methyl)(phenyl)methylene(3-(2-methyl-2-adamantyl)-5-methylcyclopentadienyl)(3,6-di-tert-butyl-2,7-dimethylfluorenyl)zirconium dichloride, (methyl)(phenyl)methylene(3-(2-methyl-2-adamantyl)-5-methylcyclopentadienyl)(octamethyloctahydrodibenzofluorenyl)zirconium dichloride, (methyl)(phenyl)methylene(3-(2-methyl-2-adamantyl)-5-methyl cyclopentadienyl)(1,1,3,6,8,8-hexamethyl-1H,8H-dicyclopenta[b,h]fluorenyl)zirconium dichloride, (methyl)(phenyl)methylene(3-(2-methyl-2-adamantyl)-5-methyl cyclopentadienyl)(2,3,6,7-tetramethylfluorenyl)zirconium dichloride, (methyl)(phenyl)methylene(3-(2-methyl-2-adamantyl)-5-methyl cyclopentadienyl)(3,6-di-tert-butyl-2,7-diphenylfluorenyl)zirconium dichloride, (methyl)(phenyl)methylene(3-(2-methyl-2-adamantyl)-5-methylcyclopentadienyl)(3,6-di-tert-butyl-2,7-mesitylfluorenyl)zirconium dichloride, (methyl)(p-tolyl)methylene(3-(2-methyl-2-adamantyl)-5-methylcyclopentadienyl)(3,6-di-tert-butyl-2,7-dimethylfluorenyl)zirconium dichloride, (methyl)(p-tolyl)methylene(3-(2-methyl-2-adamantyl)-5-methylcyclopentadienyl)(octamethyloctahydrodibenzofluorenyl)zirconium dichloride, (methyl)(p-tolyl)methylene(3-(2-methyl-2-adamantyl)-5-methylcyclopentadienyl)(1,1,3,6,8,8-hexamethyl-1H,8H-dicyclopenta[b,h]fluorenyl)zirconium dichloride, (methyl)(p-tolyl)methylene(3-(2-methyl-2-adamantyl)-5-methylcyclopentadienyl)(2,3,6,7-tetramethylfluorenyl)zirconium dichloride, (methyl)(p-tolyl)methylene(3-(2-methyl-2-adamantyl)-5-methylcyclopentadienyl)(3,6-di-tert-butyl-2,7-diphenylfluorenyl)zirconium dichloride, (methyl)(p-tolyl)methylene(3-(2-methyl-2-adamantyl)-5-methylcyclopentadienyl)(3,6-di-tert-butyl-2,7-mesitylfluorenyl)zirconium dichloride, (methyl)(2-naphthyl)methylene(3-(2-methyl-2-adamantyl)-5-methylcyclopentadienyl)(3,6-di-tert-butyl-2,7-dimethylfluorenyl)zirconium dichloride, (methyl)(2-naphthyl)methylene(3-(2-methyl-2-adamantyl)-5-methylcyclopentadienyl)(octamethyloctahydrodibenzofluorenyl)zirconium dichloride, (methyl)(2-naphthyl)methylene(3-(2-methyl-2-adamantyl)-5-methylcyclopentadienyl)(1,1,3,6,8,8-hexamethyl-1H,8H-dicyclopenta[b,h]fluorenyl)zirconium dichloride, (methyl)(2-naphthyl)methylene(3-(2-methyl-2-adamantyl)-5-methylcyclopentadienyl)(2,3,6,7-tetramethylfluorenyl)zirconium dichloride, (methyl)(2-naphthyl)methylene(3-(2-methyl-2-adamantyl)-5-methylcyclopentadienyl)(3,6-di-tert-butyl-2,7-diphenylfluorenyl)zirconium dichloride, (methyl)(2-naphthyl)methylene(3-(2-methyl-2-adamantyl)-5-methylcyclopentadienyl)(3,6-di-tert-butyl-2,7-mesitylfluorenyl)zirconium dichloride, (ethyl)(phenyl)methylene(3-(2-methyl-2-adamantyl)-5-methylcyclopentadienyl) (3,6-di-tert-butyl-2,7-dimethylfluorenyl)zirconium dichloride, (ethyl)(phenyl)methylene(3-(2-methyl-2-adamantyl)-5-methylcyclopentadienyl)(octamethyloctahydrodibenzofluorenyl)zirconium dichloride, (ethyl)(phenyl)methylene(3-(2-methyl-2-adamantyl)-5-methylcyclopentadienyl)(1,1,3,6,8,8-hexamethyl-1H,8H-dicyclopenta[b,h]fluorenyl)zirconium dichloride, (ethyl)(phenyl)methylene(3-(2-methyl-2-adamantyl)-5-methylcyclopentadienyl)(2,3,6,7-tetramethylfluorenyl)zirconium dichloride, (ethyl)(phenyl)methylene(3-(2-methyl-2-adamantyl)-5-methylcyclopentadienyl)(3,6-di-tert-butyl-2,7-diphenylfluorenyl)zirconium dichloride, (ethyl)(phenyl)methylene(3-(2-methyl-2-adamantyl)-5-methylcyclopentadienyl)(3,6-di-tert-butyl-2,7-mesitylfluorenyl)zirconium dichloride, (methyl)(p-trifluoromethyl)methylene(3-(2-methyl-2-adamantyl)-5-methylcyclopentadienyl)(3,6-di-tert-butyl-2,7-dimethylfluorenyl)zirconium dichloride, (methyl)(p-trifluoromethyl)methylene(3-(2-methyl-2-adamantyl)-5-methylcyclopentadienyl)(octamethyloctahydrodibenzofluorenyl)zirconium dichloride, (methyl)(p-trifluoromethyl)methylene(3-(2-methyl-2-adamantyl)-5-methylcyclopentadienyl)(1,1,3,6,8,8-hexamethyl-1H,8H-dicyclopenta[b,h]fluorenyl)zirconium dichloride, (methyl)(p-trifluoromethyl)methylene(3-(2-methyl-2-adamantyl)-5-methylcyclopentadienyl)(2,3,6,7-tetramethylfluorenyl)zirconium dichloride, (methyl)(p-trifluoromethyl)methylene(3-(2-methyl-2-adamantyl)-5-methylcyclopentadienyl)(3,6-di-tert-butyl-2,7-diphenylfluorenyl)zirconium dichloride, (methyl)(p-trifluoromethyl)methylene(3-(2-methyl-2-adamantyl)-5-methylcyclopentadienyl)(3,6-di-tert-butyl-2,7-mesitylfluorenyl)zirconium dichloride, and the like. (In the above-mentioned compounds, 'octamethyloctahydrofluorene' is an abbreviation of '1,1,4,4,7,7,10,10-octamethyloctahydrodibenzo[b,h]fluorene'.)

Further, compounds obtained by replacing the zirconium of the above compounds mentioned above by hafnium or titanium, and metallocene compounds obtained by replacing the dichloride to difluoride, dibromide or diiodide, or to dimethyl or methylethyl, are also examples of the metallocene compounds related to the olefin polymerization process of the invention.

The (A) bridged metallocene compound according to the invention can be prepared by the known method, and its preparation process is not particularly limited. As the known production process, for example, ones disclosed in WO 2001/27124 and WO 2004/087775 filed by the present applicant can be mentioned.

The above-mentioned metallocene compounds may be used independently or in combination of two or more kinds.

Olefin Polymerization Catalyst

Next, a preferred embodiment when using the aforementioned (A) bridged metallocene compound as a polymerization catalyst for the olefin polymerization process of the invention will be described.

When the bridged metallocene compound of the invention is used as an olefin polymerization catalyst, the catalyst component constitutes (A) a bridged metallocene compound represented by the aforementioned General Formula [I]; and (B) one or more compound(s) selected from (b-1) an organoaluminumoxy compound, (b-2) a compound which reacts with the bridged metallocene compound (A) to form an ion pair, and (b-3) an organoaluminum compound.

Hereinafter, each component will be specifically described.

(b-1) Organoaluminumoxy Compound

As the (b-1) organoaluminumoxy compound related to the invention, a known aluminoxane can be directly used. Specifically, a compound represented by the following General Formula [II]:

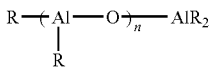
[II]

and/or General Formula [III]

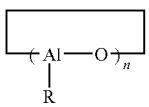
[III]

(in the above-mentioned General Formulae [II] and [III], R represents a hydrocarbon group having 1 to 10 carbon atom(s), n is an integer of 2 or more) can be mentioned. In particular, methylaluminoxane of which the R is a methyl group and n is 3 or more, preferably 10 or more is used. In the aluminoxane, some amount of an organoaluminumoxy compound may get mixed. The characteristic feature in the polymerization process of the invention is that the benzene-insoluble organoaluminumoxy compound mentioned in Japanese Unexamined Patent Application Publication No. H2-78687 can be also applied. An organoaluminumoxy compound described in Japanese Unexamined Patent Application Publication No. H2-167305, aluminoxane having an alkyl group of 2 or more kinds described in Japanese Unexamined Patent Application Publication Nos. H2-24701, H3-103407, and the like are also preferably used. The "benzene-insoluble" organoaluminumoxy compound used in the polymerization process of the invention means that it is insoluble or poorly soluble in benzene. The Al component of the compound dissolves in benzene at 60° C. is generally 10% or less, preferably 5% or less, particularly preferably 2% or less in terms of Al atom.

In addition, as the organoaluminumoxy compound useful in the invention, modified methyl aluminoxane and the like such as the following [IV] can also be mentioned.

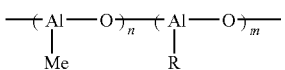
[IV]

(wherein, R represents a hydrocarbon group having 1 to 10 carbon atom(s), and m and n each represents an integer of 2 or more.)

The modified methyl aluminoxane is prepared by using trimethylaluminum and alkyl aluminum except trimethylaluminum. Such compound [IV] is generally called as MMAO. MMMO can be prepared by the processes disclosed in the gazettes U.S. Pat. No. 4,960,878 and U.S. Pat. No. 5,041,584. In addition, the compounds in which the R is an isobutyl group prepared by using trimethylaluminum and triisobutylaluminum are also commercially produced by Tosoh Finechem Corporation and the like under the product name of MMAO or TMAO. Such MMAO is an aluminoxane improved in solubility in various solvents and preservation stability, and specifically is different from those [II] and [III] mentioned above which are insoluble or poorly soluble in benzene and it has a characteristic of being soluble in aliphatic hydrocarbon and alicyclic hydrocarbon. Also, when the polymerization process of the invention is carried out in the form of a solution polymerization described below, the MMAO is conveniently used.

Further, as the organoaluminumoxy compound useful in the polymerization process of the invention, an organoaluminumoxy compound containing boron represented by the following General Formula [V] can also be mentioned.

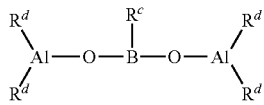
[V]

(In the formula, $R^c$ represents a hydrocarbon group having 1 to 10 carbon atom(s). $R^d$, which may be same or different from each other, represents a hydrogen atom, a halogen atom or a hydrocarbon group having 1 to 10 hydrocarbon atom(s).)

(b-2) Compound which Reacts with the Bridged Metallocene Compound (A) to Form an Ion Pair As the (b-2) compound which reacts with the bridged metallocene compound (A) to form an ion pair (hereinafter may be referred to as 'ionic compound'), Lewis acids, ionic compounds, borane compounds, and carborane compounds disclosed in PCT Japanese Translation Patent Publication Nos. H1-501950 and H1-502036, Japanese Unexamined Patent Application Publication Nos. H3-179005, H3-179006, H3-207703, H3-207704, and U.S. Pat. No. 5,321,106 can be mentioned. In addition, a heteropoly compound and an isopoly compound can also be mentioned.

The ionic compound preferably used in the invention is the compound represented by the following General Formula [VI].

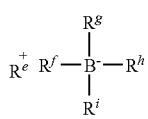
[VI]

In the formula, $Re^+$ can be exemplified by $H^+$, a carbenium cation, an oxonium cation, an ammonium cation, a phosphonium cation, a cycloheptyltrienyl cation, a ferrocenium cation having a transition metal compound or the like. $R^f$ to $R^i$ may be same or different from each other, and each is an organic group, preferably an aryl group.

Specific examples of the aforementioned carbenium cation include a trisubstituted carbenium cation such as a triphenylcarbenium cation, a tris(methylphenyl)carbenium cation, a tris(dimethylphenyl)carbenium cation and the like.

Specific examples of the aforementioned ammonium cation include a trialkylammonium cation such as a trimethylammonium cation, a triethylammonium cation, a tri(n-propyl)ammonium cation, a triisopropylammonium cation, a tri(n-butyl)ammonium cation, and a triisobutylammonium cation; an N,N-dialkylanilinium cation such as an N,N-dimethylanilinium cation, an N,N-diethylanilinium cation, and an N,N-2,4,6-pentamethylanilinium cation; a dialkylammonium cation such as a diisopropylammonium cation and a dicyclohexylammonium cation; and the like.

Specific examples of the phosphonium cation include a triaryl phosphonium cation such as a triphenylphosphonium cation, a tris(methylphenyl)phosphonium cation, a tris(dimethylphenyl)phosphonium cation, and the like.

Re⁺ is preferably a carbenium cation, an ammonium cation and the like, and particularly preferably a triphenylcarbenium cation, an N,N-dimethylanilinium cation and an N,N-diethylanilinium cation.

Specific examples of the carbenium salt include triphenylcarbenium tetraphenyl borate, triphenylcarbeniumtetrakis(pentafluorophenyl)borate, triphenylcarbeniumtetrakis(3,5-ditrifluoromethylphenyl)borate, tris(4-methylphenyl)carbeniumtetrakis(pentafluorophenyl)borate, tris(3,5-dimethylphenyl)carbeniumtetrakis(pentafluorophenyl)borate and the like.

Examples of the ammonium salt include a trialkyl-substituted ammonium salt, an N,N-dialkylanilinium salt, a dialkylammonium salt and the like.

Specific examples of the trialkyl-substituted ammonium salt include, for example, triethylammoniumtetraphenyl borate, tripropylammoniumtetraphenyl borate, tri(n-butyl)ammoniumtetraphenyl borate, trimethylammoniumtetrakis(p-tolyl) borate, trimethylammoniumtetrakis(o-tolyl) borate, tri(n-butyl)ammoniumtetrakis(pentafluorophenyl) borate, triethylammoniumtetrakis(pentafluorophenyl) borate, tripropylammoniumtetrakis(pentafluorophenyl) borate, tripropylammoniumtetrakis(2,4-dimethylphenyl) borate, tri(n-butyl)ammoniumtetrakis(3,5-dimethylphenyl) borate, tri(n-butyl)ammoniumtetrakis(4-trifluoromethylphenyl) borate, tri(n-butyl)ammoniumtetrakis(3,5-difluoromethylphenyl) borate, tri(n-butyl)ammoniumtetrakis(o-tolyl) borate, dioctadecylmethylammoniumtetraphenyl borate, dioctadecylmethylammoniumtetrakis(p-tolyl) borate, dioctadecylmethylammoniumtetrakis(o-tolyl) borate, dioctadecylmethylammoniumtetrakis(pentafluorophenyl) borate, dioctadecylmethylammoniumtetrakis(2,4-dimethylphenyl) borate, dioctadecylmethylammoniumtetrakis(3,5-dimethylphenyl) borate, dioctadecylmethylammoniumtetrakis(4-trifluoromethylphenyl) borate, dioctadecylmethylammoniumtetrakis(3,5-ditrifluoromethylphenyl) borate, dioctadecylmethylammonium and the like.

Specific examples of the N,N-dialkylanilinium salt include, for example, N,N-dimethylanilinium tetraphenyl borate, N,N-dimethylaniliniumtetrakis(pentafluorophenyl) borate, N,N-dimethylaniliniumtetrakis(3,5-ditrifluoromethylphenyl)$_b$ orate, N,N-diethylanilinium tetraphenyl borate, N,N-diethylaniliniumtetrakis(pentafluorophenyl)borate, N,N-diethylaniliniumtetrakis(3,5-ditrifluoromethylphenyl) borate, N,N,-2,4,6-pentamethylanilinium tetraphenyl borate, N,N,-2,4,6-pentamethylaniliniumtetrakis(pentafluorophenyl)borate and the like.

Specific examples of the dialkylammonium salt include di(1-propyl)ammoniumtetrakis(pentafluorophenyl)borate, dicyclohexylammonium tetraphenyl borate, and the like.

In addition, ionic compounds disclosed by the present applicant (Japanese Unexamined Patent Application Publication No. 2004-51676) can be used without limitation.

The above-mentioned ionic compounds (b-2) can be used in combination of two or more kinds.

(b-3) Organoaluminum Compound

The (b-3) organoaluminum compound constituting an olefin polymerization catalyst can be exemplified by an organoaluminum compound represented by the following General Formula [VII], complex alkali of Group I metal and aluminum represented by the following General Formula [VIII], or the like.

$$R^a{}_m Al(OR^b)_n H_p X_q \quad [VII]$$

(In the formula, $R^a$ and $R^b$ may be same or different from each other, and each represents a hydrocarbon group having 1 to 15, preferably 1 to 4 carbon atom(s), X represents a halogen atom, m is a number satisfying 0<m≦3, n is a number satisfying 0≦n<3, p is a number satisfying 0≦p<3, q is a value satisfying 0≦q<3, and m+n+p+q=3).

Specific examples of the compound include tri n-alkylaluminum such as trimethylaluminum, triethylaluminum, tri n-butylaluminum, trihexylaluminum, trioctylaluminum; tri branched-chain alkylaluminum such as triisopropylaluminum, triisobutylaluminum, tri sec-butylaluminum, tri tert-butylaluminum, tri 2-methylbutylaluminum, tri 3-methylhexylaluminum, tri 2-ethylhexylaluminum; tricycloalkylaluminum such as tricyclohexylaluminum, tricyclooctylaluminum; triarylaluminum such as triphenylaluminum, tritolylaluminum; dialkylaluminum hydride such as diisopropylaluminum hydride, diisobutylaluminum hydride; alkenylaluminum which can be represented by general formula (i-C$_4$H$_9$)$_x$Al$_y$(C$_5$H$_{10}$)$_z$ (wherein, x, y and z each is a positive number, and z≦2x.) such as isoprenylaluminum; alkylaluminumalkoxide such as isobutylaluminummethoxide, isobutylaluminumethoxide; dialkylaluminumalkoxide such as dimethylaluminummethoxide, diethylaluminumethoxide, dibutylaluminumbutoxide; alkylaluminumsesquialkoxide such as ethylaluminumsesquiethoxide, butylaluminumsesquibuthoxide; partially alkoxidized alkylaluminum which has an average composition represented by general formula $R^a{}_{2.5}Al(OR^b)_{0.5}$ (wherein $R^a$ and $R^b$ are same as defined in the aforementioned General Formula [VII]); alkylaluminum aryloxide such as diethylaluminum phenoxide, diethylaluminum(2,6-di-t-butyl-4-methylphenoxide); dialkylaluminumhalide such as dimethylaluminumchloride, diethylaluminumchloride, dibutylaluminumchloride, diethylaluminumbromide, diisobutylaluminumchloride; alkylaluminumsesquihalide such as ethylaluminumsesquichloride, butylaluminumsesquichloride, ethylaluminumsesquibromide; partially halogenated alkylaluminum such as alkylalminumdihalide e.g., ethylaluminumdichloride; dialkylaluminum hydride such as diethylaluminum hydride, dibutylaluminum hydride; other partially hydrogenated alkylaluminum such as alkylaluminum dihydride e.g., ethylaluminum dihydride, propylaluminum dihydride; partially alkoxidized or halogenated alkylaluminum such as ethylaluminum ethoxychloride, butylaluminum buthoxychloride, ethylaluminum ethoxybromide; and the like.

$$M^2 Al R^a{}_4 \quad [VIII]$$

(In the formula, M2 represents Li, Na or K, $R^a$ represents a hydrocarbon group having 1 to 15, preferably 1 to 4 carbon atom(s)).

Such compound can be exemplified by LiAl(C$_2$H$_5$)$_4$, LiAl(C$_7$H$_{15}$)$_4$ or the like.

A compound similar to the compound represented by the above-mentioned General Formula [VIII] can also be used, and for example, an organoaluminum compound to which 2 or more aluminum compounds are bonded via nitrogen atoms can be mentioned. Specifically, such compound can be exemplified by (C$_2$H$_5$)$_2$AlN(C$_2$H$_5$)Al(C$_2$H$_5$)$_2$ or the like.

From the viewpoint of polymerization performance and easy availability, the (b-3) organoaluminum compounds used are preferably trimethylaluminum, triethylaluminum and triisobutylaluminum.

In the polymerization process of the invention, the above-mentioned olefin polymerization catalyst may be supported on a particulate carrier (C) to be used. Particularly, in a bulk polymerization using a supported catalyst, which will be descried later, a form of supporting on the particulate carrier (C) is preferably used.

The particulate carrier (C) is an inorganic or organic compound, and is a granule or particulate solid.

Of these, the inorganic compound is preferably porous oxide, inorganic halide, clay, clay mineral, or ion exchangeable layer compound.

As the porous oxides, specifically, $SiO_2$, $Al_2O_3$, MgO, ZrO, $TiO_2$, $B_2O_3$, CaO, ZnO, BaO, $ThO_2$ and the like, or a complex or mixture containing them, for example, a natural or synthetic zeolite, $SiO_2$—MgO, $SiO_2$—$Al_2O_3$, $SiO_2$—$TiO_2$, $SiO_2$—$V_2O_5$, $SiO_2$—$Cr_2O_3$, $SiO_2$—$TiO_2$—MgO and the like, can be used. Among these, $SiO_2$ and/or $Al_2O_3$ as a main component are/is preferably used.

The above-mentioned inorganic oxides may contain a small amount of carbonate, sulfate, nitrate or oxide component such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, $Li_2O$, etc.

As the inorganic halides, $MgCl_2$, $MgBr_2$, $MnCl_2$, $MnBr_2$ and the like are used. The inorganic halide may be used directly, or may be used after being pulverized by the use of a ball mill or vibrating mill. In addition, the inorganic halides produced by dissolving in a solvent such as alcohol and then precipitating in particulates using a precipitating agent can also be used.

The clay generally constitutes a clay mineral as the main component. The ion exchangeable layer compound is a compound having a crystal structure of which the planes constituted by ionic bonding are piled up to one another in parallel with a weak bonding strength, in which the ions contained can be exchanged. Most of the clay minerals are an ion exchangeable layer compound. For clays, clay minerals and ion exchangeable layer compounds, ones synthesized artificially can also be used without being limited to the natural products.

In addition, the clay, clay mineral, and ion exchangeable layer compound can be exemplified by clays, clay minerals, and crystalline ion compounds having a layered crystal structure such as a hexagonal close-packed structure, antimonyl type, $CdCl_2$ type, $CdI_2$ type or the like.

Examples of the clay and clay mineral include kaolin, bentonite, kibushi clay, gairome clay, allophone, hisingerite, pyrophyllite, mica group, montmorillonite group, vermiculite, phyllite group, palygorskite, kaolinite, nacrite, dickite, halloysite, and the like. Examples of the ion exchangeable layer compound include a crystalline acid salt of multivalent metal such as α-$Zr(HAsO_4)_2$.$H_2O$, α-$Zr(HPO_4)_2$, α-$Zr(KPO_4)_2$.$3H_2O$, α-$Ti(HPO_4)_2$, α-$Ti(HAsO_4)_2$.$H_2O$, α-$Sn(HPO_4)_2$.$H_2O$, γ-$Zr(HPO_4)_2$, γ-$Ti(HPO_4)_2$, γ-$Ti(NH_4PO_4)_2$.$H_2O$, and the like.

Such clay, clay mineral or ion exchangeable layer compound has the pore volume with 20 Å radius or more measured by mercury porosimetry of preferably 0.1 cc/g or more, and particularly preferably 0.3 to 5 cc/g or more. Herein, the pore volume is measured for the pore radius within the range of 20 to $3 \times 10^4$ Å according to the mercury porosimetry technique using the mercury porosimeter.

When a carrier having the pore volume with 20 Å radius or more of 0.1 cc/g or less is used, there is a tendency that high polymerization activity is hardly obtained.

The clay and clay mineral are preferably subjected to a chemical treatment.

Any of the chemical treatment such as a surface treatment which removes impurities attached on the surface, treatments giving an effect on the crystal structure of the clay and the like, can be used. Specific examples of the chemical treatment include an acid treatment, an alkali treatment, a treatment with salts, a treatment with organic compound and the like. The acid treatment removes impurities on a surface, and also increases the surface area by eluting a positive ion such as Al, Fe, Mg, etc. in the crystal structure. The alkali treatment destroys the crystal structure of the clay, and brings a structural change in the clay.

The treatment with salts and the treatment with organic compound form an ion complex, molecule complex, organic derivative or the like, and can change the surface area and the interlayer distance.

The ion exchangeable layer compound may be a layer compound with the interlayer enlarged by exchanging an exchangeable ion inside the layer to the other bulky ion using its ion exchangeability.

Such bulky ion plays a supportive role to support a layer structure, and is generally called as a pillar. Also, the introduction of other substance to the inside layer of the layer compound is known as the intercalation. Examples of the guest compound for intercalation include a positive ion inorganic compound such as $TiCl_4$ and $ZrCl_4$, a metal alkoxide (where R is a hydrocarbon group or the like) such as $Ti(OR)_4$, $Zr(OR)_4$, $PO(OR)_3$, and $B(OR)_3$, a metal hydroxide ion such as $[Al_{13}O_4(OH)_{24}]^{7+}$, $[Zr_4(OH)_{14}]^{2+}$, $[Fe_3O(OCOCH_3)_6]^+$, and the like. These compounds may be used independently or in combination of two or more kinds. In addition, when intercalating those compounds, a polymer obtained by hydrolyzing metal alkoxide (R is a hydrocarbon group, or the like) such as $Si(OR)_4$, $Al(OR)_3$ or $Ge(OR)_4$, a colloidal inorganic compound such as $SiO_2$ or the like can be coexisted. As the pillar, oxides produced by carrying out thermal dehydration after intercalating the above-mentioned metal hydroxide ion to the layer inside can be mentioned.

The clay, clay minerals, ion-exchangeable layer compounds may be used directly, or after being subjected to a treatment with ball mill, screening or the like, or alternatively, may be used after being added with water and soaked, or subjected to the thermal dehydration treatment. They may be used alone or in combination of two or more kinds.

When using an ion-exchangeable layer silicate, using the ion exchangeable property and layer structure in addition to the function as a carrier can reduce the used amount of an organoaluminumoxy compound such as alkyl aluminoxane. The ion exchangeable layer silicate as natural product is mainly obtained as a main component of a clay mineral, but also the artificially synthesized product can be used without being particularly limited to the natural product. Specific examples of the clay, the clay mineral, and ion exchangeable layer silicate include kaolinite, montmorillonite, hectorite, bentonite, smectite, vermiculite, tainiolite, synthetic mica, synthetic hectorite and the like.

The organic compound can be exemplified by a granule solid or a particulate solid having the particular diameter in the range of 5 to 300 µm. Specific examples include a (co)polymer produced from an α-olefin having 2 to 14 carbon atoms such as ethylene, propylene, 1-butene, and 4-methyl-1-pentene as the main component; a (co)polymer produced from vinylcyclohexane, styrene as the main component; and a polymer or modified substance having a polar functional group obtained by copolymerizing or graft polymerizing a polar monomer such as acrylic acid, acrylic ester or maleic acid anhydride into a copolymer or a polymer. These particulate carriers may be used independently or in combination of two or more kinds.

The olefin polymerization catalyst according to the invention may contain the particular organic compound component (D), if necessary.

In the invention, the organic compound component (D) is used, if necessary, for the purpose of improving the polymerization performance and properties of the produced polymer. Examples of the organic compound include alcohols, phenolic compounds, carboxylic acids, phosphor compounds, sulfonates and the like.

Polymerization Process

According to the polymerization process of the invention, the polymerization catalyst containing bridged metallocene compound represented by the above-mentioned General Formula [I] satisfactorily exhibits the high performance [a] when the polymerization is carried out using liquid monomer as a solvent (hereinafter this polymerization may be referred to as 'bulk polymerization') in the form of which the polymerization catalyst is supported to the above-mentioned particulate carrier which is so called 'supported catalyst' and [b] when the polymerization is carried out in the form of solution (hereinafter this polymerization may be referred to as 'solution polymerization') of which the catalyst is not supported. That is, in any process of bulk polymerization and solution polymerization, the polymer having a higher molecular weight can be obtained compared to any other known polymerization system.

In the followings, a bulk polymerization process and a solution polymerization process according to preferable embodiments of the invention are described in detail. However, the polymerization processes of the invention are not limited to these two processes and the invention can be also applied for other polymerization processes such as slurry polymerization. Additionally, the bulk polymerization process is preferably used to mainly produce the crystalline propylene polymer, while the solution polymerization process is preferably used to mainly produce a propylene elastomer.

[1] Common Condition Regardless of Polymerization Process Form

In the invention, olefin supplied to a polymerization reaction is at least one kind of monomer selected from propylene, α-olefins and propylenes. In the invention, α-olefin is defined as α-olefins except propylene. That is, the α-olefin of the invention includes ethylene. Therefore, the α-olefin of the invention is constituted by ethylene, α-olefin having 3 carbon atoms except propylene and α-olefin having 4 or more carbon atoms. Examples of the α-olefin having 3 or more carbon atoms except propylene include straight-chained or branched α-olefin having 4 to 20 carbon atoms, preferably 4 to 10 carbon atoms, such as 1-butene, 2-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, and 1-eicosene. Additionally, examples of the α-olefin having 3 or more carbon atoms except propylene include cyclic olefin having 5 to 30 carbon atoms, preferably 5 to 20 atoms, such as cyclopentene, cycloheptene, norbornene, 5-methyl-2-norbornene, tetracyclododecene and 2-methyl 1,4,5,8-dimethano-1,2,3,4,4a,5,8,8a-octahydronaphthalene; polar monomer, for example, α,β-unsaturated carboxylic acid such as acrylic acid, methacrylic acid, fumaric acid, maleic acid anhydride, itaconic acid, itaconic acid anhydride and bicyclo(2,2,1)-5-heptene-2,3-dicarboxylic anhydride, and metal salt thereof such as sodium salt, potassium salt, lithium salt, zinc salt, magnesium salt, calcium salt and aluminum salt; α,β-unsaturated carboxylic ester such as methyl acrylate, ethyl acrylate, n-propyl acrylate, isopropyl acrylate, n-butyl acrylate, isobutyl acrylate, tert-butyl acrylate, 2-ethylhexyl acrylate, methyl methacrylate, ethyl methacrylate, n-propyl methacrylate, isopropyl methacrylate, n-butyl methacrylate and isobutyl methacrylate; vinylester such as vinyl acetate, vinyl propionate, vinyl caproate, vinyl caprate, vinyl laurate, vinyl stearate and vinyl trifluoroacetate; unsaturated glycidyl such as glycidyl acrylate, glycidyl methacrylate, monoglycidyl itaconate. Furthermore, the examples of α-olefin having 3 or more carbon atoms except propylene include aromatic vinyl compound such as vinylcyclohexane, diene and polyene, for example, styrene, monoalkylstyrene or polyalkylstyrene such as o-methylstyrene, m-methylstyrene, p-methylstyrene, o,p-dimethylstyrene, o-ethylstyrene, m-ethylstyrene, p-ethylstyrene; styrene derivative containing a functional group such as methoxy styrene, ethoxy styrene, vinyl benzoate, methyl vinyl benzoate, vinyl benzyl acetate, hydroxy styrene, o-chlorostyrene, p-chlorostyrene and divinyl benzene; and 3-phenylpropylene, 4-phenylpropylene and α-methyl styrene.

In the process for producing a propylene polymer according to the invention, at least one kind of the monomer is propylene. When two or more kinds of monomer are used, it is preferable that propylene is 50% by mole or more of the total amount of monomer. As a preferable monomer composition, (1) a system of which propylene is independently used, (2) a two-component system of propylene and ethylene or 1-butene, and (3) a three-component system of propylene and ethylene and α-olefin having 4 or more carbon atoms can be used. Homopolypropylene (hereinafter 'polypropylene' is simply referred to as PP) is preferably produced from (1); propylene/ethylene copolymer (PER), propylene/butene copolymer (PBR), propylene/ethylene random copolymer (random PP), or propylene/ethylene block copolymer (block PP) is preferably produced from (2); and propylene/ethylene/butene copolymer (PEBR or PBER) or the like is preferably produced from (3). When two or more kinds of monomer are used, a more preferable monomer composition strongly depends on the kinds of the polymer to be produced.

In the process for producing a propylene polymer of the invention, polyene may be used together as a monomer. Polyene is preferably selected from diene or triene, and is preferably contained in the range from 0 to 20% by mole. When propylene polymer contains polyene, the propylene polymer contains a propylene polymer component in the range of 99.99 to 55% by mole, an α-olefin component in the range of 0 to 45% by mole, and a polyene component in the range of 0.01 to 20% by mole. (Herein, the total amount of the propylene component, the α-olefin component and the polyene component is 100% by mole. Additionally, for example, 'propylene component' means propylene-derived backbone contained in a propylene polymer.)

Specific examples of the diene include nonconjugated diene such as 1,4-pentadiene, 1,5-hexadiene, 1,4-hexadiene, 1,4-octadiene, 1,5-octadiene, 1,6-octadiene, 1,7-octadiene, 1,9-decadiene, ethylidene norbornene, vinyl norbornene, dicyclopentadiene, 7-methyl-1,6-octadiene, 4-ethylidene-8-methyl-1 and 7-nonadiene; and conjugated diene such as butadiene and isoprene. Among these, diene having a norbornene backbone is preferable.

Specific examples of the triene include nonconjugated triene such as 6,10-dimethyl-1,5,9-undecatriene, 4,8-dimethyl-1,4,8-decatriene, 5,9-dimethyl-1,4,8-decatriene, 6,9-dimethyl-1,5,8-decatriene, 6,8,9-trimethyl-1,5,8-decatriene, 6-ethyl-10-methyl-1,5,9-undecatriene, 4-ethylidene-1,6-octadiene, 7-methyl-4-ethylidene-1,6-octadiene, 4-ethylidene-8-methyl-1,7-nonadiene (EMND), 7-methyl-4-ethylidene-1,6-nonadiene, 7-ethyl-4-ethylidene-1,6-nonadiene, 6,7-dimethyl-4-ethylidene-1,6-octadiene, 6,7-diethyl-4-ethylidene-1,6-nonadiene, 4-ethylidene-1,6-decadiene, 7-methyl-4-ethylidene-1,6-decadiene, 7-methyl-6-propyl-4- ethylidene-1,6-octadiene, 4-ethylidene-1,7-nonadiene, 8-methyl-4-ethylidene-1,7-nonadiene, and 4-ethylidene-1,7-undecadiene; and conjugated triene such as 1,3,5-hexatriene. Among these, 4,8-dimethyl-1,4,8-decatriene, and 4-ethylidene-8-methyl-1,7-nonadiene (EMND) are preferable.

Such diene or triene mentioned above may be used independently, or in combination of two or more kinds. In addition, triene and diene may be combined for a use. Among these polyenes, particularly, polyene having a norbornene backbone is preferable.

The iodine number of a propylene polymer obtained using such polyenes mentioned above is generally 0 to 80, preferably 1 to 80, more preferably 5 to 60.

The polymerization temperature of olefin using the olefin polymerization catalyst is generally within the range from −50 to +200° C., preferably from 0 to 200° C., more preferably from 40 to 180° C., and particularly preferably from 40 to 150° C. The polymerization pressure is under the condition of generally from normal pressure to 10 MPa gage pressure, preferably from normal pressure to 5 MPa gage pressure, and the polymerization reaction can be carried out either batchwise, semicontinuously or continuously. The polymerization can be carried out by dividing the process into two or more stages having different reaction conditions. The molecular weight of the resulting propylene polymer can be also regulated by allowing hydrogen to exist in the polymerization system or varying the polymerization temperature. Moreover, the molecule weight can be regulated according to the amount of the component (B) used. When adding hydrogen, the suitable amount to be added is from about 0.001 to 100 NL per 1 kg of olefin.

[2] Typical Polymerization Condition for Bulk Polymerization

When the polymerization process of the invention is used in the form of the bulk polymerization, besides the component (A) and the component (B), generally the particulate carrier (C) is used. The type of usage of each component and the adding order of each component is arbitrarily selected, and not particularly limited. For example, as for the adding order of each component, the following process is mentioned.

[i] The process comprises adding the catalyst component (A) supported on the carrier (C), and the component (B) to the polymerization vessel in the arbitrary order.

[ii] The process comprises adding the catalyst component (B) supported on the carrier (C), and the component (A) to the polymerization vessel in the arbitrary order.

[iii] The process comprises adding the catalyst component (A) and the component (B) both supported on the carrier (C), to the polymerization vessel.

In the above-mentioned process, at least 2 or more of each catalyst component may be contacted in advance. In each process of the above-mentioned [ii], [iii] of which the component (B) is supported, the component (B) that is not supported may be added in the arbitrary order, if necessary. In this case, the component (B) may either be same or different. As the solid catalyst component in which the component (A) is supported on the above-mentioned component (C), and the solid catalyst component in which the component (A) and the component (B) is supported in the above-mentioned component (C), olefin may be polymerized in advance, and further catalyst component may be supported on the solid catalyst component which is polymerized in advance.

When the polymerization of olefin is carried out by using such olefin polymerization catalyst as mentioned above, the component (A) is used in such amount so as to be generally from $10^{-8}$ to $10^{-2}$ mole, and preferably from $10^{-7}$ to $10^{-3}$ mole per a reaction volume of 1 L. The component (b-1) is used in such amount that the molar ratio [(b-1)/M] of an aluminum atom in the component (b-1) to the entire transition metal (M) in the component (A) is generally from 10 to 5,000, preferably from 20 to 2,000. The component (b-2) is used in such amount that the molar ratio [(b-2)/M] of the component (b-2) to the transition metal atom (M) in the component (A) is generally from 1 to 500, preferably from 1 to 100. The component (b-3) is used in such amount that the molar ratio [(b-3)/M] of the component (b-3) to the entire transition metal atom (M) in the component (A) is generally from 0.01 to 5,000, preferably from 0.05 to 2,000.

The amount of the component (C) used is generally 10 to 1,000% by weight, preferably 20 to 200% by weight of the component (A).

When the component (D) is used in combination, the component (D) is used in the amount such that the molar ratio [(D)/(b-1)] is generally from 0.005 to 2, preferably from 0.01 to 1 when the component (B) is the component (b-1), that the molar ratio [(D)/(b-2)] is generally from 0.01 to 10, preferably from 0.1 to 5 when the component (B) is the component (b-2), and that the molar ratio [(D)/(b-3)] is generally from 0.01 to 10, preferably from 0.1 to 5 when the component (B) is the component (b-3).

[3] Typical Polymerization Condition for Solution Polymerization

The preferred embodiment when the polymerization process in the invention is carried out in the form of the solution polymerization will be described. In the solution polymerization solvent is normally used. The solvent used in the solution polymerization is generally an inactive hydrocarbon solvent, and is preferably a saturated hydrocarbon having boiling point at normal pressures of from 50° C. to 200° C. Specific examples of the solvent include aliphatic hydrocarbons such as pentane, hexane, heptane, octane, decane, dodecane and kerosene; and alicyclic hydrocarbon such as cyclopentane, cyclohexane and methylcyclopentane. In addition, aromatic hydrocarbon such as benzene, toluene and xylene, and halogenated hydrocarbon such as ethylene chloride, chlorobenzene and dichloromethane are also included in the category of 'the inactive hydrocarbon solvent' according to the polymerization process related to the invention, and its use is not limited.

When the solution polymerization is carried out, the component (A) is used in such amount so as to be generally from $10^{-9}$ to $10^{-1}$ mole, preferably from $10^{-8}$ to $10^{-2}$ mole per a reaction volume of 1 L.

The component (b-1) is used in such amount that the molar ratio [(b-1)/M] of the component (b-1) to the entire transition metal atom (M) in the component (A) is generally from 0.01 to 5,000, preferably from 0.05 to 2,000. The component (b-2) is used in such amount that the molar ratio [(b-2)/M] of an aluminum atom in the component (b-2) to the entire transition metal (M) in the component (A) is generally from 1 to 5,000, preferably from 5 to 1,000. The component (b-3) is used in such amount that the molar ratio [(b-3)/M] of the component (b-3) to the transition metal atom (M) in the component (A) is generally from 0.01 to 10,000, preferably from 0.05 to 5,000.

In the solution polymerization, generally, the above-mentioned hydrocarbon solvent is used, but α-olefin may be used as a solvent. The copolymerization reaction can be carried out by either a batchwise method, or a continuous method. When the solution polymerization is carried out by a batchwise method, the concentration of the metallocene compound in the polymerization system used is generally from 0.00005 to 1 mmole, preferably from 0.0001 to 0.50 mmole per a polymerization volume of 1 L.

Additionally, the reaction time (which is a mean residence time in the case that the polymerization is carried out by a continuous method) depends on the condition such as the catalyst concentration and the polymerization temperature, but is generally 5 minutes to 3 hours, preferably about 10 minutes to 1.5 hours.

Propylene Polymer

The propylene polymer obtained by the production process of the invention is constituted by at least one kind of propylene, α-olefins and polyenes. The propylene polymer obtained by the polymerization process of the invention is commonly characterized in that 1) the molecular weight is high, 2) the isotactic stereoregularity is exhibited, and 3) the irregular bonding derived by 2,1-insertion and 1,3-insertion is extremely low.

As follows, polymers will be divided into the propylene polymer [P1] obtained where the polymerization of the invention is carried out in the form of the bulk polymerization, and the polymer [P2] obtained where the solution polymerization is carried out, and the properties of the preferable propylene polymer will be described.

As the propylene polymer [P1], melt flow rate (MFR; ASTM D 1238, 230° C., a load of 2.16 kg) is from 0.01 to 3,000 g/10 minutes, preferably from 0.02 to 2,000 g/10 minutes, more preferably from 0.05 to 500 g/10 minutes, and an intrinsic viscosity [η] is generally from 0.1 to 10 dl/g, preferably from 0.2 to 8 dl/g, more preferably from 0.3 to 6. dl/g.

The propylene content of the propylene polymer [P1] is in the range of from 100 to 70% by mole, preferably from 100 to 80% by mole, more preferably from 100 to 90% by mole.

The α-olefin of the propylene polymer [P1] is preferably selected from, for example, ethylene, 1-butene, 4-methyl-1-pentene, 1-hexene and 1-octene, and these are desirably contained in the range of from 0 to 30% by mole, preferably from 0 to 20% by mole, more preferably from 0 to 10% by mole.

The melting point (Tm) of the propylene polymer [P1] measured by DSC is generally from 100 to 175° C., preferably from 105 to 170° C., more preferably from 110 to 165° C.

Among the propylene polymers [P1], the ethylene content of the propylene/ethylene copolymer (PER) is in the range of from 10% by mole to 90% by mole, preferably from 15 to 80% by mole, more preferably from 15 to 60% by mole. The intrinsic viscosity [η] of the PER is generally from 0.1 to 10 dl/g, preferably from 0.5 to 9 dl/g, more preferably from 1.0 to 8 dl/g.

On the other hand, as the propylene polymer [P2], the density is in the range of from 0.840 to 0.904 g/cm$^3$, preferably from 0.845 to 0.900 g/cm$^3$, more preferably from 0.84555 to 0.890 g/cm$^3$. Additionally, the melt flow rate (MFR; ASTM D 1238, 230° C., a load of 2.16 kg) is from 0.01 to 500 g/10 minutes, preferably from 0.05 to 100 g/10 minutes, more preferably from 0.05 to 80 g/10 minutes, and the intrinsic viscosity [η] is generally from 0.3 to 10 dl/g, preferably from 0.4 to 8. dl/g, more preferably from 0.5 to 6 dl/g. The molecular weight distribution of the propylene polymer [P2] measured by GPC (Mw/Mn, in terms of polystyrene, Mw: weight average molecular weight, Mn: number average molecular weight) is 4 or less, preferably 3.0 or less.

The propylene content of the propylene polymer [P2] is in the range of from 95% by mole to 55% by mole, preferably from 90 to 55% by mole, more preferably from 90 to 60% by mole.

The α-olefin of the propylene polymer [P2] is preferably selected from for example, ethylene, 1-butene, 4-methyl-1-pentene, 1-hexene and 1-octene, and these are desirably contained in the range of from 5 to 45% by mole, preferably from 10 to 45% by mole, more preferably from 10 to 40% by mole.

For the propylene polymer [P2], the bending tensile modulus (ASTM-D-790, 23° C., a bending rate of 2.0 mm/min, a span interval of 51.0 mm) is 600 (MPa) or less, preferably 500 (MPa) or less, more preferably 400 (MPa) or less.

Advantage of the Invention

The process for producing polypropylene polymer of the invention is a process for polymerizing at least one monomer selected from propylene, α-olefins and polyenes in the presence of a catalyst for polymerization which contains the aforementioned specific (A) bridged metallocene compound. A major characteristic of using the polymerization process of the invention is that, as clear from Examples shown later, the molecular weight of the polymer produced can be highly increased in comparison with the case where a polymerization catalyst containing a metallocene compound other than the (A) bridged metallocene compound related to the invention is used. Further characteristic of the polymerization process of the invention is that a polymer having a high stereoregularity (isotactic regularity) and extremely low content of irregular bonding can be obtained by the polymerization process of the invention. Since a propylene polymer having a high molecular weight obtained by the polymerization process of the invention shows an excellent rigidity and impact resistance, its expanded use in various industrial fields is expected. In addition, for the propylene polymer having about a same degree of molecular weight to the existing polymer, the production conditions (e.g., polymerization temperature) can be changed to the conditions appropriate for a production on the large scale by using the polymerization catalyst containing the (A) bridged metallocene compound according to the invention, and thus the effect on the industry is thought be enormous. Further, the polymerization process of the invention has a characteristic that the ethylene response (a degree of ethylene being taken as an ethylene-derived backbone in a propylene polymer during polymerization) is highly favorable, when ethylene is used as a part of monomers. This excellent ethylene response property, for example, leads to a relaxation of design pressure of polymerization apparatus and thus it is expected to contribute in the cost reduction of the apparatus.

Hereinafter, the invention will be described in more detail with reference to Examples, but the invention is not intended to be limited by those Examples. For Example numbers below, Examples denoted with "b" on the right hand side of the Example number are examples that the polymerization process of the invention is applied to a bulk polymerization using a supported catalyst, and Examples denoted with "s" on the right hand side of the Example number are examples that the polymerization process of the invention is applied to a solution polymerization using a non-supported catalyst.

Analytical methods employed in the invention are as follows.

[1] Intrinsic Viscosity ([η])

The viscosity ratio $\eta_{sp}$ was determined in decalin at 135° C. using an automatic viscosity measuring apparatus VNR-053PC manufactured by Rigo Co. Ltd. and improved version of Ubbelohde capillary viscometer, to calculate the intrinsic viscosity according to the following expression.

$$[\eta] = \eta_{sp} / \{C(1 + K \cdot \eta_{sp})\} \text{ (}C\text{: solution concentration [g/dl], }K\text{: constant number)}$$

[2] Weight Average Molecular Weight (Mw), Number Average Molecular Weight (Mn)

The measurement was carried out by transferring 500 μl of sample solution with 0.1 wt % concentration at a flow rate of 1.0 ml/min using Alliance GPC 2000 manufactured by Waters Co., Ltd. The standard polystyrene made by Tosoh Corporation was used and calculated as the calibrated molecular weight of each polymer.

Column for separation: TSKgel GMH6-HT and TSKgel GMH6-HTL (two for each column having the inner diameter of 7.5 mm and the length of 300 mm are used)

Column Temperature: 140° C.

Mobile phase: o-dichlorobenzene

Detector: differential refractometer

[3] Melting Point [Tm]

About 5 mg of the sample was heated to 200° C. in a nitrogen atmosphere (20 ml/min) using Pyris1 manufactured by Perkin-Elmer, kept for 10 minutes, and then cooled down to 30° C. at a rate of 10° C./min. After the sample being kept for 5 minutes at 30° C., calculation was done from the top peak of the crystalline melting peak obtained when heating the sample to 200° C. at a rate of 10° C./min.

[4] Butene Content and Ethylene Content

The contents were determined according to an ordinary method of $^{13}$C-NMR spectrum.

[5] Mesopentad Fraction (mmmm)

A $^{13}$C-NMR spectrum of a polymer was measured by using an A500 nuclear magnetic resonance manufactured by Japan Electron Optics Laboratory Co., Ltd. in a 5/1 mixed solvent of o-dichlorobenzene and deuterated benzene, at 120° C., under the conditions of a pulse width of 4.7 μsec, a pulse repetition time of 5.5 sec and integration times of 16,000.

[6] Triad Isotacticity

The $^{13}$C-NMR spectrum measurement was carried out in a hexachlorobutadiene solution, and the triad isotactic was calculated from the intensity ratio of the intensity observed at 20.9 to 22.0 ppm (mesotriad region $S_1$) based on a methine (EPE) peak observed at 33.12 ppm to the intensity $S_2$ obtained by subtracting methine (EPE: 33.12 ppm and EPP 30 to 31 ppm) from total methylenes.

Synthesis Example 1

Synthesis of diphenylmethylene(3-tert-butyl-5-ethyl-cyclopentadienyl)(fluorenyl)zirconium dichloride (1) 1-ethyl-3-tert-butyl-cyclopentadiene To a 200 ml three-neck flask equipped with a magnetic stirrer chip and a three-way cock, 50 ml of dehydrated diethyl ether and 59 ml (180 mmol) of diethyl ether solution of 3.0 M ethyl magnesium bromide were charged under a nitrogen atmosphere. In the ice-water bath, 21.4 g (155 mmol) of 3-tert-butylcyclopentenone was added dropwise over 1 hour. The resultant solution was stirred at room temperature for 16 hours, and then the reaction solution was poured into 100 ml of 3N hydrochloric acid. The organic layer was separated, and the aqueous layer was extracted twice with 50 ml of ether. The obtained organic layers were combined, washed once with a saturated aqueous solution of sodium hydrogencarbonate, twice with water, and once with saturated brine, and dried over magnesium sulfate and distilled off under reduced pressure to obtain 15.3 g of a pale yellowy transparent solution. The yield was 65%. Identification was done by $^1$H-NMR spectrum. The measurement results are shown as follows.

$^1$H-NMR (270 MHz, CDCl$_3$, TMS standard): δ 6.19+6.05+5.81+5.77 (m+m+m+m, 2H), 2.91+2.85 (m+m, 2H), 2.48–2.27 (m, 2H), 1.15–1.08 (s+s+m, 12H)

(2) Synthesis of 3-tert-butyl-1-ethyl-6,6-diphenylfulvene

To a 200 ml three-neck flask equipped with a magnetic stirrer chip and a three-way cock, 3.16 g (21.2 mmom) of 1-ethyl-3-tert-butyl-cyclopentadiene and 100 ml of THF were charged under a nitrogen atmosphere. In the ice/methanol bath, 14 ml (22 mmol) of 1.58M n-butyllithium hexane solution was added dropwise over 45 minutes and stirred for 4 hours. Thereto, 8 ml of hexamethylphosphoric triamide, subsequently 5.85 g (32.1 mmol) of benzophenone were charged, and the solution was stirred for 27 hours at room temperature. The reaction solution was poured into 400 ml of 2N hydrochloric acid. The organic layer was separated, and the aqueous layer was extracted with 150 ml of ether. The obtained organic layers were combined, washed with a saturated aqueous solution of sodium hydrogencarbonate, water and saturated aqueous solution of sodium chloride, and dried over magnesium sulfate and the solvent was distilled off, and purified by column chromatography to obtain 3.51 g of an orange solid. The yield was 53%. Identification was done by $^1$H-NMR spectrum. The measurement results are shown as follows.

$^1$H-NMR (270 MHz, CDCl$_3$, TMS standard): δ 7.2-7.4 (m, 10H), 6.3 (m, 1H), 5.7 (m, 1H), 1.70+1.85 (q, 2H), 1.15 (s, 9H), 0.85 (t, 3H)

(3) Synthesis of diphenylmethylene(3-tert-butyl-5-ethylcyclopentadienyl)(fluorenyl)

A 200 ml three-neck flask equipped with a magnetic stirrer chip and a three-way cock was thoroughly purged with nitrogen, and 1.94 g of fluorene (11.7 mmol) was dissolved in 40 ml of dehydrated diethyl ether under a nitrogen atmosphere. To the solution in an ice-bath, 7.8 ml of n-butyl lithium/hexane solution (1.59M: 12.4 mmol) was added slowly dropwise, and then stirred at room temperature over night. To the reaction solution, 3.49 g of 3-tert-butyl-1-ethyl-6,6-diphenyl-fulvene (11.1 mmol) was added, and stirred under reflux for 6 days. To 30 ml of aqueous solution of hydrochloric acid (1N), the reaction mixture was added slowly dropwise to the solution in an ice-bath, and then diethylether was added, the organic layer was separated, and washed with distilled water and saturated brine. The resultant was dried over anhydrous magnesium sulfate and desiccant was filtered off, and the solvent was distilled away under reduced pressure from the filtrate to obtain red black solid. The solid was purified by column chromatography to obtain 1.13 g of a pale yellow solid. The yield was 21%. Identification was done by FD-mass analysis spectrum (FD-MS) The measurement results are shown as follows.

FD-MS: m/z=480 (M+)

(4) Synthesis of diphenylmethylene(3-tert-butyl-5-ethylcyclopentadienyl)(fluorenyl)zirconium dichloride A 30 ml Schlenk flask equipped with a magnetic stirrer chip and a three-way cock was thoroughly purged with nitrogen, and 0.491 g of diphenylmethylene(3-tert-butyl-5-ethyl-cyclopentadienyl)(fluorenyl)(1.02 mmol) was dissolved in 20 ml of dehydrated diethylether under a nitrogen atmosphere. To the solution in an ice-bath, 1.35 ml (2.15 mmol) of 1.59M n-butyl lithium hexane solution was added slowly dropwise, and then stirred at room temperature over night. The reaction solution was thoroughly cooled in a dry ice/methanol bath, and then 0.200 g of zirconium tetrachloride (0.857 mmol) was added thereto. The solution was stirred for 4 days while gradually elevating back to room temperature, and then the solvent was distilled away under reduced pressure. The resulting product was reslurred in hexane, and filtered by a diatomite-filled glass filter. A red pink solid on the filter was washed with a small amount of dichloromethane and the solvent was distilled away under reduced pressure from the filtrate. The obtained red pink solid was washed with a small amount of diethyl ether, and dried under reduced pressure to obtain 260 mg (0.406 mmol) of a target compound as a red pink solid. Identification was done by $^1$H-NMR spectrum and FD-mass analysis spectrum. The measurement results are shown as follows.

$^1$H-NMR spectrum (270 MHz, CDCl$_3$, TMS standard): δ 8.16 (s, 1H), 8.13 (s, 1H), 8.01+7.987 (m+m, 1H), 7.96-7.93 (m, 2H), 7.79-7.75 (m, 1H), 7.56-7.21 (m, 8H), 7.05-7.03 (m, 2H), 6.94+6.91+6.88 (m+m+m, 1H), 6.31+6.30+6.29+6.26 (s+s+s+s, 2H), 5.67 (d, 1H), 2.28+2.08 (qui+qui, 2H), 1.13 (s, 9H), 1.07 (t, 3H)

FD-MS: m/z=640 (M+)

Synthesis Example 2

Synthesis of isopropylidene(3-tert-butyl-5-ethylcyclopentadienyl)(1,1,4,4,7,7,10,10-octamethyloctahydrodibenzo[b,h]fluorenyl)zirconium dichloride 1,1,4,4,7,7,10,10-octamethyloctahydrodibenzo[b,h]fluorene was synthesized in accordance with WO/01/27124.

(1) 3-tert-butyl-1-ethyl-6,6-dimethylfulvene

To a 100 ml three-neck flask equipped with a magnetic stirrer chip and a three-way cock, 3.12 g (20.8 mmol) of 1-ethyl-3-tert-butylcyclopentadiene, 30 ml of methanol, 19 ml of acetone and 20 ml of pyrrolidine were charged under a nitrogen atmosphere, and stirred at room temperature for 6 days. The reaction solution was poured into 200 ml of 2N hydrochloric acid. The organic layer was separated, and the aqueous layer was extracted three times with 100 ml of ether. The obtained organic layers were combined, washed once with a saturated aqueous solution of sodium hydrogencarbonate, twice with water, and once with saturated brine, dried over magnesium sulfate, and purified by column chromatography to obtain 2.91 g of a orange solution. The yield was 74%. Identification was done by $^1$H-NMR spectrum. The measurement results are shown as follows.

$^1$H-NMR spectrum (270 MHz, CDCl$_3$, TMS standard): δ7.40-7.15 (m, 5H), 6.32+6.17 (m+m, 1H), 6.10+5.44 (d+d, 1H), 2.92+2.76 (q+q, 2H), 2.56+1.33 (d+d, 3H), 1.19-1.00 (s+s+m, 12H)

(2) Synthesis of isopropylidene(3-tert-butyl-5-ethylcyclopentadienyl)(1,1,4,4,7,7,10,10-octamethyloctahydrodibenzo[b,h]fluorenyl)

To a 100 ml three-neck flask equipped with a magnetic stirrer chip and a three-way cock, 4.73 g (12.2 mmol) of 1,1,4,4,7,7,10,10-octamethyloctahydrodibenzo[b,h]fluorene and dehydrated 100 ml of THF were charged under a nitrogen atmosphere. Thereto, 8.1 ml (12.8 mmol) of 1.58 M n-butyl lithium hexane solution was added dropwise for 20 minutes in the dry ice/methanol bath. The solution was stirred for 5.5 hours while gradually elevating back to room temperature. THF solution of 2.91 g (15.3 mmol) of 3-tert-butyl-1-ethyl-6,6-trimethylfulvene was added thereto in ice/acetone bath over 10 minutes. The reactant solution was stirred for 22 hours while gradually elevating back to room temperature, and then the reaction solution was poured into 200 ml of 1N hydrochloric acid. The organic layer was separated, and the aqueous layer was extracted three times with 100 ml of diethyl ether. The obtained organic layers were combined, washed once with a saturated aqueous solution of sodium hydrogencarbonate, twice with water and once with saturated brine, and dried over magnesium sulfate and the solvent was distilled off, and purified by column chromatography (60 g of silica gel, hexane). The solvent was distilled off, and the obtained solid was washed with methanol to obtain 5.42 g of a white powder. The yield was 77%. Identification was done by $^1$H-NMR spectrum and FD-mass analysis spectrum. The measurement results are shown as follows.

$^1$H-NMR spectrum (270 MHz, CDCl$_3$, TMS standard): δ 7.55 (s, 1H), 7.54 (s, 1H), 7.22 (s, 1H), 7.19 (s, 1H), 6.21+6.13 (s+s, 1H), 4.32+4.23 (s, 1H), 3.06 (s, 1H), 2.97 (s, 1H), 2.65-2.48 (m, 2H), 1.68 (brs, 1H), 1.37 (s, 6H), 1.32 (s, 6H), 1.24 (s, 3H), 1.23 (s, 3H), 1.19-1.18 (m, 15H), 1.21 (s, 3H), 1.06 (s, 3H), 1.03 (s, 3H)

FD-MS: m/z=576 (M+)

(3) Synthesis of isopropylidene(3-tert-butyl-5-ethylcyclopentadienyl)(1,1,4,4,7,7,10,10-octamethyloctahydrodibenzo[b,h]fluorenyl)zirconium dichloride To a 30 ml Schlenk tube equipped with a magnetic stirrer chip, 15 ml of dehydrated diethylether and 1.14 g (1.98 mmol) of isopropylidene(3-tert-butyl-5-ethylcyclopentadienyl) (1,1,4,4,7,7,10,10-octamethyloctahydrodibenzo[b,h] fluorenyl were charged under a nitrogen atmosphere. To the solution in an ice/acetone bath, 2.75 ml (4.4 mmol) of 1.58 M n-butyl lithium hexane solution was added, and then stirred for 24 hours while gradually elevating back to room temperature. After cooling the solution in the ice/acetone bath, 0.688 g (2.95 mmol) of zirconium tetrachloride was added thereto, and stirred for 24 hours while gradually elevating back to room temperature. The solvent was distilled off, and the solubles were extracted with hexane, and the insolubles were removed by a filtration. The hexane solution was concentrated to separate out a red crystal. The slurry was cooled at −16° C. for 3 days, and then the supernatant solution was removed by decantation. The obtained crystal was washed with pentane, and then dried under reduced pressure to obtain 70 mg of a red crystal. The yield was 4.8%. Identification was done by $^1$H-NMR spectrum and FD-mass analysis spectrum. The measurement results are shown as follows.

$^1$H-NMR spectrum (270 MHz, CDCl$_3$, TMS standard): δ 7.96 (s, 1H), 7.93 (s, 1H), 7.81 (s, 1H), 7.62 (s, 1H), 6.09 (d, 1H, J=3.0 Hz), 5.55 (d, 1H, J=3.0 Hz), 2.88 (qui, 1H), 3.88 (s+qui, 4H), 2.36 (s, 3H), 1.72 (m, 8H), 1.53 (s, 3H), 1.45 (s, 3H), 1.40 (s, 3H), 1.39 (s, 3H), 1.36 (s, 3H), 1.27 (s, 3H), 1.25 (s, 3H), 1.22 (s, 3H), 1.09 (s, 9H), 0.88 (s, 3H)

FD-MS: m/z=736 (M+)

Synthesis Example 3

Synthesis of (phenyl)(methyl)methylene(3-tert-butyl-5-ethylcyclopentadienyl) (1,1,4,4,7,7,10,10-octamethyloctahydrodibenzo[b,h]fluorenyl)zirconium dichloride (1) 3-tert-butyl-1-ethyl-6-phenyl-6-methylfulvene To a 200 ml three-neck flask equipped with a magnetic stirrer chip and a three-way cock, 2.10 g (36.1 mmol) of potassium hydroxide pulverized in mortar, 1.15 g (4.35 mmol) of 18-crown-6 and 50 ml of dehydrated THF were charged under a nitrogen atmosphere. Thereto in a water bath, 3.35 g (22.3 mmol) of 1-ethyl-3-tert-butylcyclopentadiene was added dropwise over 10 minutes, and stirred for 4 hours. The solution was added with 12.5 ml of acetophenone dropwise over 8 minutes, and stirred for 20 hours at room temperature and for 6 hours under reflux. The reaction solution was poured into 100 ml of 2N hydrochloric acid. The organic layer was separated, and the aqueous layer was extracted with 150 ml of ether. The obtained organic layers were combined, washed with a saturated aqueous solution of sodium hydrogencarbonate, water and saturated aqueous solution of sodium chloride. After the solution was dried over magnesium sulfate, the solvent was distilled away, and purified by column chromatography to obtain 1.38 g of a red orange liquid. The yield was 25%. Identification was done by $^1$H-NMR spectrum. The measurement results are shown as follows.

$^1$H-NMR (270 MHz, CDCl$_3$, TMS standard): δ 7.40-7.28 (m, 4H), 7.21-7.17 (m, 1H), 6.32+6.17 (m+m, 1H), 6.10+5.44 (d+d, 1H), 2.91+2.76 (q+q, 2H), 2.36+1.33 (d+d, 3H), 1.19+0.85 (s+m, 12H)

(2) Synthesis of (phenyl)(methyl)methylene(3-tert-butyl-5-ethylcyclopentadienyl) (1,1,4,4,7,7,10,10-octamethyloctahydrodibenzo[b,h]fluorenyl)

To a 100 ml three-neck flask equipped with a stirrer chip and a three-way cock, 1.80 g (46.6 mmol) of 1,1,4,4,7,7,10,10-octamethyl-octahydro-dibenzo[b,h]fluorene and 50 ml of dehydrated diethyl ether were charged under a nitrogen atmosphere. Thereto, 3.1 ml (4.9 mmol) of 1.59 M n-butyllithium hexane solution was added dropwise for 3 minutes in the ice/acetone bath. The solution was stirred for 20.5 hours while gradually elevating back to room temperature. Thereto, dehydrated diethyl ether solution of 1.38 g (4.77 mmol) of 3-tert-butyl-1-ethyl-6-phenyl-6-methylfulvene was added over 10 minutes. After stirring for 136 hours under reflux, the reaction solution was poured into 200 ml of 2N hydrochloric acid. The organic layer was separated, and the aqueous layer was extracted twice with 75 ml of diethyl ether. The obtained organic layers were combined, washed once with a saturated aqueous solution of sodium hydrogencarbonate, twice with water and once with saturated brine, dried over magnesium sulfate. The solvent was distilled off, and the obtained solid was washed with ethanol to obtain as 2.07 g of a pale orange powder. The yield was 70%. Identification was done by $^1$H-NMR spectrum and FD-mass analysis spectrum. The measurement results are shown as follows.

$^1$H-NMR spectrum (270 MHz, CDCl$_3$, TMS standard): δ 7.66-7.64 (m, 1H), 7.55-7.49 (m, 2H), 7.38-7.24 (m, 3H), 6.99 (s, 0.5H), 6.29 (s, 0.5H), 6.01 (s, 0.5H), 5.86 (s, 0.5H), 5.03 (s, 0.5H), 5.48 (s, 0.5H), 3.22-2.85 (m, 2H), 2.60-2.40 (m, 1H), 2.40-2.20 (m, 1H), 1.68-1.63 (m, 8H), 1.36-0.84 (m, 39H)

FD-MS: m/z=638 (M+)

(3) Synthesis of (phenyl)(methyl)methylene(3-tert-butyl-5-ethylcyclopentadienyl)(1,1,4,4,7,7,10,10-octamethyloctahydrodibenzo[b,h]fluorenyl)zirconium dichloride To a 30 ml Schlenk tube, 0.808 g (1.26 mmol) of (phenyl)(methyl)methylene(3-tert-butyl-5-ethylcyclopentadienyl)(1,1,4,4,7,7,10,10-octamethyloctahydrodibenzo[b,h]fluorenyl) and 15 ml of dehydrated diethylether were charged under a nitrogen atmosphere. To the solution in an ice/acetone bath, 1.75 ml (2.77 mmol) of 1.58M n-butyl lithium hexane solution was added, and then stirred for 24 hours. After cooling the solution in the ice/acetone bath, 0.549 g (2.36 mmol) of zirconium tetrachloride was added thereto, and stirred for 18 hours while gradually elevating back to room temperature. After the solvent was distilled off, and the solubles were extracted with hexane, and the insolubles were removed by a filtration. The solvent was distilled off, and the resulting product was recrystallized with dehydrated diethyl ether. The obtained crystal was washed with pentane to obtain 41 mg of a red crystal. The yield was 4.1%. Identification was done by $^1$H-NMR spectrum and FD-mass analysis spectrum. The measurement results are shown as follows.

$^1$H-NMR spectrum (270 MHz, CDCl$_3$, TMS standard): δ 7.99 (s, 1H), 7.96 (s, 1H), 7.92-7.86 (m, 2H), 7.71-7.65 (m, 1H), 7.64-7.52 (m, 1H), 7.41-7.37 (m, 2H), 7.26 (s, 1H), 6.16 (d, 1H), 5.42 (d, 1H), 2.98 (m, 1H), 2.70 (s+m, 4H), 1.75 (brs, 4H), 1.63-1.53 (m, 4H), 1.50 (s, 3H), 1.48 (s, 3H), 1.46 (s, 3H), 1.43 (s, 3H), 1.37 (s, 3H), 1.32 (s, 3H), 1.25-1.18 (m, 6H), 1.05 (s, 9H), 0.83 (s, 3H), 0.78 (s, 3H)

FD-MS: m/z=798 (M+)

Synthesis Example 4

Synthesis of diphenylmethylene(3-tert-butyl-5-ethyl-cyclopentadienyl)(2,7-di-tert-butylfluorenyl)zirconium dichloride (1) 1-ethyl-3-tert-butyl-cyclopentadiene To a 300 ml three-neck flask equipped with a magnetic stirrer chip and a three-way cock, 200 ml of dehydrated diethyl ether and 52 ml (154 mmol) of diethyl ether solution of 3.0 M ethyl magnesium bromide were charged under a nitrogen atmosphere. In the ice and water bath, 17.8 g (129 mmol) of 3-tert-butylcyclopentenone was added dropwise over 1 hour. The resultant solution was stirred at room temperature for 20 hours, and then the reaction solution was poured into 100 ml of 2N hydrochloric acid. The organic layer was separated, and the aqueous layer was extracted twice with 50 ml of ether. The obtained organic layers were combined, washed twice with a saturated aqueous solution of sodium hydrogencarbonate, twice with water, and twice with saturated brine, and dried over magnesium sulfate and distilled off the solvent under reduced pressure. Thereafter, the resulting product was purified by column chromatography to obtain 20.2 g (GC purity 75%) of a pale yellowy transparent solution. The yield was 78%. Identification was done by $^1$H-NMR spectrum. The measurement results are shown as follows.

$^1$H-NMR (270 MHz, CDCl$_3$, TMS standard): δ 6.19+6.05+5.81+5.77 (m+m+m+m, 2H), 2.91+2.85 (m+m, 2H), 2.48–2.27 (m, 2H), 1.15–1.08 (s+s+m, 12H)

(2) Synthesis of 3-tert-butyl-1-ethyl-6,6-diphenylfulvene

To a 300 ml three-neck flask equipped with a magnetic stirrer chip and a three-way cock, 5.11 g (23.9 mmol) (GC purity 75%) of 1-ethyl-3-tert-butyl-cyclopentadiene and 150 ml of THF were charged under a nitrogen atmosphere. In the dry ice/methanol bath, 16 ml (25.2 mmol) of 1.56M n-butyllithium hexane solution was gradually added dropwise and then stirred at room temperature for 20 hours. To the obtained reaction liquid, 3.1 ml (28.8 mmol) of 1,3-dimethyl-2-imidazolidinone was added, 5.3 g (28.8 mmol) of benzophenone was subsequently charged, and the resultant solution was stirred for 48 hours under reflux. The reaction solution was poured into 100 ml of 2N hydrochloric acid. The organic layer was separated, and the aqueous layer was extracted twice with 50 ml of hexane. The separated organic layers were combined, washed with a saturated aqueous solution of sodium hydrogencarbonate, water, and saturated aqueous solution of sodium chloride, dried over magnesium sulfate, and the solvent was distilled off. The resulting product was purified by column chromatography to obtain 4.2 g of an orange solid. The yield was 56%. Identification was done by $^1$H-NMR spectrum. The measurement results are shown as follows.

$^1$H-NMR (270 MHz, CDCl$_3$, TMS standard): δ 7.2-7.4 (m, 10H), 6.3 (m, 1H), 5.7 (m, 1H), 1.70+1.85 (q, 2H), 1.15 (s, 9H), 0.85 (t, 3H)

(3) Synthesis of diphenylmethylene(3-tert-butyl-5-ethylcyclopentadienyl)(2,7-di-tert-butylfluorenyl)

A 200 ml three-neck flask equipped with a magnetic stirrer chip and a three-way cock was thoroughly purged with nitrogen, and 3.8 g of 2,7-di-tert-butylfluorene (13.7 mmol) was dissolved in 80 ml of dehydrated diethyl ether under a nitrogen atmosphere. To the solution in an ice and water bath, 9.2 ml of n-butyl lithium/hexane solution (1.56M: 14.3 mmol) was added slowly dropwise, and then stirred at room for 100 hours. To the reaction solution, 4.5 g of 3-tert-butyl-1-ethyl-6,6-diphenylfulvene (14.3 mmol) was added, and stirred under reflux for 30 hours. The reaction solution was poured into 100 ml of aqueous solution of 2N hydrochloric acid in an ice-bath. Thereafter, diethylether was added, and the organic layer was separated. The aqueous layer was extracted twice with 50 ml of diethyl ether. The separated organic layers were combined, washed with a saturated aqueous solution of sodium hydrogencarbonate, water and saturated aqueous solution of sodium chloride, dried over magnesium sulfate, and the solvent was distilled off. The resulting product was purified by column chromatography to obtain 4.2 g of a white solid. The yield was 53%. Identification was done by FD-mass analysis spectrum. The measurement results are shown as follows.

FD-MS: m/z=592 (M+)

(4) Synthesis of diphenylmethylene(3-tert-butyl-5-ethylcyclopentadienyl)(2,7-di-tert-butylfluorenyl)zirconium dichloride A 100 ml Schlenk flask equipped with a magnetic stirrer chip and a three-way cock, was thoroughly purged with nitrogen, and 1.0 g of diphenylmethylene(3-tert-butyl-5-ethylcyclopentadienyl)(2,7-di-tert-butylfluorenyl) (1.68 mmol) was dissolved in 40 ml of dehydrated diethylether under a nitrogen atmosphere. To the solution in an ice-bath, 2.2 ml (3.4 mmol) of 1.56 M n-butyl lithium hexane solution was added slowly dropwise, and then stirred at room temperature for 28 hours. The reaction solution was thoroughly cooled in a dry ice/methanol bath, and then 0.39 g of zirconium tetrachloride (1.68 mmol) was added thereto. The solution was stirred for 48 hours while gradually elevating back to room temperature, and then the solvent was distilled away under reduced pressure. The resulting product was reslurried in hexane, and filtered by a diatomite-filled glass filter. A brown solid on the filter was extracted with a small amount of dichloromethane and separated by filtration. For each of the obtained hexane solution and dichloromethane solution, the solvent was distilled away under reduced pressure. A dark orange solid was washed with a small amount of pentane and diethyl ether, and dried under reduced pressure to obtain 140 mg (0.186 mmol) of a target compound as an orange solid. Identification was done by $^1$H-NMR spectrum and FD-mass analysis spectrum. The measurement results are shown as follows.

$^1$H-NMR spectrum (270 MHz, CDCl$_3$, TMS standard): 67.90-8.07 (m, 5H), 7.75 (m, 1H), 7.15-7.60 (m, 8H), 6.93 (m, 1H), 6.15-6.25 (m, 2H), 5.6 (d, 1H), 2.05+2.25 (q, 2H), 0.95-1.15 (s+t+s, 30H)

FD-MS: m/z=752 (M+)

Synthesis Example 5

Synthesis of isopropylidene(3-tert-butyl-5-methylcyclopentadienyl)(1,1,4,4,7,7,10,10-octamethyloctahydrodibenzo[b,h]fluorenyl)zirconium dichloride 1-tert-butyl-3-methylcyclopentadiene, 3-tert-butyl-1,6,6-trimethylfulvene and 1,1,4,4,7,7,10,10-octamethyloctahydrodibenzo[b,h]fluorene were synthesized in accordance with WO/01/27124.

(1) Synthesis of isopropylidene(3-tert-butyl-5-methylcyclopentadienyl)(1,1,4,4,7,7,10,10-octamethyloctahydrodibenzo[b,h]fluorenyl)

To a 100 ml three-neck flask equipped with a stirrer chip and a three-way cock, 5.05 g (13.1 mmol) of 1,1,4,4,7,7,10,10-octamethyloctahydrodibenzo[b,h]fluorene and 40 ml of dehydrated diethyl ether 100 ml were charged under a nitrogen atmosphere. Thereto, 9.0 ml (14.2 mmol) of 1.58 M n-butyllithium hexane solution was added dropwise for 5 minutes in the dry ice/methanol bath. The solution was stirred for 5.5 hours while gradually elevating to room temperature. Thereto, THF solution of 3.19 g (18.0 mmol) of 3-tert-butyl-1,6,6-ethyl-trimethylfulvene was added over 5 minutes in the ice/acetone bath. After stirring for 17.5 hours while elevating to room temperature, the reaction solution was poured into 200 ml of 1N hydrochloric acid. The organic layer was separated, and the aqueous layer was extracted three times with 100 ml of diethyl ether. The obtained organic layers were combined, washed once with a saturated aqueous solution of sodium hydrogencarbonate, twice with water, and once with saturated brine, dried over magnesium sulfate and purified by column chromatography. The obtained solid was washed with methanol to obtained 4.22 g of pale yellow powder. The yield was 57%. Identification was done by $^1$H-NMR spectrum. The measurement results are shown as follows.

$^1$H-NMR spectrum (270 MHz, CDCl$_3$, TMS standard): δ 7.54 (s, 2H), 7.19+7.12 (s, 2H), 6.30+5.97 (s, 1H), 4.25+4.16 (s, 1H), 3.04 (s, 2H), 1.99+1.96 (s, 3H), 1.69 (brs, 8H), 1.37 (s, 6H), 1.33 (s, 6H), 1.25 (s, 3H), 1.24 (s, 3H), 1.22 (s, 9H), 1.21 (s, 3H), 1.19 (s, 3H), 1.09 (s, 6H)

(2) Synthesis of isopropylidene(3-tert-butyl-5-methylcyclopentadienyl)(1,1,4,4,7,7,10,10-octamethyloctahydrodibenzo[b,h]fluorenyl)zirconium dichloride To a 30 ml Schlenk tube, 15 ml of dehydrated diethylether and 0.84 g (1.5 mmol) of isopropylidene(3-tert-butyl-5-methylcyclopentadienyl)(1,1,4,4,7,7,10,10-octamethyloctahydrodibenzo[b,h]fluorenyl) were charged under a nitrogen atmosphere. To the solution in an ice acetone bath, 1.9 ml (3.0 mmol) of 1.58M n-butyl lithium hexane solution was added, and then stirred for 24 hours while gradually elevating back to room temperature. After cooling the solution in the ice/acetone bath, 0.402 g (1.72 mmol) of zirconium tetrachloride was added thereto, and stirred for 24 hours while gradually elevating back to room temperature. After the solvent was distilled off, the solubles were extracted with hexane, and the insolubles were removed by a filtration. The hexane solution was concentrated to separate out a red crystal. The slurry was cooled at −16° C. for 3 days, and then the supernatant solution was removed by decantation. The obtained crystal was washed with pentane, and then dried under reduced pressure to obtain 133 mg of a red crystal. The yield was 12%. Identification was done by $^1$H-NMR spectrum and FD-mass analysis spectrum (FD-MS). The measurement results are shown as follows.

$^1$H-NMR spectrum (270 MHz, CDCl$_3$, TMS standard): δ 7.97 (s, 1H), 7.94 (s, 1H), 7.56 (s, 1H), 7.62 (s, 1H), 6.00 (d, 1H, J=3.0 Hz), 5.24 (d, 1H, J=3.0 Hz), 2.54 (s, 3H), 2.35 (s, 3H), 2.29 (s, 3H), 1.73 (m, 8H), 1.54 (s, 3H), 1.45 (s, 3H), 1.43 (s, 3H), 1.39 (s, 3H), 1.36 (s, 3H), 1.28 (s, 3H), 1.25 (s, 3H), 1.22 (s, 3H), 1.08 (s, 9H)

FD-MS: m/z=722 (M+)

Synthesis Example 6

Synthesis of (phenyl)(methyl)methylene(3-tert-butyl-5-methylcyclopentadienyl) (1,1,4,4,7,7,10,10-octamethyloctahydrodibenzo[b,h]fluorenyl)zirconium dichloride (1) 3-tert-butyl-6-phenyl-1,6-dimethyl-fulvene To a 100 ml three-neck flask equipped with a magnetic stirrer chip and a three-way cock, 1.50 g (25.8 mmol) of potassium hydroxide pulverized in mortar, 0.91 g (3.44 mmol) of 18-crown-6 and 45 ml of THF were charged under a nitrogen atmosphere. Thereto in a water bath, 2.70 g (16.0 mmol) of 1-tert-butyl-3-methylcyclopentadiene was added dropwise over 10 minutes and stirred for 3 hours. The solution was added with 11.33 g (94.3 mmol) of acetophenone dropwise over 10 minutes, and stirred for 22 hours. The reaction solution was poured into 100 ml of 2N hydrochloric acid. The organic layer was separated, and the aqueous layer was extracted twice with 200 ml of hexane. The separated organic layers were combined, washed with a saturated aqueous solution of sodium hydrogencarbonate, water, and saturated aqueous solution of sodium chloride. After the solution was dried over magnesium sulfate, the obtained product was purified by column chromatography to obtain 1.98 g of a red orange liquid. The yield was 52%. Identification was done by $^1$H-NMR spectrum and FD-mass analysis spectrum. The result of the $^1$H-NMR spectrum proved that the obtained compounds are mixture of isomers. The measurement results are shown as follows.

$^1$H-NMR (270 MHz, CDCl$_3$, TMS standard): δ 7.37-7.30 (m. 4H), 7.24-7.20 (m, 1H), 6.33+5.56 (m+m, 1H), 6.17+6.11 (d+d, 1H), 2.50+2.41 (s+s, 3H), 2.34+1.36 (s+s, 3H), 1.19+1.01 (s+s, 9H)

(2) Synthesis of (phenyl)(methyl)methylene(3-tert-butyl-5-methylcyclopentadienyl) (1,1,4,4,7,7,10,10-octamethyloctahydrodibenzo[b,h]fluorenyl)

To a 200 ml three-neck flask equipped with a stirrer chip and a three-way cock, 2.73 g (7.06 mmol) of 1,1,4,4,7,7,10,10-octamethyloctahydrodibenzo[b,h]fluorene and 50 ml of dehydrated ether were charged. Thereto, 4.6 ml (7.31 mmol) of 1.59 M n-butyllithium hexane solution was added dropwise for 3 minutes in the ice/acetone bath. The solution was stirred for 26 hours while gradually elevating to room temperature. Thereto, dehydrated diethyl ether solution of 1.98 g (8.31 mmol) of 3-tert-butyl-6-phenyl-1,6-dimethylfulvene was added over 10 minutes. After stirring for 136 hours under reflux, the reaction solution was poured into 200 ml of 2N hydrochloric acid. The organic layer was separated, and the aqueous layer was extracted twice with 75 ml of diethyl ether. The obtained organic layers were combined, washed once with a saturated aqueous solution of sodium hydrogencarbonate, twice with water, and once with saturated brine and dried over magnesium sulfate. The solvent was distilled off, and the obtained solid was washed with ethanol to obtain 2.92 g of a pale orange powder. The yield was 66.2%. Identification was done by $^1$H-NMR spectrum and FD-mass analysis spectrum. The result of the $^1$H-NMR spectrum proved that the obtained compounds are mixture of isomers. The measurement results are shown as follows.

$^1$H-NMR spectrum (270 MHz, CDCl$_3$, TMS standard): δ 7.65 (s, 1H), 7.56-7.49 (m, 3H), 7.42-7.24 (m, 4H), 7.01+6.69 (s, 1H), 6.17+5.88 (s+s, 1H), 5.02+4.88 (s+s, 1H), 3.09+3.01+2.93+2.85 (s+s+s+s, 2H), 2.08+1.94 (s+s, 3H), 1.68-1.50 (m, 8H), 1.36 (s, 3H), 1.34 (s, 6H), 1.28+1.26 (s+s, 3H), 1.22+1.21 (s+s, 9H), 1.13+1.10+1.06 (s+s+s, 9H), 0.95+0.91 (s+s, 3H), 0.85+0.82 (s+s, 3H)

FD-MS: m/z=624 (M+)

(3) Synthesis of (phenyl)(methyl)methylene(3-tert-butyl-5-methylcyclopentadienyl)(1,1,4,4,7,7,10,10-octamethyloctahydrodibenzo[b,h]fluorenyl)zirconium dichloride To a 30 ml Schlenk tube, 0.934 g (1.49 mmol) of (phenyl)(methyl)methylene(3-tert-butyl-5-methylcyclopentadienyl) (1,1,4,4,7,7,10,10-octamethyloctahydrodibenzo[b,h]fluorenyl) and 23 ml of dehydrated diethylether were charged under a nitrogen atmosphere. To the solution in an ice/acetone bath, 1.9 ml (3.0 mmol) of 1.59M n-butyl lithium hexane solution was added, and then stirred for 25 hours while gradually elevating back to room temperature. After cooling the solution in the ice/acetone bath, 0.495 g (2.12 mmol) of zirconium tetrachloride was added thereto, and stirred for 65 hours while gradually elevating back to room temperature. After the solvent was distilled off, the solubles were extracted with hexane, and the insolubles were removed by a filtration. The solvent was distilled off, and the resulting product was re-crystallized with diethyl ether to obtain 0.20 g of a red crystal. The yield was 16%. Identification was done by $^1$H-NMR spectrum and FD-mass analysis spectrum. The measurement results are shown as follows.

$^1$H-NMR spectrum (270 MHz, CDCl$_3$, TMS standard): δ 8.01 (s, 1H), 7.96 (s, 1H), 7.91-7.88 (m, 2H), 7.70-7.64 (m, 1H), 7.64-7.54 (m, 1H), 7.39 (m, 2H), 6.07 (d, 1H, j=3.0 Hz), 5.99 (s, 1H), 5.39 (d, 1H, j=3.0 Hz), 2.70 (s, 3H), 2.40 (s, 3H), 1.77 (m, 4H), 1.64-1.50 (m, 4H), 1.48 (s, 3H), 1.47 (s, 3H), 1.44 (s, 3H), 1.37 (s, 3H), 1.33 (s, 3H), 1.28 (s, 3H), 1.05 (s, 9H), 0.83 (s, 3H), 0.79 (s, 3H)

FD-MS: m/z=782 (M+)

Synthesis Example 7

Synthesis of [di-(m-trifluoromethylphenyl)]methylene(3-tert-butyl-5-methylcyclopentadienyl) (2,7-di-tert-butylfluorenyl)zirconium dichloride (1) 1-methyl-3-tert-butyl-cyclopentadiene To a 500 ml three-neck flask equipped with a magnetic stirrer chip and a three-way cock, 100 ml of dehydrated diethyl ether and 57 ml (170 mmol) of diethyl ether solution of 3.0 M methyl magnesium bromide were charged under a nitrogen atmosphere. In the ice bath, 19.6 g (142 mmol) of 3-tert-butylcyclopentenone was added dropwise over 1 hour. The resultant solution was stirred at room temperature for 20 hours, and then the reaction solution was poured into 100 ml of 2N hydrochloric acid. The organic layer was separated, and the aqueous layer was extracted twice with 50 ml of ether. The obtained organic layers were combined, washed twice with a saturated aqueous solution of sodium hydrogencarbonate, twice with water, and twice with saturated brine and dried over magnesium sulfate and the solvent was distilled. Thereafter, the purification was conducted by distillation under reduced pressure to obtain 13.5 g of a pale yellowy transparent liquid. The yield was 70%. Identification was done by $^1$H-NMR spectrum. The measurement results are shown as follows.

$^1$H-NMR (270 MHz, CDCl$_3$, TMS standard): δ 6.19+6.05+5.81+5.75 (m+m+m+m, 2H), 2.91 (m, 1H), 2.82 (m, 1H), 2.05+1.94 (d+m, 3H), 1.13-1.15 (s+s, 9H)

(2) Synthesis of 3-tert-butyl-1-methyl-6,6-di-(m-trifluoromethylphenyl)fulvene

To a 300 ml three-neck flask equipped with a magnetic stirrer chip and a three-way cock, 3.78 g (27.75 mmol) of 1-methyl-3-tert-butyl-cyclopentadiene and 200 ml of THF were charged under a nitrogen atmosphere. In the dry ice/methanol bath, 19 ml (29.1 mmol) of 1.54M n-butyllithium hexane solution was gradually added dropwise and then stirred at room temperature for 20 hours. To the obtained reaction solution, 3.6 ml (33.3 mmol) of 1,3-di-methyl-2-imidazolidinone was added, subsequently 10.6 g (33.3 mmol) of 3,3'-di-trifluoromethylbenzophenone were changed, and the resultant solution was stirred for 18 hours under reflux. The reaction solution was poured into 100 ml of 2N hydrochloric acid. The organic layer was separated, and the aqueous layer was extracted twice with 50 ml of hexane. The separated organic layers were combined, washed with a saturated aqueous solution of sodium hydrogencarbonate, water, and saturated aqueous solution of sodium chloride and dried over magnesium sulfate and the solvent was distilled off. Thereafter, the resulting product was purified by column chromatography to obtain 10.1 g of an orange solid. The yield was 81%. Identification was done by $^1$H-NMR spectrum. The measurement results are shown as follows.

$^1$H-NMR (270 MHz, CDCl$_3$, TMS standard): δ 7.38-7.64 (m, 8H), 6.32 (t, 1H), 5.8 (d, 1H), 1.4 (s, 3H), 1.1 (s, 9H)

(3) Synthesis of [di-(m-trifluoromethylphenyl)]methylene(3-tert-butyl-5-methylcyclopentadienyl)(2,7-di-tert-butylfluorenyl)

A 200 ml three-neck flask equipped with a magnetic stirrer chip and a three-way cock was thoroughly purged with nitrogen, and 2.47 g of 2,7-di-tert-butylfluorene (8.9 mmol) was dissolved in 60 ml of dehydrated diethyl ether under a nitrogen atmosphere. To the solution in an ice-bath, 6.0 ml of n-butyl lithium/hexane solution (1.54M: 9.2 mmol) was added slowly dropwise, and then stirred at room temperature for 100 hours. To the reaction solution, 4.2 g of 3-tert-butyl-1-methyl-6,6-di-(m-trifluoromethylphenyl)fulvene (9.2 mmol) was added, and stirred under reflux for 24 hours. After the reaction solution was poured into 100 ml of aqueous solution of 2N hydrochloric acid in an ice bath, diethylether was added to separate the organic layer, and the aqueous layer was extracted twice with 50 ml of diethyl ether. The separated organic layers were combined, washed with a saturated aqueous solution of sodium hydrogencarbonate, water and saturated aqueous solution of sodium chloride and dried over magnesium sulfate and the solvent was distilled off. Thereafter, the resulting product was purified by column chromatography to obtain 4.7 g of a white solid. The yield was 74%. Identification was done by FD-mass analysis spectrum (FD-MS) The measurement results are shown as follows.

FD-MS: m/z=714 (M+)

(4) Synthesis of [di-(m-trifluoromethylphenyl)]methylene(3-tert-butyl-5-methylcyclopentadienyl)(2,7-di-tert-butylfluorenyl)zirconium dichloride A 30 ml Schlenk flask equipped with a magnetic stirrer chip and a three-way cock was thoroughly purged with nitrogen, and 2.0 g of di-(m-trifluoromethylphenyl)]methylene(3-tert-butyl-5-methylcyclopentadienyl)(2,7-di-tert-butylfluorenyl) (2.8 mmol) was dissolved in 30 ml of dehydrated diethylether under a nitrogen atmosphere. To the solution in an ice-bath, 3.7 ml (5.7 mmol) of 1.54 M n-butyl lithium hexane solution was added slowly dropwise, and then stirred at room temperature for 20 hours. The reaction solution was thoroughly cooled in a dry ice/methanol bath, and then 0.65 g of zirconium tetrachloride (2.8 mmol) was added thereto. The solution was stirred for 24 hours while gradually elevating back to room temperature, and then the solvent was distilled away under reduced pressure. The resulting product was reslurried in hexane, and filtered by a diatomite-filled glass filter. A brown solid on the filter was extracted with a small amount of dichloromethane and separated by filtration. For each of the obtained hexane solution and dichloromethane solution, the solvent was distilled away under reduced pressure. A dark orange solid was washed with a small amount of pentane and diethyl ether, and dried under reduced pressure to obtain 300 mg (0.343 mmol) of a target compound as an orange solid. Identification was done by $^1$H-NMR spectrum and FD-mass analysis spectrum. The measurement results are shown as follows.

$^1$H-NMR spectrum (270 MHz, CDCl$_3$, TMS standard): δ 7.90-8.22 (s+d+d, 6H), 7.52 (m, 6H), 6.73 (s, 1H), 5.92+5.99+6.11 (s+s+s, 2H), 5.52 (m, 1H), 1.79 (s, 3H), 0.92+1.01+1.05 (s+s+s, 27H), FD-MS: m/z=874 (M+)

Synthesis Example 8

Synthesis of di(p-tolyl)methylene(3-tert-butyl-5-methylcyclopentadienyl) (2,7-di-tert-butylfluorenyl) zirconium dichloride (1) 1-methyl-3-tert-butyl-cyclopentadiene To a 500 ml three-neck flask equipped with a magnetic stirrer chip and a three-way cock, 100 ml of dehydrated diethyl ether and 57 ml (170 mmol) of diethyl ether solution of 3.0 M methyl magnesium bromide were charged under a nitrogen atmosphere. In the ice bath, 19.6 g (142 mmol) of 3-tert-butylcyclopentenone was added dropwise over 1 hour. The resultant solution was stirred at room temperature for 20 hours, and then the reaction solution was poured into 100 ml of 2N hydrochloric acid. The organic layer was separated, and the aqueous layer was extracted twice with 50 ml of ether. The obtained organic layers were combined, washed twice with a saturated aqueous solution of sodium hydrogencarbonate, twice with water, and twice with saturated brine and dried over magnesium sulfate and the solvent was distilled off. Thereafter, the purification was conducted by distillation under reduced pressure to obtain 13.5 g of a pale yellowy transparent liquid. The yield constant was 70%. Identification was done by $^1$H-NMR spectrum. The measurement results are shown as follows.

$^1$H-NMR (270 MHz, CDCl$_3$, TMS standard): δ 6.19+6.05+5.81+5.75 (m+m+m+m, 2H), 2.91 (m, 1H), 2.82 (m, 1H), 2.05+1.94 (d+m, 3H), 1.13–1.15 (s+s, 9H)

(2) Synthesis of 3-tert-butyl-1-methyl-6,6-di-(p-tolyl)fulvene

To a 300 ml three-neck flask equipped with a magnetic stirrer chip and a three-way cock, 4.5 g (33.0 mmol) of 1-methyl-3-tert-butyl-cyclopentadiene and 150 ml of THF were charged under a nitrogen atmosphere. In the dry ice/methanol bath, 22.5 ml (34.7 mmol) of 1.54M n-butyllithium hexane solution was gradually added dropwise and then stirred at room temperature for 20 hours. To the obtained reaction solution, 4.3 ml (39.6 mmol) of 1,3-di-methyl-2-imidazolidinone was added, subsequently 8.3 g (39.6 mmol) of 4,4'-di-methylbenzophenone were changed, and the resultant solution was stirred for 120 hours under reflux. The reaction solution was poured into 100 ml of 2N hydrochloric acid. The organic layer was separated, and the aqueous layer was extracted twice with 50 ml of hexane. The separated organic layers were combined, washed with a saturated aqueous solution of sodium hydrogencarbonate, water and saturated aqueous solution of sodium chloride, and dried over magnesium sulfate and the solvent was distilled off. Thereafter, the resulting product was purified by column chromatography to obtain 6.2 g of an orange solid. The yield was 56%. Identification was done by $^1$H-NMR spectrum. The measurement results are shown as follows.

$^1$H-NMR (270 MHz, CDCl$_3$, TMS standard): δ 7.1 (m, 8H), 6.32 (m, 1H), 5.71 (d, 1H), 2.33 (d, 6H), 1.48 (s, 3H), 1.13 (s, 9H)

(3) Synthesis of di(p-tolyl)methylene(3-tert-butyl-5-methylcyclopentadienyl) (2,7-di-tert-butylfluorenyl)

A 200 ml three-neck flask equipped with a magnetic stirrer chip and a three-way cock was thoroughly purged with nitrogen, and 3.5 g of 2,7-di-tert-butylfluorene (12.6 mmol) was dissolved in 60 ml of dehydrated diethyl ether under a nitrogen atmosphere. To the solution in an ice-bath, 8.6 ml of n-butyl lithium/hexane solution (1.54M: 13.2 mmol) was added slowly dropwise, and then stirred at room temperature for 100 hours. To the reaction solution, 4.3 g of 3-tert-butyl-1-methyl-6,6-di-(p-tolyl)fulvene (13.2 mmol) was added, and stirred under reflux for 24 hours. After the reaction solution was poured into 100 ml of aqueous solution of 2N hydrochloric acid in an ice bath, diethylether was added to separate the organic layer, and the aqueous layer was extracted twice with 50 ml of diethyl ether. The separated organic layers were combined, washed with a saturated aqueous solution of sodium hydrogencarbonate, water and saturated aqueous solution of sodium chloride, and dried over magnesium sulfate and the solvent was distilled off. Thereafter, the resulting product was re-crystallized with acetonitrile to obtain 6.3 g of a white solid. The yield was 82%. Identification was done by FD-mass analysis spectrum (FD-MS) The measurement results are shown as follows.

FD-MS: m/z=606 (M+)

(4) Synthesis of [di(p-tolyl)]methylene(3-tert-butyl-5-methylcyclopentadienyl)(2,7-dimethylfluorenyl) zirconium dichloride A 50 ml Schlenk flask equipped with a magnetic stirrer chip and a three-way cock was thoroughly purged with nitrogen, and 3.0 gg of [di(p-tolyl)]methylene(3-tert-butyl-5-methylcyclopentadienyl)(2,7-dibutylfluorenyl) (5.0 mmol) was dissolved in 40 ml of dehydrated diethylether under a nitrogen atmosphere. To the solution in an ice-bath, 6.6 ml (10.1 mmol) of 15.4 M n-butyl lithium hexane solution was added slowly dropwise, and then stirred at room temperature for 30 hours. The reaction solution was thoroughly cooled in a dry ice/methanol bath, and then 1.15 g of zirconium tetrachloride (5.0 mmol) was added thereto. The solution was stirred for 48 hours while gradually elevating back to room temperature, and then the solvent was distilled away under reduced pressure. The resulting product was reslurried in hexane, and filtered by a diatomite-filled glass filter. A brown solid on the filter was extracted with a small amount of dichloromethane and separated by filtration. For each of the obtained hexane solution and dichloromethane solution, the solvent was distilled away under reduced pressure. A dark orange solid was washed with a small amount of pentane and diethyl ether, and dried under reduced pressure to obtain 300 mg (0.392 mmol) of a target compound as an orange solid. Identification was done by H-NMR spectrum and FD-mass analysis spectrum. The measurement results are shown as follows.

$^1$H-NMR spectrum (270 MHz, CDCl$_3$, TMS standard): δ 7.91 (d, 2H), 7.76 (dd, 3H), 7.6 (dd, 1H), 7.47 (dt, 2H), 6.96+7.0-7.17 (s+m, 5H), 6.14 (s, 1H), 6.05 (d, 1H), 5.56 (d, 1H), 2.24 (d, 6H), 1.83 (s, 3H), 1.03 (s+s, 18H), 0.94 (s, 9H)

FD-MS: m/z=766 (M+)

Synthesis Example 9

Synthesis of [di(m-trifluoromethylphenyl)]methylene(3-tert-butyl-5-n-propylcyclopentadienyl)(fluorenyl)zirconium dichloride (1) 1-n-propyl-3-tert-butylcyclopentadiene To a 300 ml three-neck flask equipped with a magnetic stirrer chip and a three-way cock, 120 ml of dehydrated diethyl ether and 89 ml (178 mmol) of tetrahydrofuran solution of 2.0M n-propyl magnesium bromide were charged under a nitrogen atmosphere. In the ice bath, 20.6 g (149 mmol) of 3-tert-butylcyclopentenone was added dropwise over 1 hour. The resultant solution was stirred at room temperature for 20 hours, and then the reaction solution was poured into 100 ml of 2N hydrochloric acid. The organic layer was separated, and the aqueous layer was extracted twice with 50 ml of ether. The obtained organic layers were combined, washed twice with a saturated aqueous solution of sodium hydrogencarbonate, twice with water and twice with saturated brine, and dried over magnesium sulfate and the solvent was distilled off. Thereafter, the resulting product was purified by column chromatography to obtain 16.8 g (GC purity 82%) of a pale yellowy transparent liquid. The yield was 57%. Identification was done by $^1$H-NMR spectrum. The measurement results are shown as follows.

$^1$H-NMR (270 MHz, CDCl$_3$, TMS standard): δ 6.16+6.02+5.75+5.78 (m+m+m+m, 2H), 2.81+2.89 (m+m, 2H), 2.21–2.37 (t, 2H), 1.48–1.61 (m, 2H), 1.05–1.18 (s+s, 9H), 0.8–1.0 (t, 3H)

(2) Synthesis of 3-tert-butyl-1-n-propyl-6,6-di-(m-trifluoromethylphenyl)fulvene To a 300 ml three-neck flask equipped with a magnetic stirrer chip and a three-way cock, 6.1 g (30.4 mmol) (GC purity 82%) of 1-n-propyl-3-tert-butylcyclopentadiene and 100 ml of THF were charged under a nitrogen atmosphere. In the dry ice/methanol bath, 20 ml (32.0 mmol) of 1.56M n-butyllithium hexane solution was gradually added dropwise and then stirred at room temperature for 24 hours. To the obtained reaction liquid, 3.9 ml (36.5 mmol) of 1,3-dimethyl-2-imidazolidinone was added, 11.6 g (36.5 mmol) of 3,3'-ditrifluoromethylbenzophenone was subsequently charged, and the resultant solution was stirred for 100 hours under reflux. The reaction solution was poured into 100 ml of 2N hydrochloric acid. The organic layer was separated, and the aqueous layer was extracted twice with 50 ml of hexane. The separated organic layers were combined, washed with a saturated aqueous solution of sodium hydrogencarbonate, water and saturated aqueous solution of sodium chloride, and dried over magnesium sulfate, and the solvent was distilled off. Thereafter, the resulting product was purified by column chromatography to obtain 6.8 g of an orange solid. The yield was 49%. Identification was done by $^1$H-NMR spectrum. The measurement results are shown as follows.

$^1$H-NMR (270 MHz, CDCl$_3$, TMS standard): δ 7.3-7.7 (m, 8H), 6.34 (d, 1H), 5.53 (d, 1H), 1.65 (t, 2H), 1.22 (m, 2H), 1.12 (s, 9H) 0.57 (t, 3H)

(3) Synthesis of [di(m-trifluoromethylphenyl)]methylene(3-tert-butyl-5-n-propylcyclopentadienyl)(fluorenyl)

A 200 ml three-neck flask equipped with a magnetic stirrer chip and a three-way cock was thoroughly purged with nitrogen, and 2.9 g of fluorene (17.6 mmol) was dissolved in 100 ml of dehydrated diethyl ether under a nitrogen atmosphere. To the solution in an ice-bath, 11.6 ml of n-butyl lithium/hexane solution (1.6M: 18.5 mmol) was added slowly dropwise, and then stirred at room for 100 hours. To the reaction solution, 4.1 g of 3-tert-butyl-1-n-propyl-6,6-di-(m-trifluoromethylphenyl)fulvene (8.8 mmol) was added, and stirred under reflux for 170 hours. The reaction solution was poured into 100 ml of aqueous solution of 2N hydrochloric acid in an ice-bath. Thereafter, diethylether was added, and the organic layer was separated. The aqueous layer was extracted twice with 50 ml of diethyl ether. The separated organic layers were combined, washed with a saturated aqueous solution of sodium hydrogencarbonate, water and saturated aqueous solution of sodium chloride, and dried over magnesium sulfate, and the solvent was distilled off. Thereafter, the resulting product was purified by column chromatography to obtain 1.88 g of a white solid. The yield was 34%. Identification was done by FD-mass analysis spectrum (FD-MS). The measurement results are shown as follows.

FD-MS: m/z=630 (M+)

(4) Synthesis of [di(m-trifluoromethylphenyl)]methylene(3-tert-butyl-5-n-propylcyclopentadienyl)(fluorenyl)zirconium dichloride A 100 ml Schlenk flask equipped with a magnetic stirrer chip and a three-way cock was thoroughly purged with nitrogen, and 1.6 g of di(m-trifluoromethylphenyl)]methylene(3-tert-butyl-5-n-propylcyclopentadienyl) (fluorenyl) (2.6 mmol) was dissolved in 50 ml of dehydrated diethylether under a nitrogen atmosphere. To the solution in an ice-bath, 3.3 ml (5.3 mmol) of 1.6 M n-butyl lithium hexane solution was added slowly dropwise, and then stirred at room temperature for 17 hours. The reaction solution was thoroughly cooled in a dry ice/methanol bath, and then 0.60 g of zirconium tetrachloride (2.6 mmol) was added thereto. The solution was stirred for 24 hours while gradually elevating back to room temperature, and then the solvent was distilled away under reduced pressure. The resulting product was reslurried in hexane, and filtered by a diatomite-filled glass filter. The solvent of the obtained hexane solution was distilled away under reduced pressure. An obtained dark orange solid was dissolved in pentane and the solid deposited by cooling was dried under reduced pressure to obtain 70 mg (0.088 mmol) of a target compound as an orange solid. Identification was done by $^1$H-NMR spectrum and FD-mass analysis spectrum. The measurement results are shown as follows.

$^1$H-NMR spectrum (270 MHz, CDCl$_3$, TMS standard): δ 8.1-8.3 (m, 5H), 7.8-7.9 (m, 1H), 7.57 (m, 5H), 7.45 (m, 1H), 6.09 (t, 1H), 6.80-7.0 (m, 2H), 6.34 (dd, 1H), 6.11 (dd, 1H), 5.58 (d, 1H), 2.06 (m, 2H), 1.57 (m, 2H), 1.1 (s, s, 9H), 0.77 (dt, 3H)

FD-MS: m/z=790 (M+)

Synthesis Example 1'

Preparation of a Supported Catalyst

To a 100 ml three-neck flask, which had been thoroughly purged with nitrogen, a stirrer rod was equipped and 1.07 g of silica-supported methylaluminoxane (AL=14.6 wt %) was added. Thereto, 10 ml of dehydrated toluene was added at room temperature, 20 ml of a toluene solution of 21.6 mg of the diphenylmethylene(3-tert-butyl-5-ethylcyclopentadienyl)(fluorenyl)zirconium dichloride synthesized by the above-mentioned Synthesis Example 1 was added as a transition metal compound under stirring, and stirred for 1 hour. The obtained slurry was filtered, and powder on the filter was washed once with 10 ml of dehydrated toluene, and subsequently washed three times with 10 ml of dehydrated hexane. The washed powder was dried under reduced pressure for 2 hours to obtain 1.03 g of powder. The obtained powder was mixed with a mineral oil to obtain a slurry of 10.0 wt %.

Synthesis Example 2'

Preparation of a Supported Catalyst

To a 100 ml three-neck flask, which had been thoroughly purged with nitrogen, a stirrer rod was equipped and 0.978 g of silica-supported methylaluminoxane (AL=16.9 wt %) was added. Thereto, 10 ml of dehydrated toluene was added at room temperature, 20 ml of a toluene solution of 20.1 mg of the isopropylidene(3-tert-butyl-5-ethylcyclopentadienyl) (octamethyloctahydrodibenzofluorenyl)zirconium dichloride synthesized by the above-mentioned Synthesis Example 2 was added as a transition metal compound under stirring, and stirred for 1 hour. The obtained slurry was filtered, and powder on the filter was washed once with 10 ml of dehydrated toluene, and subsequently washed three times with 10 ml of dehydrated hexane. The washed powder was dried under reduced pressure for 2 hours to obtain 0.902 g of powder. The obtained powder was mixed with a mineral oil to obtain a slurry of 10.0 wt %.

Synthesis Example 3'

Preparation of a Supported Catalyst

To a 100 ml three-neck flask, which had been thoroughly purged with nitrogen, a stirrer rod was equipped and 0.980 g of silica-supported methylaluminoxane (AL=16.9 wt %) was added. Thereto, 10 ml of dehydrated toluene was added at room temperature, 20 ml of a toluene solution of 20.1 mg of the (phenyl)(methyl)methylene(3-tert-butyl-5-ethylcyclopentadienyl)(octamethyloctahydrodibenzofluorenyl)zirconium dichloride synthesized by the above-mentioned Synthesis Example 3 was added as a transition metal compound under stirring, and stirred for 1 hour. The obtained slurry was filtered, and powder on the filter was washed once with 10 ml of dehydrated toluene, and subsequently washed three times with 10 ml of dehydrated hexane. The washed powder was dried under reduced pressure for 2 hours to obtain 0.908 g of powder. The obtained powder was mixed with a mineral oil to obtain a slurry of 10.0 wt %.

Synthesis Example 4'

Preparation of a Supported Catalyst

To a 100 ml three-neck flask, which had been thoroughly purged with nitrogen, a stirrer rod was equipped and 0.996 g of silica-supported methylaluminoxane (AL=16.6 wt %) was added. Thereto, 30 ml of dehydrated toluene was added at room temperature, 20 ml of a toluene solution of 20.0 mg of the diphenylmethylene(3-tert-butyl-5-ethylcyclopentadienyl)(2,7-di-tert-butylfluorenyl)zirconium dichloride synthesized by the above-mentioned Synthesis Example 4 was added as a transition metal compound under stirring, and stirred for 1 hour. The obtained slurry was filtered, and powder on the filter was washed once with 10 ml of dehydrated toluene, and subsequently washed three times with 10 ml of dehydrated hexane. The washed powder was dried under reduced pressure for 2 hours to obtain 0.917 g of powder. The obtained powder was mixed with a mineral oil to obtain a slurry of 10.0 wt %.

Synthesis Example 5'

Preparation of a Supported Catalyst

To a 100 ml three-neck flask, which had been thoroughly purged with nitrogen, a stirrer rod was equipped and 0.950 g of silica-supported methylaluminoxane (AL=16.1 wt %) was added. Thereto, 10 ml of dehydrated toluene was added at room temperature, 20 ml of a toluene solution of 19.4 mg of the isopropylidene(3-tert-butyl-5-methylcyclopentadienyl)(octamethyloctahydrodibenzofluorenyl)zirconium dichloride synthesized by the above-mentioned Synthesis Example 5 was added as a transition metal compound under stirring, and stirred for 1 hour. The obtained slurry was filtered, and powder on the filter was washed once with 10 ml of dehydrated toluene, and subsequently washed three times with 10 ml of dehydrated hexane. The washed powder was dried under reduced pressure for 2 hours to obtain 0.929 g of powder. The obtained powder was mixed with a mineral oil to obtain a slurry of 10.0 wt %.

Synthesis Example 6'

Preparation of a Supported Catalyst

To a 100 ml three-neck flask, which had been thoroughly purged with nitrogen, a stirrer rod was equipped and 0.980 g of silica-supported methylaluminoxane (AL=14.6 wt %) was added. Thereto, 10 ml of dehydrated toluene was added at room temperature, 20 ml of a toluene solution of 20.0 mg of the phenyl(methyl)methylene(3-tert-butyl-5-methylcyclopentadienyl)(octamethyloctahydrodibenzofluorenyl)zirconium dichloride synthesized by the above-mentioned Synthesis Example 6 was added as a transition metal compound under stirring, and stirred for 1 hour. The obtained slurry was filtered, and powder on the filter was washed once with 10 ml of dehydrated toluene, and subsequently washed three times with 10 ml of dehydrated hexane. The washed powder was dried under reduced pressure for 1 hour to obtain 0.936 g of powder. The obtained powder was mixed with a mineral oil to obtain a slurry of 10.0 wt %.

Example 1

Propylene Bulk Polymerization

To a 50 ml side-arm flask thoroughly purged with nitrogen, a magnetic stirrer chip was placed, and 1.02 g of a supported catalyst slurry prepared in the above-mentioned Synthesis Example 1', 1.0 mmol of hexane solution (Al=1.0M) of tri-isobutylalminium and 5.0 ml of dehydrated hexane were added. The resultant mixture was introduced to an SUS-made autoclave having the internal volume of 2000 ml thoroughly purged with nitrogen. Thereafter, 500 g of liquid propylene was charged thereto. After the polymerization was carried out at 70° C. for 40 minutes, the autoclave was cooled and propylene was purged to stop the polymerization. The polymer was dried under reduced pressure at 80° C. for 10 hours. The obtained polymer was 58.5 g of the isotactic polypropylene and the polymerization activity was 27.9 kg-pp/mmol-Zr·hr. The polymer analysis resulted that [η]=3.37 dl/g, Mw=565,000, Mw/Mn=3.0 and Tm=137.8° C.

Example 2

Propylene Bulk Polymerization

The polymerization was carried out under the same condition as in the above Example 1b, except that 340 mg of a supported catalyst slurry prepared in the above-mentioned Synthesis Example 1' was used and that 0.30 NL of hydrogen was added after charging 500 g of liquid propylene. The obtained polymer was 53.4 g of the isotactic polypropylene and the polymerization activity was 76.2 kg-pp/mmol-Zr·hr. The polymer analysis resulted that the [η]=0.84 dl/g, Mw=85,000, Mw/Mn=2.5 and Tm=140.2° C.

Example 3b

Propylene Bulk Polymerization

The polymerization was carried out under the same condition as in the above Example 1b, except that 1.03 g of a supported catalyst slurry prepared in the above-mentioned Synthesis Example 2' was used. The obtained polymer was 12.2 g of the isotactic polypropylene and the polymerization activity was 8.1 kg-pp/mmol-Zr hr. The polymer analysis resulted that [η]=2.87 dl/g, Mw=430,000, Mw/Mn=2.7 and Tm=151.1° C.

Example 4b

Propylene Bulk Polymerization

The polymerization was carried out under the same condition as in the above Example 1b, except that 341 mg of a supported catalyst slurry prepared in the above-mentioned Synthesis Example 2' was used and that 0.30 NL of hydrogen was added after charging 500 g of liquid propylene. The obtained polymer was 113.7 g of the isotactic polypropylene and the polymerization activity was 229.9 kg-pp/mmol-Zr·hr. The polymer analysis resulted that [η]=1.10 dl/g, Mw=116,000, Mw/Mn=2.4 and Tm=158.1° C. The mesopentad content (mmmm) obtained by $^{13}$C-NMR spectrum was 95.3%. The irregular unit derived from 2,1-insertion and 1,3-insertion was not detected.

Example 5b

Propylene Bulk Polymerization

The polymerization was carried out under the same condition as in the above Example 1b, except that 1.04 g of a supported catalyst slurry prepared in the above-mentioned Synthesis Example 3' was used. The obtained polymer was 20.0 g of the isotactic polypropylene and the polymerization activity was 12.5 kg-pp/mmol-Zr·hr. The polymer analysis resulted that [η]=2.72 dl/g, Mw=426,000, Mw/Mn=2.9 and Tm=154.1° c.

Example 6b

Propylene Bulk Polymerization

The polymerization was carried out under the same condition as in the above Example 1b, except that 342 mg of a supported catalyst slurry prepared in the above-mentioned Synthesis Example 3' was used and that 0.30 NL of hydrogen was added after charging 500 g of liquid propylene. The obtained polymer was 75.7 g of the isotactic polypropylene and the polymerization activity was 144.3 kg-pp/mmol-Zr·hr. The polymer analysis resulted that [η]=1.17 dl/g, Mw=126,000, Mw/Mn=2.4 and Tm=159.1° C. The mesopentad content (mmmm) obtained by $^{13}$C-NMR spectrum was 95.4%. The irregular unit derived from 2,1-insertion and 1,3-insertion was not detected.

Example 7b

Propylene/Ethylene Copolymerization

To an SUS-made autoclave having an internal volume of 2000 ml thoroughly purged with nitrogen, 300 g of liquid propylene was charged, then heated to 55° C. under sufficient stirring, and the inside of the autoclave was pressurized with ethylene gas to 30 kg/cm$^2$ G. Subsequently, to a pot for charging catalyst having an internal volume of 30 ml thoroughly purged with nitrogen, which is attached on the autoclave, a mixture solution of 4 ml of dehydrated hexane and 1 ml of hexane solution (Al=1.0 M) of triisobutylaluminum was added, and charged to the autoclave while pressurizing with nitrogen. Next, to the pot for charging catalyst, the mixture of 340 mg of a supported catalyst slurry prepared in the above-mentioned Synthesis Example 1' and 1.0 mmol of hexane solution (Al=1.0 M) of triisobutylaluminum was added, and charged to the autoclave while pressurizing with nitrogen to initiate the polymerization. After carrying out the polymerization for 11 minutes, a small amount of methanol was added to stop the polymerization. The polymer was added to an excess methanol added with hydrochloric acid to carry out deashing. The resultant polymer was separated by filtration, and then dried at 80° C. for 10 hours under reduced pressure. 19.5 g of the polymer was obtained, and the polymerization activity was 101.5 kg-Polymer/mmol-Zr·hr. The polymer analysis resulted that ethylene content of the polymer=38% by mole, [η]=4.17 dl/g, Mw=397,000, Mw/Mn=2.7.

Example 8b

Propylene/Ethylene Copolymerization

The polymerization was carried out under the same condition as in the above Example 7b, except that the inside of the autoclave was pressurized with ethylene gas to 35 kg/cm$^2$ G, and the polymerization was carried out for 10 minutes. The obtained polymer was 28.9 g and the polymerization activity was 165.3 kg-Polymer/mmol-Zr·hr. The polymer analysis resulted that ethylene content of the polymer=48% by mole, [η]=4.24 dl/g, Mw=517,000 and Mw/Mn=2.3.

Example 9b

Propylene/Ethylene Copolymerization

The polymerization was carried out under the same condition as in the above Example 7b, except that 342 mg of a supported catalyst slurry prepared in the above-mentioned Synthesis Example 2' was used, and the polymerization was carried out for 15 minutes. The obtained polymer was 15.6 g and the polymerization activity was 83.8 kg-Polymer/mmol-Zr·hr. The polymer analysis resulted that ethylene content of the polymer=23% by mole, [η]=0.98 dl/g, Mw=75,000, and Mw/Mn=2.4.

Example 10b

Propylene/Ethylene Copolymerization

The polymerization was carried out under the same condition as in the above Example 7b, except that the inside of the autoclave was pressurized with ethylene gas to 35 kg/cm$^2$ G, 340 mg of a supported catalyst slurry prepared in the above-mentioned Synthesis Example 2' was used and the polymerization was carried out for 10 minutes. The obtained polymer was 8.6 g and the polymerization activity was 69.7 kg-Polymer/mmol-Zr·hr. The polymer analysis resulted that ethylene content of the polymer=39% by mole, [η]=1.08 dl/g, Mw=89,000, and Mw/Mn=2.5.

Example 11b

Propylene/Ethylene Copolymerization

The polymerization was carried out under the same condition as in the above Example 7b, except that 341 mg of a supported catalyst slurry prepared in the above-mentioned Synthesis Example 3' was used, and the polymerization was carried out for 15 minutes. The obtained polymer was 12.2 g and the polymerization activity was 62.2 kg-Polymer/mmol-Zr·hr. The polymer analysis resulted that ethylene content of the polymer=25% by mole, [η]=1.77 dl/g, Mw=190,000, and Mw/Mn=2.2.

Example 12b

Propylene/Ethylene Copolymerization

The polymerization was carried out under the same condition as in the above Example 7b, except that the inside of the autoclave was pressurized with ethylene gas to 35 kg/cm$^2$ G, 340 mg of a supported catalyst slurry prepared in the above-mentioned Synthesis Example 3' was used, and the polymerization was carried out for 10 minutes. The obtained polymer was 12.6 g and the polymerization activity was 96.5 kg-Polymer/mmol-Zr·hr. The polymer analysis resulted that ethylene content of the polymer=40% by mole, [η]=1.78 dl/g, Mw=188,000, and Mw/Mn=3.2.

Example 13b

Propylene Bulk Polymerization

To a 50 ml side-arm flask thoroughly purged with nitrogen, a magnetic stirrer chip was placed, and 1.03 g of a supported catalyst slurry prepared in the above-mentioned Synthesis Example 4', 1.0 mmol of hexane solution (Al=1.0M) of triisobutylalminium and 5.0 ml of dehydrated hexane were added. The resultant mixture was introduced to an SUS-made autoclave having the internal volume of 2000 ml thoroughly purged with nitrogen. Thereafter, 500 g of liquid propylene was charged thereto. After the polymerization was carried out at 70° C. for 40 minutes, the autoclave was cooled and propylene was purged to stop the polymerization. The polymer was dried under reduced pressure at 80° C. for 10 hours. The obtained polymer was 68.9 g of the isotactic polypropylene and the polymerization activity was 38.4 kg-pp/mmol-Zr·hr. The polymer analysis resulted that [η]=3.51 dl/g, Mw=595,000, Mw/Mn=2.8 and Tm=142.8° C.

Example 14b

Propylene Bulk Polymerization

The polymerization was carried out under the same condition as in the above Example 13b, except that 348 mg of a supported catalyst slurry prepared in the above-mentioned Synthesis Example 4' was used and that 0.15 NL of hydrogen was added after charging 500 g of liquid propylene. The obtained polymer was 122.2 g of the isotactic polypropylene and the polymerization activity was 201.0 kg-pp/mmol-Zr·hr. The polymer analysis resulted that [η]=1.12 dl/g, Mw=113,000, Mw/Mn=2.3 and Tm=145.3° C.

Example 15b

Propylene/Ethylene Copolymerization

To an SUS-made autoclave having an internal volume of 2000 ml thoroughly purged with nitrogen, 300 g of liquid propylene was charged, then heated to 55° C. under sufficient stirring, and the inside of the autoclave was pressurized with ethylene gas to 30 kg/cm$^2$ G. Subsequently, to a pot for charging catalyst having an internal volume of 30 ml thoroughly purged with nitrogen, which is attached on the autoclave, a mixture solution of 4 ml of dehydrated hexane and 1 ml of hexane solution (Al=1.0 M) of triisobutylaluminum was added, and charged to the autoclave while pressurizing with nitrogen. Next, to the pot for charging catalyst, the mixture of 348 mg of a supported catalyst slurry prepared in the above-mentioned Synthesis Example 4' and 1.0 mmol of hexane solution (Al=1.0 M) of triisobutylaluminum was added, and charged to the autoclave while pressurizing with nitrogen to initiate the polymerization. After carrying out the polymerization for 10 minutes, a small amount of methanol was added to stop the polymerization. The polymer was added to an excess methanol added with hydrochloric acid, and then deashing was carried out. The resultant polymer was separated by filtration, and then dried at 80° C. for 10 hours under reduced pressure. The obtained polymer was 20.7 g and the polymerization activity was 135.6 kg-Polymer/mmol-Zr·hr. The polymer analysis resulted that ethylene content of the polymer=31% by mole, [η]=4.77 dl/g, Mw=633,000, Mw/Mn=2.2.

Example 16b

Propylene/Ethylene Copolymerization

The polymerization was carried out under the same condition as in the above Example 15b, except that the inside of the autoclave was pressurized with ethylene gas to 35 kg/cm$^2$ G, 351 mg of a supported catalyst slurry prepared in the above-mentioned Synthesis Example 4' was used and the polymerization was carried out for 10 minutes. The obtained polymer was 13.4 g and the polymerization activity was 87.6 kg-Polymer/mmol-Zr·hr. The polymer analysis resulted that ethylene content of the polymer=38% by mole, [η]=5.12 dl/g, Mw=694,000 and Mw/Mn=2.2.

Example 17b

Propylene Bulk Polymerization

To a 50 ml side-arm flask thoroughly purged with nitrogen, a magnetic stirrer chip was placed, and 1.02 g of a supported catalyst slurry prepared in the above-mentioned Synthesis Example 5', 1.0 mmol of hexane solution (Al=1.0M) of triisobutylalminium and 5.0 ml of dehydrated hexane were added. The resultant mixture was introduced to an SUS-made autoclave having the internal volume of 2000 ml thoroughly purged with nitrogen. Thereafter, 500 g of liquid propylene was charged thereto. After the polymerization was carried out at 70° C. for 40 minutes, the autoclave was cooled and propylene was purged to stop the polymerization. The polymer was dried under reduced pressure at 80° C. for 10 hours. The obtained polymer was 48.2 g of the isotactic polypropylene and the polymerization activity was 25.9 kg-pp/mmol-Zr hr. The polymer analysis resulted that [η]=2.82 dl/g, Mw=445,000, Mw/Mn=2.6, and Tm=156.4° C.

Example 18b

Propylene Bulk Polymerization

The polymerization was carried out under the same condition as in the above Example 17b, except that 340 mg of a supported catalyst slurry prepared in the above-mentioned Synthesis Example 5' was used and that 0.30 NL of hydrogen was added after charging 500 g of liquid propylene. The obtained polymer was 148.0 g of the isotactic polypropylene and the polymerization activity was 238.8 kg-pp/mmol-Zr·hr. The polymer analysis resulted that [η]=1.59 dl/g, Mw=171,000, Mw/Mn=2.2 and Tm=160.3° C.

Example 19b

Propylene Bulk Polymerization

The polymerization was carried out under the same condition as in the above Example 17b, except that 1.02 g of a supported catalyst slurry prepared in the above-mentioned Synthesis Example 6' was used. The obtained polymer was 29.9 g of the isotactic polypropylene and the polymerization activity was 17.2 kg-pp/mmol-Zr·hr. The polymer analysis resulted that [η]=3.49 dl/g, Mw=612,000, Mw/Mn=3.1 and Tm=156.3

Example 20b

Propylene Bulk Polymerization

The polymerization was carried out under the same condition as in the above Example 17b, except that 340 mg of a supported catalyst slurry prepared in the above-mentioned Synthesis Example 6' was used and that 0.30 NL of hydrogen was added after charging 500 g of liquid propylene. The obtained polymer was 117.9 g of the isotactic polypropylene and the polymerization activity was 204.2 kg-pp/mmol-Zr·hr. The polymer analysis resulted that [η]=1.55 dl/g, Mw=180,000, Mw/Mn=2.6 and Tm=160.9° C.

Example 21b

Propylene/Ethylene Copolymerization

To an SUS-made autoclave having an internal volume of 2000 ml thoroughly purged with nitrogen, 300 g of liquid propylene was charged, then heated to 55° C. under sufficient stirring, and the inside of the autoclave was pressurized with ethylene gas to 30 kg/cm² G. Subsequently, to a pot for charging catalyst having an internal volume of 30 ml thoroughly purged with nitrogen, which is attached on the autoclave, a mixture solution of 4 ml of dehydrated hexane and 1 ml of hexane solution (Al=1.0 M) of triisobutylaluminum was added, and charged to the autoclave while pressurizing with nitrogen. Next, to the pot for charging catalyst, the mixture of 340 mg of a supported catalyst slurry prepared in the above-mentioned Synthesis Example 5' and 1.0 mmol of hexane solution (Al=1.0 M) of triisobutylaluminum was added, and charged to the autoclave while pressurizing with nitrogen to initiate the polymerization. After carrying out the polymerization for 10 minutes, a small amount of methanol was added to stop the polymerization. The polymer was added to an excess methanol added with hydrochloric acid, and then deashing was carried out. The resultant polymer was separated by filtration, and then dried at 80° C. for 10 hours under reduced pressure. The obtained polymer was 17.6 g and the polymerization activity was 113.5 kg-Polymer/mmol-Zr·hr. The polymer analysis resulted that ethylene content of the polymer=22% by mole, [η]=1.00 dl/g, Mw=85,000, Mw/Mn=2.3.

Example 22b

Propylene/Ethylene Copolymerization

The polymerization was carried out under the same condition as in the above Example 21b, except that the inside of the autoclave was pressurized with ethylene gas to 35 kg/cm² G. The obtained polymer was 19.2 g and the polymerization activity was 123.8 kg-Polymer/mmol-Zr·hr. The polymer analysis resulted that ethylene content of the polymer=38% by mole, [η]=1.23 dl/g, Mw=102,000 and Mw/Mn=2.2.

Example 23b

Propylene/Ethylene Copolymerization

The polymerization was carried out under the same condition as in the above Example 21b, except that 340 mg of a supported catalyst slurry prepared in the above-mentioned Synthesis Example 6' was used, and the polymerization was carried out for 20 minutes. The obtained polymer was 17.8 g and the polymerization activity was 61.8 kg-Polymer/mmol-Zr·hr. The polymer analysis resulted that ethylene content of the polymer=28% by mole, [η]=1.66 dl/g, Mw=166,000, and Mw/Mn=2.7.

Example 24b

Propylene/Ethylene Copolymerization

The polymerization was carried out under the same condition as in the above Example 21b, except that the inside of the autoclave was pressurized with ethylene gas to 35 kg/cm2 G, and 340 mg of a supported catalyst slurry prepared in the above-mentioned Synthesis Example 6' was used. The obtained polymer was 18.5 g and the polymerization activity was 128.4 kg-Polymer/mmol-Zr·hr. The polymer analysis resulted that ethylene content of the polymer=37% by mole, [η]=1.94 dl/g, Mw=189,000 and Mw/Mn=2.7.

Example 25b

Propylene/Ethylene Random Polymerization

To a 50 ml side-arm flask thoroughly purged with nitrogen, a magnetic stirrer chip was placed, and 340 mg of a supported catalyst slurry prepared in the above-mentioned Synthesis Example 5', 1.0 mmol of hexane solution (Al=1.0M) of tri-isobutylalminium and 5.0 ml of dehydrated hexane were added. The resultant mixture was introduced to an SUS-made autoclave having the internal volume of 2000 ml thoroughly purged with nitrogen. Thereafter, 500 g of liquid propylene was charged thereto, and 2.10 NL of ethylene and 0.30 NL of hydrogen were added. After the polymerization was carried out at 60° C. for 40 minutes, the autoclave was cooled and propylene was purged to stop the polymerization. The polymer was dried under reduced pressure at 80° C. for 10 hours. The obtained polymer was 131.1 g and the polymerization activity was 211.5 kg-pp/mmol-Zr·hr. The polymer analysis resulted that ethylene content of the polymer=1.00 wt %, [η]=1.10 dl/g and Tm=148.2° C.

Example 26b

Propylene/Ethylene Random Copolymerization

The polymerization was carried out under the same condition as in the above Example 25b, except that 513 mg of a supported catalyst slurry prepared in the above-mentioned Synthesis Example 6' was used, and 2.33 NL of ethylene was added after charging 500 g of liquid propylene. The obtained polymer was 154.9 g and the polymerization activity was 177.8 kg-pp/mmol-Zr·hr. The polymer analysis resulted that ethylene content of the polymer=1.00 wt %, [η]=1.46 dl/g and Tm=146.9° C.

Example 27b

Propylene Bulk Polymerization

The polymerization was carried out under the same condition as in the above Example 17b, except that 340 mg of a supported catalyst slurry prepared in the above-mentioned Synthesis Example 5' was used, and 0.60 NL of hydrogen was added after charging 500 g of liquid propylene. The obtained polymer was 192.0 g of the isotactic polypropylene and the polymerization activity was 309.8 kg-pp/mmol-Zr·hr. The polymer analysis resulted that [η]=1.30 dl/g, Mw=133,000, Mw/Mn=2.2 and Tm=159.7° C. The mesopentad content

Example 28b

Propylene Bulk Polymerization

The polymerization was carried out under the same condition as in the above Example 19b, except that 340 mg of a supported catalyst slurry prepared in the above-mentioned Synthesis Example 6' was used, and 0.60 NL of hydrogen was added after charging 500 g of liquid propylene. The obtained polymer was 159.5 g of the isotactic polypropylene and the polymerization activity was 276.3 kg-pp/mmol-Zr·hr. The polymer analysis resulted that $[\eta]=1.30$ dl/g, Mw=133,000, Mw/Mn=2.2 and Tm=160.1° C. The mesopentad content (mmmm) obtained by $^{13}$C-NMR spectrum was 96.9%. The irregular unit derived from 2,1-insertion and 1,3-insertion was not detected.

Comparative Example 1b

Preparation of a Supported Catalyst

To a 50 ml two-neck flask, which had been thoroughly purged with nitrogen, 50 mg of silica-supported methylaluminoxane was added, 20 ml of toluene was added and then suspended. Thereto, a toluene solution of 1.0 mg of the isopropylidene(3-tert-butylcyclopentadienyl)(1,1,4,4,7,7,10,10-octamethyl-octahydro-dibenzo[b,h]fluorenyl)zirconium dichloride synthesized in accordance with the disclosure in WO 01/27124 was added at room temperature as a transition metal compound under stirring. Thereafter, triisobutylaluminum (1 mmol) was subsequently added, and stirred for 30 minutes to give a catalyst suspension.

Propylene Bulk Polymerization

The catalyst suspension was introduced to an SUS-made autoclave having the internal volume of 2000 ml thoroughly purged with nitrogen. Thereafter, 500 g of liquid propylene was charged thereto. After the polymerization was carried out at 70° C. for 40 minutes, the autoclave was cooled and propylene was purged to stop the polymerization. The polymer was dried under reduced pressure at 80° C. for 10 hours. The obtained polymer was 20.0 g of the isotactic polypropylene and the polymerization activity was 21 kg-pp/mmol-Zr·hr. The polymer analysis resulted that $[\eta]=1.00$ dl/g and Tm=148.6° C.

Comparative Example 2b

Propylene Bulk Polymerization

The polymerization was carried out under the same condition as in the above Comparative Example 1b, except that 0.30 NL of hydrogen was added. The obtained polymer was 183 g of the isotactic polypropylene and the polymerization activity was 194 kg-pp/mmol-Zr·hr. The polymer analysis resulted that $[\eta]=0.32$ dl/g, and Tm=153.0° C.

Comparative Example 3b

Preparation of a Supported Catalyst

To a 50 ml two-neck flask, which had been thoroughly purged with nitrogen, 34 mg of silica-supported methylaluminoxane was added, 20 ml of toluene was added and then suspended. Thereto, a toluene solution of 0.68 mg of the isopropylidene(3-tert-butylcyclopentadienyl)(3,6-di-tert-butylfluorenyl)zirconium dichloride synthesized in accordance with the disclosure in WO 01/27124 was added at room temperature as a transition metal compound under stirring. Thereafter, triisobutylaluminum (1 mmol) was subsequently added, and stirred for 30 minutes to give a catalyst suspension.

Propylene Bulk Polymerization

The catalyst suspension was introduced to an SUS-made autoclave having the internal volume of 2000 ml thoroughly purged with nitrogen. Thereafter, 500 g of liquid propylene was charged thereto. After the polymerization was carried out at 70° C. for 40 minutes, the autoclave was cooled and propylene was purged to stop the polymerization. The polymer was dried under reduced pressure at 80° C. for 10 hours. The obtained polymer was 250 g of the isotactic polypropylene and the polymerization activity was 22 kg-pp/mmol-Zr·hr. The polymer analysis resulted that $[\eta]=0.97$ dl/g and Tm=148.0° C.

Comparative Example 4b

Propylene Bulk Polymerization

The polymerization was carried out under the same condition as in the above Comparative Example 3b, except that 0.30 NL of hydrogen was added. The obtained polymer was 124 g of the isotactic polypropylene and the polymerization activity was 164 kg-pp/mmol-Zr·hr. The polymer analysis resulted that $[\eta]=0.59$ dl/g and Tm=152.0° C.

Comparative Example 5b

Preparation of a Supported Catalyst

To a 100 ml three-neck flask, which had been thoroughly purged with nitrogen, a stirrer rod was equipped and 1.26 g of silica-supported methylaluminoxane (AL=19.1 wt %) was added. Thereto, 10 ml of dehydrated toluene was added at room temperature, 20 ml of a toluene solution of 25.4 mg of the rac-dimethylsilylenebis(2-methyl-4-phenylindenyl)zirconium dichloride synthesized in accordance with EP576970 was added as a transition metal compound under stirring, and stirred for 1 hour. The obtained slurry was filtered, and powder on the filter was washed once with 10 ml of dehydrated toluene, and subsequently washed three times with 10 ml of dehydrated hexane. The washed powder was dried under reduced pressure for 2 hours to obtain 1.20 g of powder. The obtained powder was mixed with a mineral oil to obtain a slurry of 10.0 wt %.

Propylene/Ethylene Copolymerization

The polymerization and post-processing were carried out under the same condition as in the above Example 7b, except that 170 mg of the above supported catalyst slurry was used, and the polymerization was carried out for 5 minutes. The obtained polymer was 33.0 g and the polymerization activity was 740.2 kg-Polymer/mmol-Zr·hr. The polymer analysis resulted that ethylene content of the polymer=13% by mole, $[\eta]=2.05$ dl/g, Mw=257,000 and Mw/Mn=3.6

Example 1s

Propylene/Ethylene/Butene Copolymerization

To a 2000 ml polymerization apparatus dried under reduced pressure and thoroughly purged with nitrogen, 817 ml of dry hexane, 50 g of 1-butene and triisobutylaluminum (1.0 mmol) were charged at normal temperature, then the temperature inside the polymerization apparatus was elevated to 55° C., and the polymerization apparatus was pressurized with propylene to 0.70 MPa and subsequently pressurized with ethylene to 0.75 MPa. Thereafter, a toluene solution in which 0.001 mmol of diphenylmethylene(3-tert-butyl-5-ethylcyclopentadienyl) (2,7-ditert-butyl-fluorenyl)zirconium dichloride synthesized by Synthesis Method 4 and methylaluminoxane (manufactured by Tosoh Finechem Corp.) in terms of 0.3 mmol of aluminum were contacted, was added to the polymerization vessel, and polymerization was conducted for 25 minutes while maintaining the internal temperature at 55° C. and the total pressure at 0.75 MPa by continuously supplying ethylene. The polymerization was stopped by adding 20 ml of methanol. After depressurizing, a polymer was precipitated out of the polymerization solution in 2 L of methanol, and was dried in a vacuum at 130° C. for 12 hours. The obtained polymer was 46.1 g and the polymerization activity was 110.7 kg/mmol-cat-hr. The polymer had a composition of 74.5 mol % of propylene content, 17.5 mol % of ethylene content and 8.0 mol % of 1-butene content, and had an intrinsic viscosity [η] of 2.98 dl/g. Triad isotacticity was 94%.

Example 2s

Propylene/Ethylene/Butene Copolymerization

To a 2000 ml polymerization apparatus dried under reduced pressure and thoroughly purged with nitrogen, 817 ml of dry hexane, 50 g of 1-butene and triisobutylaluminum (1.0 mmol) were charged at normal temperature, then the temperature inside the polymerization apparatus was elevated to 65° C., and the polymerization apparatus was pressurized with propylene to 0.72 MPa and subsequently pressurized with ethylene to 0.75 MPa. Thereafter, a toluene solution in which 0.0001 mmol of diphenylmethylene(3-tert-butyl-5-ethylcyclopentadienyl)(2,7-ditert-butyl-fluorenyl)zirconium dichloride synthesized by Synthesis Method 4 and methylaluminoxane (manufactured by Tosoh Finechem Corp.) in terms of 0.3 mmol of aluminum were contacted, was added to the polymerization vessel, and polymerization was conducted for 25 minutes while maintaining the internal temperature at 65° C. and the total pressure at 0.75 MPa by continuously supplying ethylene. The polymerization was stopped by adding 20 ml of methanol. After depressurizing, a polymer was precipitated out of the polymerization solution in 2 L of methanol, and was dried in a vacuum at 130° C. for 12 hours. The obtained polymer was 14.2 g and the polymerization activity was 34.1 kg/mmol-cat hr. The polymer had a composition of 78.0 mol % of propylene content, 14.0 mol % of ethylene content and 8.0 mol % of 1-butene content, and had an intrinsic viscosity [η] of 2.44 dl/g.

Example 3s

Propylene-Ethylene-Butene Copolymerization

To a 2000 ml polymerization apparatus dried under reduced pressure and thoroughly purged with nitrogen, 800 ml of dry hexane, 60 g of 1-butene and triisobutylaluminum (1.0 mmol) were charged at normal temperature, then the temperature inside the polymerization apparatus was elevated to 40° C., and the polymerization apparatus was pressurized with propylene to 0.60 MPa and subsequently pressurized with ethylene to 0.75 MPa. Thereafter, a toluene solution in which 0.001 mmol of diphenylmethylene(3-tert-butyl-5-ethylcyclopentadienyl)(fluorenyl)zirconium dichloride synthesized by Synthesis Method 1 and methylaluminoxane (manufactured by Tosoh Finechem Corp.) in terms of 0.3 mmol of aluminum were contacted, was added to the polymerization vessel, and polymerization was conducted for 24 minutes while maintaining the internal temperature at 40° C. and the total pressure at 0.75 MPa by continuously supplying ethylene. The polymerization was stopped by adding 20 ml of methanol. After depressurizing, a polymer was precipitated out of the polymerization solution in 2 L of methanol, and was dried in a vacuum at 130° C. for 12 hours. The obtained polymer was 63.6 g and the polymerization activity was 159.1 kg/mmol-cat hr. The polymer had a composition of 65.5 mol % of propylene content, 27.0 mol % of ethylene content and 7.5 mol % of 1-butene content, and had an intrinsic viscosity [η] of 3.67 dl/g.

Example 4s

Propylene/Ethylene/Butene Copolymerization

To a 2000 ml polymerization apparatus dried under reduced pressure and thoroughly purged with nitrogen, 817 ml of dry hexane, 50 g of 1-butene and triisobutylaluminum (1.0 mmol) were charged at normal temperature, then the temperature inside the polymerization apparatus was elevated to 55° C., and the polymerization apparatus was pressurized with propylene to 0.60 MPa and subsequently pressurized with ethylene to 0.75 MPa. Thereafter, a toluene solution in which 0.001 mmol of diphenylmethylene(3-tert-butyl-5-ethylcyclopentadienyl)(fluorenyl)zirconium dichloride synthesized by Synthesis Method 1 and methylaluminoxane (manufactured by Tosoh Finechem Corp.) in terms of 0.3 mmol of aluminum were contacted, was added to the polymerization vessel, and polymerization was conducted for 18 minutes while maintaining the internal temperature at 55° C. and the total pressure at 0.75 MPa by continuously supplying ethylene. The polymerization was stopped by adding 20 ml of methanol. After depressurizing, a polymer was precipitated out of the polymerization solution in 2 L of methanol, and was dried in a vacuum at 130° C. for 12 hours. The obtained polymer was 42.8 g and the polymerization activity was 142.5 kg/mmol-cat-hr. The polymer had a composition of 61.0 mol % of propylene content, 29.5 mol % of ethylene content and 9.5 mol % of 1-butene content, and had an intrinsic viscosity [η] of 2.82 dl/g.

Example 5s

Propylene/Ethylene/Butene Copolymerization

To a 2000 ml polymerization apparatus dried under reduced pressure and thoroughly purged with nitrogen, 800 ml of dry hexane, 60 g of 1-butene and triisobutylaluminum (1.0 mmol) were charged at normal temperature, then the temperature inside the polymerization apparatus was elevated to 40° C., and the polymerization apparatus was pressurized with propylene to 0.60 MPa and subsequently pressurized with ethylene to 0.75 MPa. Thereafter, a toluene solution in which 0.001 mmol of di(m-trifluoromethylphenyl)methylene (3-tert-butyl-5-methylcyclopentadienyl)(2,7-ditert-butyl-fluorenyl)zirconium dichloride synthesized by Synthesis Method 7 and methylaluminoxane (manufactured by Tosoh Finechem Corp.) in terms of 0.3 mmol of aluminum were contacted, was added to the polymerization vessel, and polymerization was conducted for 24 minutes while maintaining the internal temperature at 40° C. and the total pressure at 0.75 MPa by continuously supplying ethylene. The polymerization was stopped by adding 20 ml of methanol. After depressurizing, a polymer was precipitated out of the polymerization solution in 2 L of methanol, and was dried in a vacuum at 130° C. for 12 hours. The obtained polymer was 63.5 g and the polymerization activity was 158.7 kg/mmol-cat-hr. The polymer had a composition of 65.5 mol % of propylene content, 27.0 mol % of ethylene content and 7.5 mol % of 1-butene content, and had an intrinsic viscosity [η] of 3.11 dl/g.

Example 6s

Propylene/Ethylene/Butene Copolymerization

To a 2000 ml polymerization apparatus dried under reduced pressure and thoroughly purged with nitrogen, 817 ml of dry hexane, 50 g of 1-butene and triisobutylaluminum (1.0 mmol) were charged at normal temperature, then the temperature inside the polymerization apparatus was elevated to 55° C., and the polymerization apparatus was pressurized with propylene to 0.70 MPa and subsequently pressurized with ethylene to 0.75 MPa. Thereafter, a toluene solution in which 0.001 mmol of di(m-trifluoromethylphenyl)methylene (3-tert-butyl-5-methylcyclopentadienyl)(2,7-ditert-butyl-fluorenyl)zirconium dichloride synthesized by Synthesis Method 7 and methylaluminoxane (manufactured by Tosoh Finechem Corp.) in terms of 0.3 mmol of aluminum were contacted, was added to the polymerization vessel, and polymerization was conducted for 25 minutes while maintaining the internal temperature at 55° C. and the total pressure at 0.75 MPa by continuously supplying ethylene. The polymerization was stopped by adding 20 ml of methanol. After depressurizing, a polymer was precipitated out of the polymerization solution in 2 L of methanol, and was dried in a vacuum at 130° C. for 12 hours. The obtained polymer was 63.1 g and the polymerization activity was 151.4 kg/mmol-cat·hr. The polymer had a composition of 69.5 mol % of propylene content, 21.5 mol % of ethylene content and 9.0 mol % of 1-butene content, and had an intrinsic viscosity [η] of 2.42 dl/g.

Example 7s

Propylene/Ethylene/Butene Copolymerization

To a 2000 ml polymerization apparatus dried under reduced pressure and thoroughly purged with nitrogen, 817 ml of dry hexane, 50 g of 1-butene and triisobutylaluminum (1.0 mmol) were charged at normal temperature, then the temperature inside the polymerization apparatus was elevated to 55° C., and the polymerization apparatus was pressurized with propylene to 0.70 MPa and subsequently pressurized with ethylene to 0.75 MPa. Thereafter, a toluene solution in which 0.001 mmol of di(p-tolyl)methylene(3-tert-butyl-5-methylcyclopentadienyl) (2,7-di-tert-butylfluorenyl)zirconium dichloride synthesized by Synthesis Method 8 and methylaluminoxane (manufactured by Tosoh Finechem Corp.) in terms of 0.3 mmol of aluminum were contacted, was added to the polymerization vessel, and polymerization was conducted for 16 minutes while maintaining the internal temperature at 55° C. and the total pressure at 0.75 MPa by continuously supplying ethylene. The polymerization was stopped by adding 20 ml of methanol. After depressurizing, a polymer was precipitated out of the polymerization solution in 2 L of methanol, and was dried in a vacuum at 130° C. for 12 hours. The obtained polymer was 79.5 g and the polymerization activity was 298.0 kg/mmol-cat-hr. The polymer had a composition of 70.5 mol % of propylene content, 23.5 mol % of ethylene content and 6.0 mol % of 1-butene content, and had an intrinsic viscosity [η] of 2.27 dl/g.

Example 8s

Propylene/Ethylene/Butene Copolymerization

To a 2000 ml polymerization apparatus dried under reduced pressure and thoroughly purged with nitrogen, 817 ml of dry hexane, 50 g of 1-butene and triisobutylaluminum (1.0 mmol) were charged at normal temperature, then the temperature inside the polymerization apparatus was elevated to 65° C., and the polymerization apparatus was pressurized with propylene to 0.70 MPa and subsequently pressurized with ethylene to 0.75 MPa. Thereafter, a toluene solution in which 0.002 mmol of di(m-trifluoromethylphenyl)methylene (3-tert-butyl-5-n-propylcyclopentadienyl)(fluorenyl)zirconium dichloride synthesized by Synthesis Method 9 and methylaluminoxane (manufactured by Tosoh Finechem Corp.) in terms of 0.6 mmol of aluminum were contacted, was added to the polymerization vessel, and polymerization was conducted for 16 minutes while maintaining the internal temperature at 65° C. and the total pressure at 0.75 MPa by continuously supplying ethylene. The polymerization was stopped by adding 20 ml of methanol. After depressurizing, a polymer was precipitated out of the polymerization solution in 2 L of methanol, and was dried in a vacuum at 130° C. for 12 hours. The obtained polymer was 120.7 g and the polymerization activity was 226.2 kg/mmol-cat-hr. The polymer had a composition of 58.5 mol % of propylene content, 32.5 mol % of ethylene content and 9.0 mol % of 1-butene content, and had an intrinsic viscosity [η] of 1.65 dl/g.

Comparative Example 1s

Propylene/Ethylene/Butene Copolymerization

To a 4000 ml polymerization apparatus dried under reduced pressure and thoroughly purged with nitrogen, 1670 ml of dry hexane, 73.3 g of 1-butene and triisobutylaluminum (1.0 mmol) were charged at normal temperature, then the temperature inside the polymerization apparatus was elevated to 40° C., and the polymerization apparatus was pressurized with propylene to 0.30 MPa and subsequently pressurized with ethylene to 0.40 MPa. Thereafter, a toluene solution in which 0.002 mmol of rac-dimethylsilylenebis(2-methyl-4-phenyl-indenyl)zirconium dichloride and methylaluminoxane (manufactured by Tosoh Finechem Corp.) in terms of 0.6 mmol of aluminum were contacted, was added to the polymerization vessel, and polymerization was conducted for 20 minutes while maintaining the internal temperature at 40° C. and the total pressure at 0.80 MPa by continuously supplying ethylene. The polymerization was stopped by adding 20 ml of methanol. After depressurizing, a polymer was precipitated out of the polymerization solution in 2 L of methanol, and was dried in a vacuum at 130° C. for 12 hours. The obtained polymer was 158.0 g and the polymerization activity was 237.0 kg/mmol-cat hr. The polymer had a composition of 57.3 mol % of propylene content, 20.8 mol % of ethylene content and 21.9 mol % of 1-butene content, and had an intrinsic viscosity [η] of 2.08 dl/g.

Comparative Example 2s

Propylene/Ethylene/Butene Copolymerization

To a 4000 ml polymerization apparatus dried under reduced pressure and thoroughly purged with nitrogen, 1740 ml of dry hexane, 50 g of 1-butene and triisobutylaluminum (1.0 mmol) were charged at normal temperature, then the temperature inside the polymerization apparatus was elevated to 40° C., and the polymerization apparatus was pressurized with propylene to 0.65 MPa and subsequently pressurized with ethylene to 0.80 MPa. Thereafter, a toluene solution in which 0.002 mmol of rac-dimethylsilylenebis(2-methyl-4-phenyl-indenyl)zirconium dichloride and methylaluminoxane (manufactured by Tosoh Finechem Corp.) in terms of 0.6 mmol of aluminum were contacted, was added to the polymerization vessel, and polymerization was conducted for 20 minutes while maintaining the internal temperature at 40° C. and the total pressure at 0.80 MPa by continuously supplying ethylene. The polymerization was stopped by adding 20 ml of methanol. After depressurizing, a polymer was precipitated out of the polymerization solution in 2 L of methanol, and was dried in a vacuum at 130° C. for 12 hours. The obtained polymer was 173.0 g and the polymerization activity was 259.5 kg/mmol-cat-hr. The polymer had a composition of 71.0 mol % of propylene content, 20.0 mol % of ethylene content and 9.0 mol % of 1-butene content, and had an intrinsic viscosity [η] of 2.78 dl/g.

Comparative Example 3s

Propylene/Ethylene/Butene Copolymerization

To a 4000 ml polymerization apparatus dried under reduced pressure and thoroughly purged with nitrogen, 1716 ml of dry hexane, 66.6 g of 1-butene, and triisobutylaluminum (1.0 mmol) were charged at normal temperature, then the temperature inside the polymerization apparatus was maintained at 20° C., and the polymerization apparatus was pressurized with propylene to 0.55 MPa and subsequently pressurized with ethylene to 0.80 MPa. Thereafter, a toluene solution in which 0.002 mmol of rac-dimethylsilylenebis(2-methyl-4-phenyl-indenyl)zirconium dichloride and methylaluminoxane (manufactured by Tosoh Finechem Corp.) in terms of 0.3 mmol of aluminum were contacted, was added to the polymerization vessel, and polymerization was conducted for 40 minutes while maintaining the internal temperature at 20° C. and the total pressure at 0.80 MPa by continuously supplying ethylene. The polymerization was stopped by adding 20 ml of methanol. After depressurizing, a polymer was precipitated out of the polymerization solution in 2 L of methanol, and was dried in a vacuum at 130° C. for 12 hours. The obtained polymer was 109.1 g and the polymerization activity was 163.7 kg/mmol-cat-hr. The polymer had a composition of 57.4 mol % of propylene content, 28.0 mol % of ethylene content and 14.6 mol % of 1-butene content, and had an intrinsic viscosity [η] of 2.98 dl/g.

INDUSTRIAL APPLICABILITY

According to the process for producing propylene polymer of the invention, a propylene polymer having a high stereo-regularity (isotactic), high position selectivity (low irregular bonding content), high melting point and high molecular weight is provided with good productivity.

The invention claimed is:

1. A process for producing a propylene polymer, wherein polymerization is conducted in a system selected from a system of propylene alone or a three-component system of propylene, ethylene and α-olefin having 4 or more carbon atoms in the presence of a catalyst for olefin polymerization comprising:
   (A) a bridged metallocene compound represented by the following General Formula [I]; and
   (B) one or more compound(s) selected from
      (b-1) an organoaluminumoxy compound
      (b-2) a compound which reacts with the bridged metallocene compound (A) to form an ion pair, and
      (b-3) an organoaluminum compound:

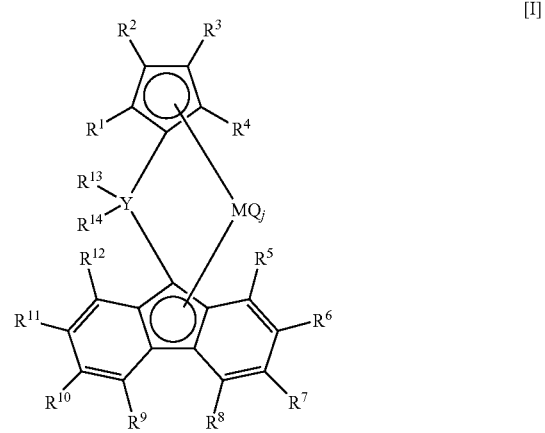

wherein, $R^1$ and $R^3$ each is hydrogen, $R^2$ is a t-butyl group, and $R^4$ is an ethyl group, each of $R^5$, $R^6$, $R^7$, $R^8$, $R^9$, $R^{10}$, $R^{11}$ and $R^{12}$, which is selected from hydrogen, a hydrocarbon group and a silicon-containing group, may be same or different from each other, and adjacent groups may be bonded to each other to form a ring, each of $R^{13}$ and $R^{14}$, which is selected from a phenyl group or a substituted phenyl group having 6 to 10 carbon atoms, may be equal to or different from each other, M is Ti, Zr or Hf, Y is carbon or silicon, Q may be selected from halogen, a hydrocarbon group, an anionic ligand and a neutral ligand capable of coordinating with a lone electron pair, which may be selected in the same combination or different combination, and j is an integer of 1 to 4.

2. A process for producing a propylene polymer, wherein polymerization is conducted in a two-component of propylene, and ethylene or 1-butene in the presence of a catalyst for olefin polymerization comprising:

(A) a bridged metallocene compound represented by the following General Formula [I]; and
   (B) one or more compound(s) selected from
      (b-1) an organoaluminumoxy compound
      (b-2) a compound which reacts with the bridged metallocene compound (A) to form an ion pair, and
      (b-3) an organoaluminum compound:

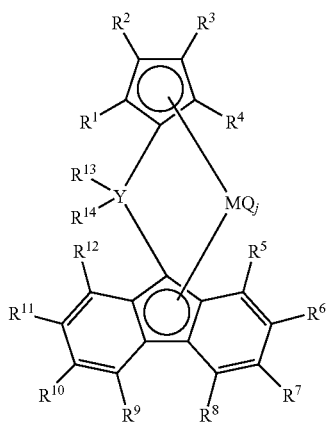

[I]

wherein, $R^1$ and $R^3$ each is hydrogen, $R^2$ is a t-butyl group, and $R^4$ is an ethyl group, each of $R^5$, $R^6$, $R^7$, $R^8$, $R^9$, $R^{10}$, $R^{11}$ and $R^{12}$, which is selected from hydrogen, a hydrocarbon group and a silicon-containing group, may be same or different from each other, and adjacent groups may be bonded to each other to form a ring, each of $R^{13}$ and $R^{14}$, which is selected from an alkyl group having 1 to 5 carbon atom(s), a phenyl group and a substituted phenyl group having 6 to 10 carbon atoms, may be equal to or different from each other, M is Ti, Zr or Hf, Y is carbon or silicon, Q may be selected from halogen, a hydrocarbon group, an anionic ligand and a neutral ligand capable of coordinating with a lone electron pair, which may be selected in the same combination or different combination, and j is an integer of 1 to 4, with the proviso that $R^{13}$ and $R^{14}$ are not both an alkyl group having 1 to 5 carbon atom(s).

* * * * *